US009971100B2

(12) United States Patent
Sparrowhawk et al.

(10) Patent No.: US 9,971,100 B2
(45) Date of Patent: May 15, 2018

(54) METHODS AND DEVICES FOR PREVENTING CONTAMINATION OF FIBER OPTIC CONNECTORS

(71) Applicant: Leviton Manufacturing Co., Inc., Melville, NY (US)

(72) Inventors: Bryan L. Sparrowhawk, Monroe, WA (US); Bret Taylor, Seattle, WA (US); Evan Gustafson, Bothell, WA (US); Ryan Moore, Mill Creek, WA (US); Brian Engelhardt, Bothell, WA (US)

(73) Assignee: LEVITON MANUFACTURING CO., INC., Mellville, NY (US)

( * ) Notice: Subject to any disclaimer, the term of this patent is extended or adjusted under 35 U.S.C. 154(b) by 32 days.

(21) Appl. No.: 15/058,039

(22) Filed: Mar. 1, 2016

(65) Prior Publication Data
US 2017/0254963 A1  Sep. 7, 2017

(51) Int. Cl.
*G02B 6/38* (2006.01)
*G02B 27/00* (2006.01)
*G02B 6/25* (2006.01)

(52) U.S. Cl.
CPC ............ *G02B 6/3849* (2013.01); *G02B 6/25* (2013.01); *G02B 6/3847* (2013.01); *G02B 6/3866* (2013.01); *G02B 6/3867* (2013.01); *G02B 27/0006* (2013.01)

(58) Field of Classification Search
CPC ...... G02B 6/3866; G02B 6/3849; G02B 6/25; G02B 6/3847; G02B 6/3867; G02B 27/0006
See application file for complete search history.

(56) References Cited

U.S. PATENT DOCUMENTS

| 6,227,717 | B1 * | 5/2001 | Ott | G02B 6/3849 |
| | | | | 385/134 |
| 6,449,795 | B1 * | 9/2002 | Sato | B08B 1/00 |
| | | | | 15/209.1 |
| 6,554,485 | B1 * | 4/2003 | Beatty | G02B 6/3849 |
| | | | | 385/70 |
| 7,215,864 | B1 * | 5/2007 | Qian | G02B 6/25 |
| | | | | 385/134 |
| 8,266,755 | B2 * | 9/2012 | Nakane | B08B 1/04 |
| | | | | 15/210.1 |

(Continued)

*Primary Examiner* — Ryan Lepisto
*Assistant Examiner* — Erin Chiem
(74) *Attorney, Agent, or Firm* — Davis Wright Tremaine LLP; George C. Rondeau, Jr.; Heather M. Colburn

(57) ABSTRACT

A dust cap for use with a fiber optic connector. The connector has a ferrule comprising an optical fiber. The ferrule has an end portion that includes an end surface of the optical fiber through which optical signals are transmitted. The dust cap includes a cover and wiping material. The cover is removably positionable over the end portion of the ferrule. The wiping material is positioned at least partially inside the cover. The wiping material may be adjacent the end surface of the optical fiber when the cover is positioned over the end portion of the ferrule. The wiping material may be wiped across the end surface of the optical fiber when the cover is positioned over the end portion of the ferrule. The wiping material may be moveable with respect to the end surface of the optical fiber and may wipe thereacross when moved.

29 Claims, 40 Drawing Sheets

(56) References Cited

U.S. PATENT DOCUMENTS

| | | | | |
|---|---|---|---|---|
| 9,002,170 B2* | 4/2015 | Neitge | G02B 6/443 | 385/139 |
| 9,213,149 B2* | 12/2015 | Lee | G02B 6/3866 | |
| 9,272,311 B2* | 3/2016 | Chia | B08B 6/00 | |
| 2002/0166190 A1* | 11/2002 | Miyake | B08B 1/00 | 15/210.1 |
| 2003/0039463 A1* | 2/2003 | Miyake | G02B 6/25 | 385/147 |
| 2003/0098045 A1* | 5/2003 | Loder | B08B 1/00 | 134/8 |
| 2004/0005134 A1* | 1/2004 | Sun | B08B 3/12 | 385/134 |
| 2004/0117981 A1* | 6/2004 | Roth | G02B 6/3821 | 29/828 |
| 2005/0105859 A1* | 5/2005 | Gerhard | B08B 3/02 | 385/85 |
| 2005/0286853 A1* | 12/2005 | Fujiwara | B08B 1/00 | 385/134 |
| 2006/0045428 A1* | 3/2006 | Theuerkorn | G02B 6/3831 | 385/53 |
| 2006/0171641 A1* | 8/2006 | Zhang | B08B 3/02 | 385/85 |
| 2008/0034519 A1* | 2/2008 | Fujiwara | B08B 1/008 | 15/104.001 |
| 2008/0310795 A1* | 12/2008 | Parkman, III | G02B 6/3849 | 385/60 |
| 2010/0302530 A1* | 12/2010 | Liu | G02B 6/3849 | 356/73.1 |
| 2011/0047731 A1* | 3/2011 | Sugita | G02B 6/3807 | 15/97.1 |
| 2011/0229088 A1* | 9/2011 | Isenhour | G02B 6/3807 | 385/78 |
| 2013/0308909 A1* | 11/2013 | Barnette, Jr. | G02B 6/3849 | 385/78 |
| 2014/0268114 A1* | 9/2014 | Zhou | B08B 5/02 | 356/73.1 |
| 2015/0362681 A1* | 12/2015 | Watte | G02B 6/3866 | 385/58 |

\* cited by examiner

METHODS AND DEVICES FOR PREVENTING CONTAMINATION OF FIBER OPTIC CONNECTORS

BACKGROUND OF THE INVENTION

Field of the Invention

The present invention is directed generally to devices, such as dust caps, for protecting an end face of a ferrule of a fiber optic connector from contamination that can negatively affect transmission of light signals through the end face of the ferrule.

Description of the Related Art

A dust cap is a sleeve or boot that covers a ferrule of a fiber optic connector. Conventional fiber optic connectors, such as unmated fiber optic connectors, are often shipped, stored, and/or sold with dust caps that are supposed to protect polished end-faces of optical fibers disposed within those connectors from damage, dust (e.g., particles having a diameter within a range of about 0.1 µm to about 10 µm), and other fluidic contamination.

Unfortunately, instead of protecting the end face of the optical fiber of the connector, dust caps may actually introduce dust and other contaminants to the polished end-face of the optical fibers disposed within the connector. For example, dust can be introduced by an air-piston like action caused by the removal of the dust cap. Dust caps often leach or outgas an oily residue. Further, conventional dust caps may contain contaminants (e.g., grease, gels, mold release residue, and the like) from the manufacturing process used to produce the dust cap. Typically, blasting air into the dust cap does not remove this type of contamination. Dust caps are often not stored in dust free areas. Thus, contaminates (such as dust particles) may accumulate inside the dust cap.

Contamination on the polished end-faces of optical fibers disposed within the fiber optic connectors can negatively affect the transmission of optical signals within a fiber optic system. To avoid this problem, users must clean the polished end-faces of the optical fibers disposed within the fiber optic connectors immediately before using them even if they had been covered by dust caps. This may involve rubbing the end-face of the optical fiber on an oil-phillic surface, or using an appropriate solvent followed by a dry wipe.

Therefore, a need exists for methods and devices for preventing contamination of the optical fibers disposed within fiber optic connectors. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
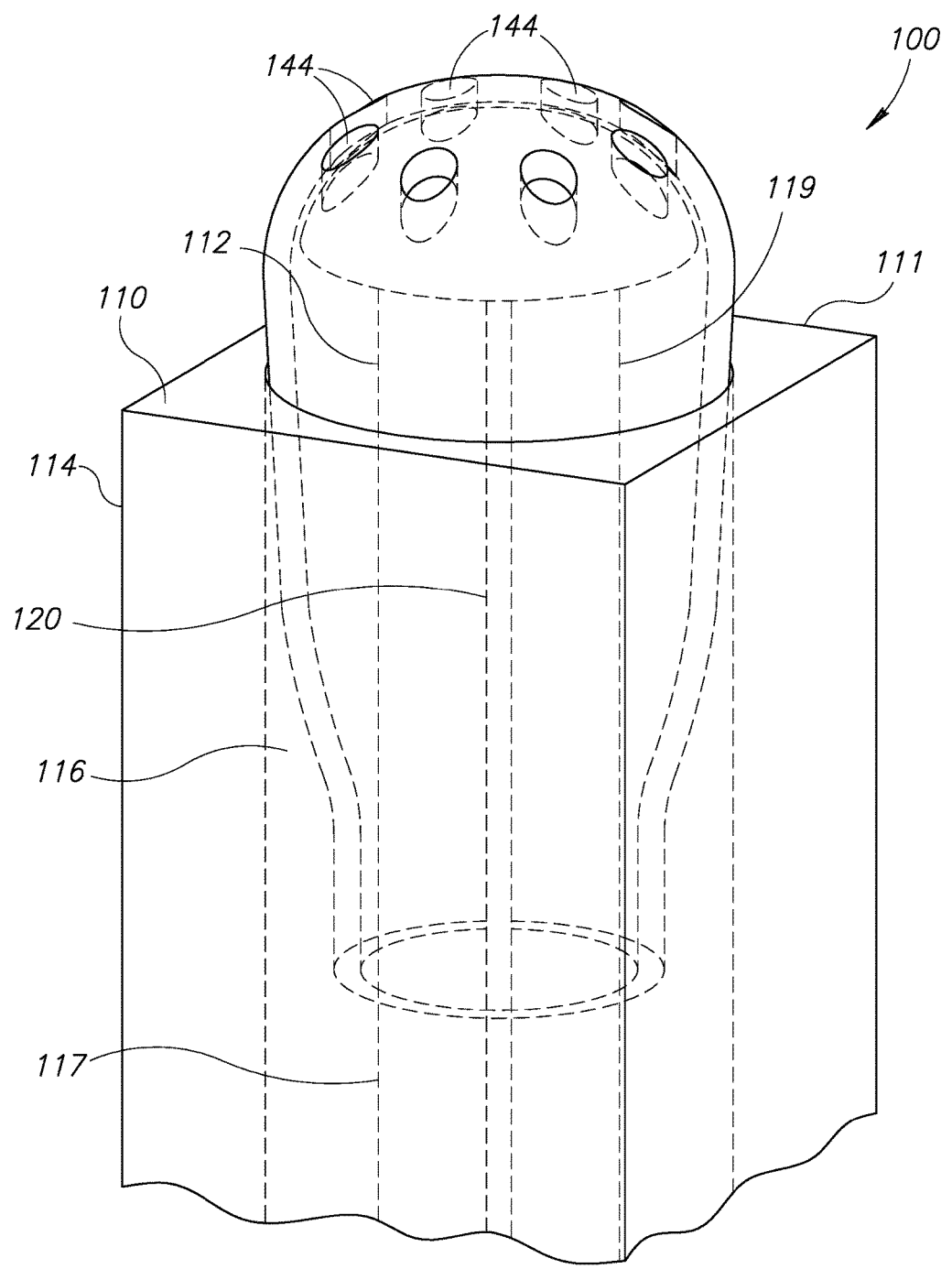
FIG. 1 is a perspective view of a first embodiment of a dust cap installed on a ferrule of a fiber optic connector.
Figure 41:
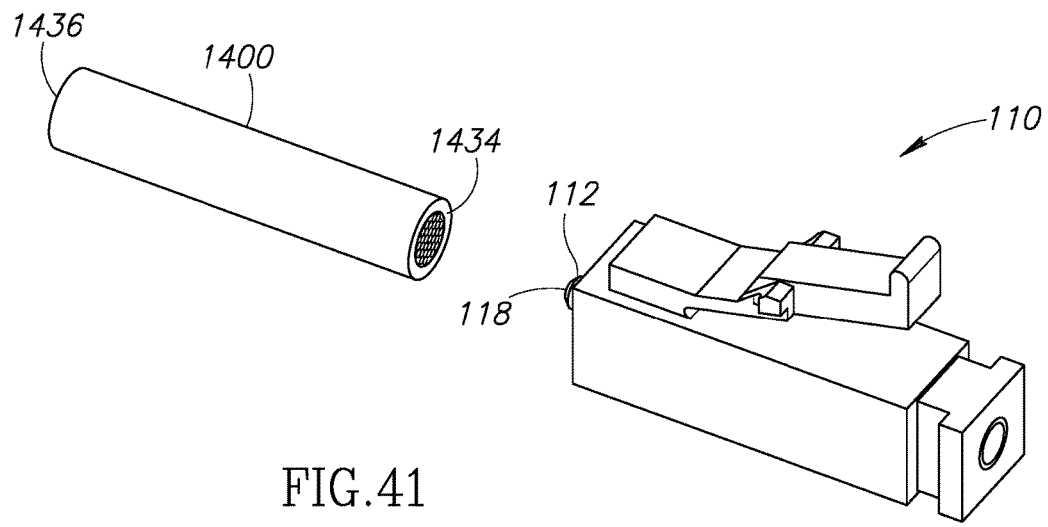
FIG. 41 is a perspective view of the dust cap of FIG. 39 before the ferrule engages a wiping element of the dust cap.
Figure 42:
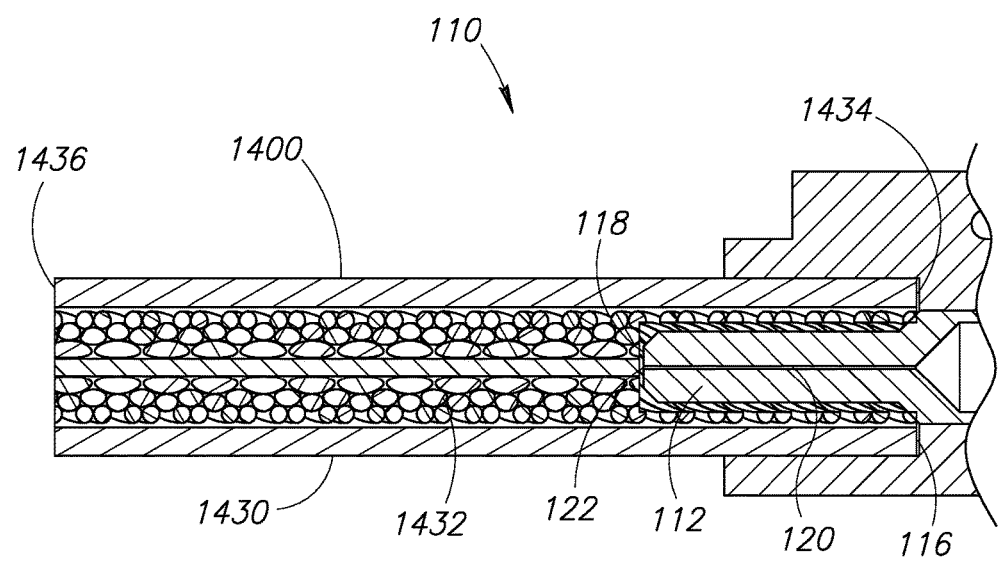
FIG. 42 is a cross-sectional view of the dust cap of FIG. 39 with the ferrule received fully therein.

FIG. 1 is a perspective view of a dust cap 100 for use with a fiber optic connector 110 (see also FIGS. 41 and 42, which depict a different implementation of the connector 110). In FIG. 1, the fiber optic connector 110 has been illustrated as a conventional unmated cylindrical ferruled fiber optic connector. For example, the fiber optic connector 110 may be implemented as a small form factor ("SFF") style connector (e.g., a Lucent Connector ("LC") style connector, a Mechanical Transfer Registered Jack ("MT-RJ") style connector, and the like), a Subscriber Connector ("SC") style connector, a Straight Tip ("ST") style connector, a FC style connector, a fiber distributed data interface ("FDDI") style connector, an ESCON style connector, a MU style connector, an E2000 style connector, a "fiber jack" style connector (e.g., an Opti-Jack connector manufactured by Panduit), a ribbon fiber style connector (e.g., a MT connector, a MTP connector, a Multi-fiber Push-On ("MPO") connector, and the like), and the like.

The fiber optic connector 110 has a mating end 111 configured to be mated with another connector (not shown), such as a fiber mating sleeve, adapter, coupler, jack, and the like. At the mating end 111, the fiber optic connector 110 has a ferrule 112 that extends outwardly and protrudes from a connector body 114. Typically, only about one tenth of an inch of the ferrule 112 protrudes beyond the connector body 114, when the fiber optic connector 110 is implemented using a LC style connector. However, about three eighths of an inch of the ferrule 112 may protrude beyond the connector body 114, when the fiber optic connector 110 is implemented using an older ST style connector.

Figure 2:
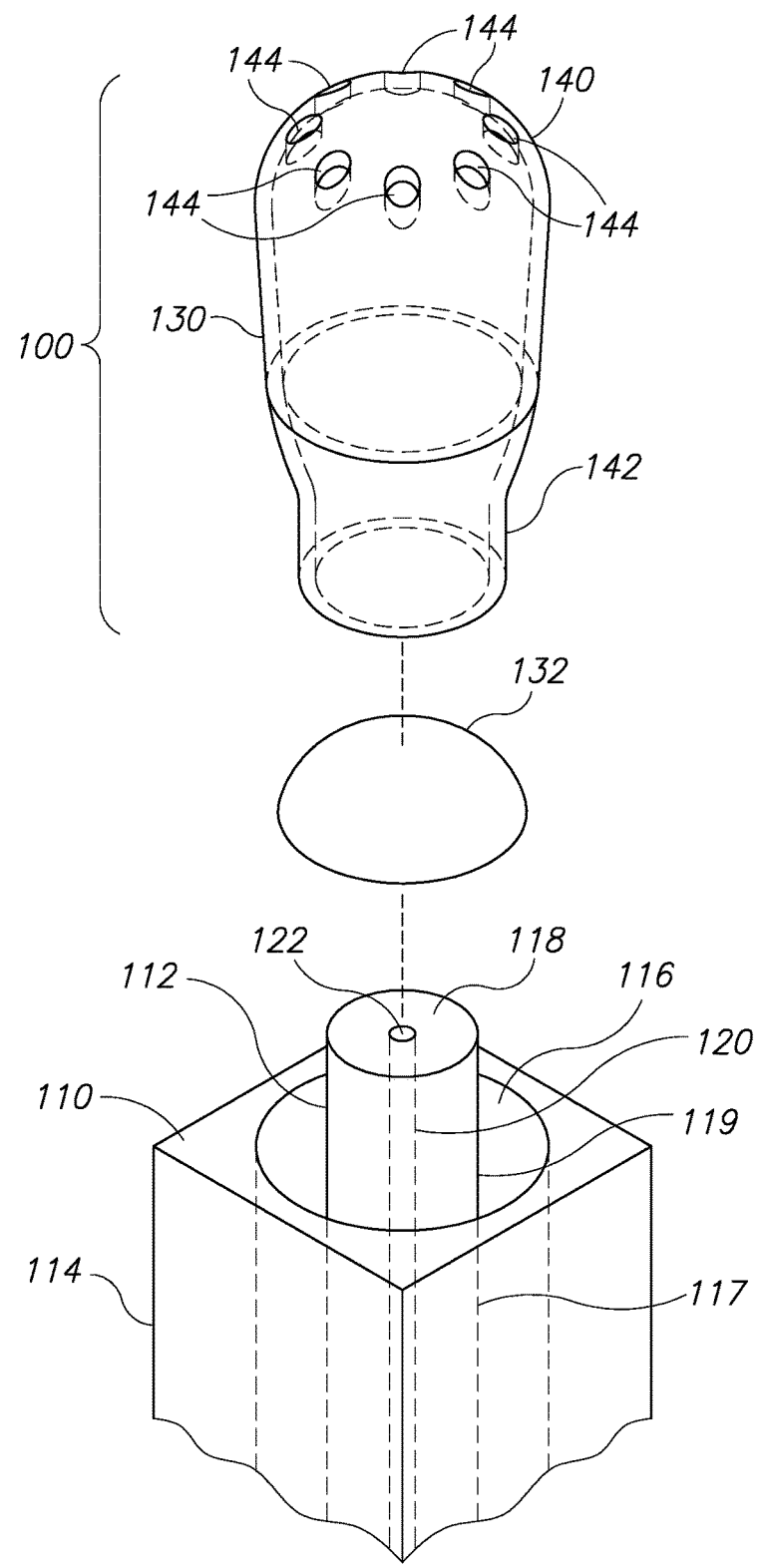
FIG. 2 is an exploded perspective view of the dust cap of FIG. 1.

An internal annular gap 116 extends circumferentially around the ferrule 112 between the ferrule 112 and the connector body 114. The ferrule 112 has an outwardly facing end surface 118 (see FIGS. 2, 9, 12, 14-17, 20A-22, 24, 36, 41, 42, and 44A), and a curved outwardly facing side surface 119. Referring to FIG. 2, an interior portion 117 of the side surface 119 extends along and defines a portion of the annular gap 116. An optical fiber 120 extends longitudinally through the ferrule 112 and has an outwardly facing polished end-face 122 that is coplanar with the end surface 118 of the ferrule 112.

The dust cap 100 is positioned over the end surface 118 of the ferrule 112 and extends at least partway into the annular gap 116. The dust cap 100 is configured to protect the polished end-face 122 of the optical fiber 120 from contamination.

The dust cap 100 includes a cover or sleeve 130 and a dust-free wiping element 132. Laterally, the sleeve 130 may have a generally circular cross-sectional shape. The sleeve 130 is configured to be slid onto the ferrule 112 and position the wiping element 132 adjacent the end surface 118 of the ferrule 112.

The sleeve 130 has a generally bulbous closed end portion 140 opposite a narrower open end portion 142. The ferrule 112 is received inside the sleeve 130 through the narrower open end portion 142. The open end portion 142 is configured to extend into the annular gap 116 along the interior portion 117 of the side surface 119 of the ferrule 112. The open end portion 142 forms a sliding seal against the side surface 119 of the ferrule 112.

The closed end portion 140 is configured to be spaced apart from the end surface 118 of the ferrule 112 with the wiping element 132 positioned therebetween. Thus, when the ferrule 112 is received inside the sleeve 130, the wiping element 132 is positioned between the outwardly facing end surface 118 of the ferrule 112 and the closed end portion 140 of the sleeve 130. This arrangement positions the wiping element 132 in contact with the polished end-face 122 of the optical fiber 120. In the embodiment illustrated, the outer shape of the wiping element 132 has a predetermined shape that follows both the interior contours of the bulbous closed end portion 140, and the planar polished end-face 122 of the optical fiber 120. Thus, the wiping element 132 has a spherical cap like (or spherical dome like) outer shape. For example, the wiping element 132 may have a hemispherical outer shape.

The wiping element 132 prevents contaminants from reaching the polished end-face 122 of the optical fiber 120 such that when the dust cap 100 is removed and the fiber optic connector 110 is connected to another connector (such as a fiber mating sleeve, adapter, coupler, jack, and the like), the fiber optic connector 110 maintains good optical coupling with the other connector. This improves signal transmission between the fiber optic connector 110 and the other connector.

A user may also use the dust cap 100 to remove contaminants from the polished end-face 122 of the optical fiber 120. For example, the sleeve 130 may be rotated circumferentially around the ferrule 112 to rub the wiping element 132 along the polished end-face 122 of the optical fiber 120 to thereby wipe away any contaminants on the polished end-face 122. Further, the sleeve 130 may be deflected laterally to allow the wiping element 132 to slide laterally across the polished end-face 122 to remove contaminants therefrom. Additionally, the closed end portion 140 may be compressed or otherwise deformed to slide the wiping element 132 laterally across the polished end-face 122 to remove contaminants therefrom. In other words, movement of the wiping element 132 with respect to the polished end-face 122 is desirable because such movement wipes or cleans the polished end-face 122.

Optionally, the closed end portion 140 of the sleeve 130 may include one or more through-holes 144 that function as air vents. In such embodiments, the wiping element 132 is positioned alongside the through-holes 144 and functions as an air filter that prevents contaminants (e.g., dust) from entering the dust cap 100 through the optional through-hole(s) 144. Thus, the wiping element 132 may filter any "pistoned" air that enters the dust cap 100 through the optional through-hole(s) 144 when the dust cap 100 is removed from the ferrule 112. To help assure a good filter seal, the wiping element 132 may be insert molded into the sleeve 130.

By way of a non-limiting example, the sleeve 130 may be constructed from a resilient material that has low outgassing or is outgass-exhaustible, such as synthetic rubber, fluoropolymer elastomer, silicone, and the like. Examples of suitable materials are sold under the trademark VITON®. Additional non-limiting examples of suitable materials for constructing the sleeve 130 include low outgassing fluoropolymers (e.g., polyvinylidene fluoride), polytetrafluoroethylene, polyethylene, nalgene, vespel polyimide, kapton, elastomers (e.g., nitrile rubber), and the like.

By way of a non-limiting example, the wiping element 132 may be constructed from an electrostatic discharge ("ESD") non-triboelectric material, a microfiber material (e.g., Staticide Microfiber Cloth sold by ACL Inc., swab tip materials used in 3605 ESD PurSwab Microfiber Swabs or Cleaning Applicators sold by Puritan Medical Products Company LLC), and the like. By way of a non-limiting example, the wiping element 132 may include a compressible material wrapped in a sheet material (e.g., lint free cloth, a no-lint cleaning material, and the like).

Second Embodiment

Figure 3:
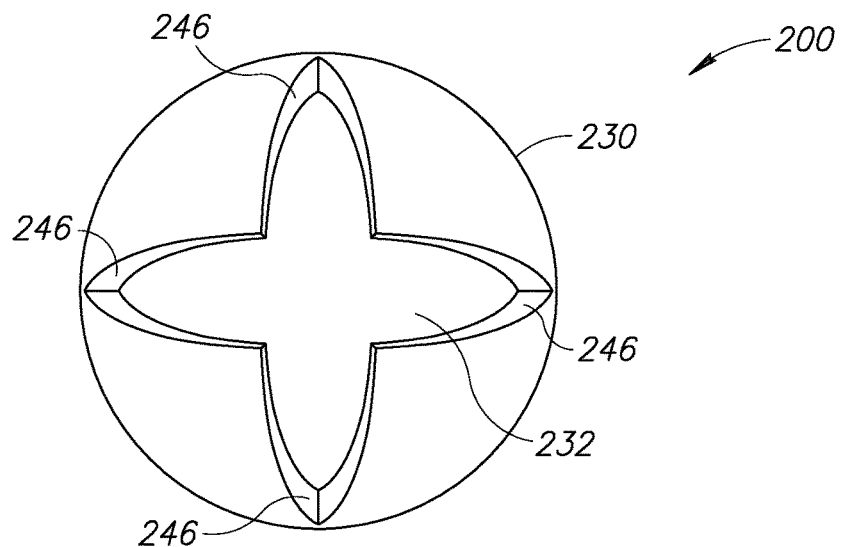
FIG. 3 is an end view of a second embodiment of a dust cap.
Figure 4:
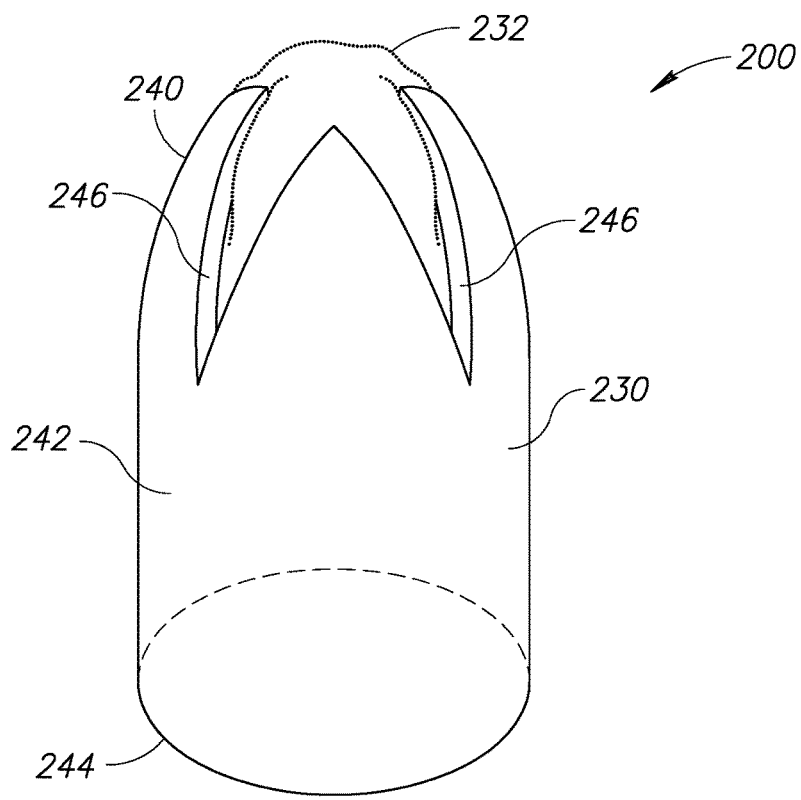
FIG. 4 is a side view of the dust cap of FIG. 3.
Figure 5:
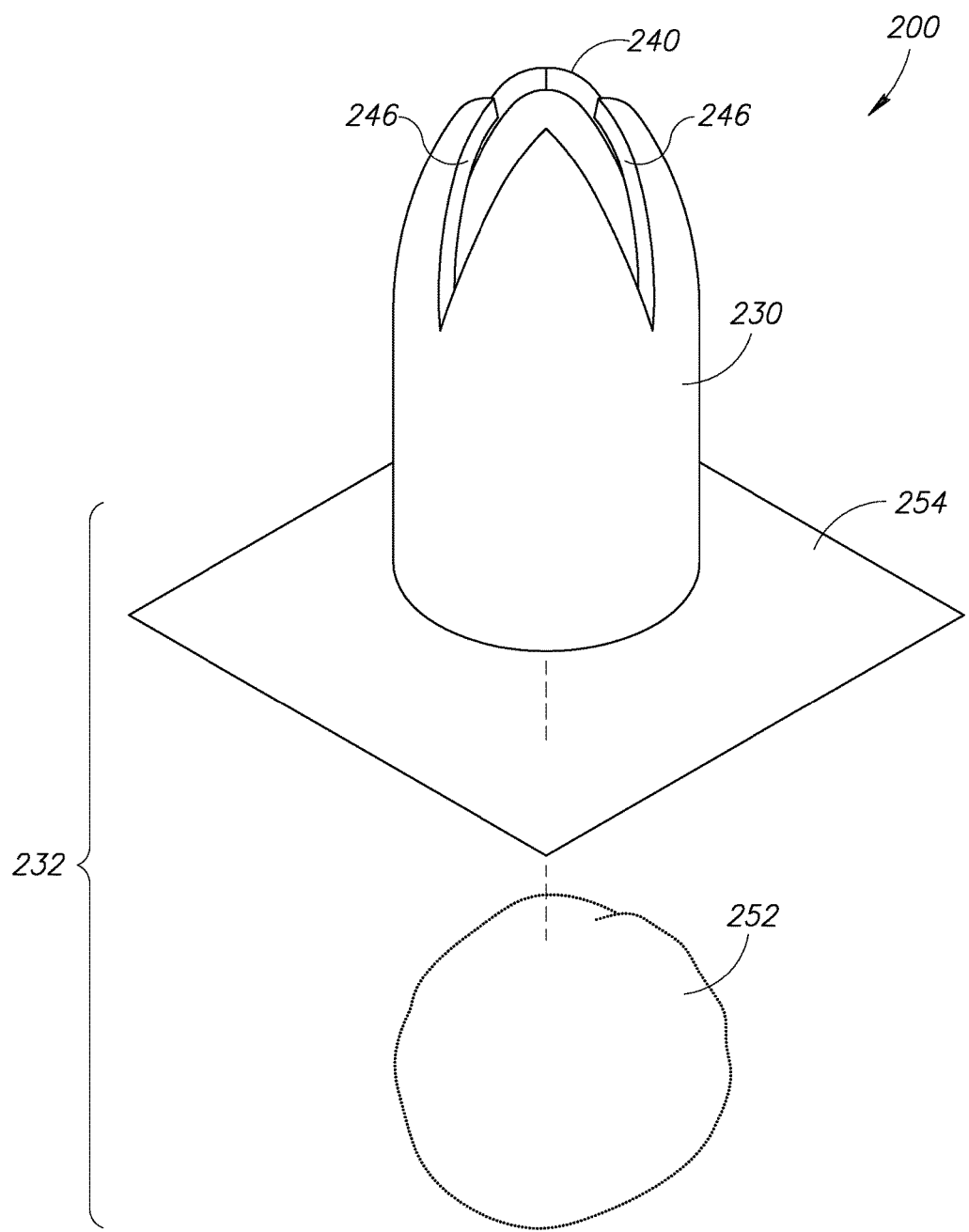
FIG. 5 is an exploded perspective view of the dust cap of FIG. 3.

FIGS. 3-5 depict an alternate embodiment of a dust cap 200. The dust cap 200 includes a sleeve 230 and a wiping element 232. The sleeve 230 may be constructed from any material suitable for constructing the sleeve 130 (see FIGS. 1 and 2), and the wiping element 232 may be constructed from any material suitable for constructing the wiping element 132 (see FIG. 2).

Referring to FIG. 4, the sleeve 230 has a generally dome-shaped end portion 240 and a generally cylindrically shaped body portion 242 having an open end 244 opposite the dome-shaped end portion 240. The wiping element 232 is positioned inside the dome-shaped end portion 240. The dome-shaped end portion 240 includes through slits 246 through which the wiping element 232 may protrude outwardly from inside the sleeve 230.

The ferrule 112 (see FIGS. 1, 2, 9, 11-17, 20A-25B, 28, 36, 38, 41, 42, 44A-45, and 47-48C) is received inside the sleeve 230 through the open end 244. The body portion 242 is configured to extend at least partially into the annular gap 116 along the interior portion 117 of the side surface 119 of the ferrule 112. The open end 244 and the body portion 242 form a sliding seal against the side surface 119 of the ferrule 112.

The dome-shaped end portion 240 is configured to be spaced apart from the end surface 118 of the ferrule 112 with the wiping element 232 positioned therebetween. Thus, when the ferrule 112 is received inside the sleeve 230, the wiping element 232 is compressed between the outwardly facing end surface 118 of the ferrule 112 and the dome-shaped end portion 240 of the sleeve 130. This arrangement places the wiping element 232 in direct contact with the polished end-face 122 of the optical fiber 120.

Referring to FIG. 5, optionally, the wiping element 232 may include a compressible material 252 wrapped in a sheet 254. The wiping element 232 need not have a predetermined shape. Instead, the compressible material 252 and the sheet 254 are suitably compressible to allow the wiping element 232 to conform to the shape of the space between the ferrule 112 (see FIGS. 1, 2, 9, 11-17, 20A-25B, 28, 36, 38, 41, 42, 44A-45, and 47-48C) and the sleeve 230.

The through slits 246 function as air vents, and the wiping element 232 functions as an air filter that prevents contaminants (e.g., dust) from entering the dust cap 200 through the through slits 246. Thus, the wiping element 232 may filter any "pistoned" air that enters the dust cap 200 through the through slits 246 when the dust cap 200 is removed from the ferrule 112 (see FIGS. 1, 2, 9, 11-17, 20A-25B, 28, 36, 38, 41, 42, 44A-45, and 47-48C).

A user may use the dust cap 200 to remove contaminants from the polished end-face 122 of the optical fiber 120. For example, the sleeve 230 may be rotated circumferentially around the ferrule 112 to rub the wiping element 232 along the polished end-face 122 of the optical fiber 120 to thereby wipe away any contaminants on the polished end-face 122. Further, the sleeve 230 may be deflected laterally to allow the wiping element 232 to slide laterally across the polished end-face 122 to remove contaminants therefrom. Additionally, the dome-shaped end portion 240 may be compressed or otherwise deformed to slide the wiping element 232 laterally across the polished end-face 122 to remove contaminants therefrom. In other words, the wiping element 232 may be moved or displaced with respect to the polished end-face 122 in a manner that wipes or cleans the polished end-face 122.

Third Embodiment

FIGS. 6-10 depict an alternate embodiment of a dust cap 300. The dust cap 300 includes a sleeve 330 and a wiping element 332. The sleeve 330 may be constructed from any material suitable for constructing the sleeve 130 (see FIGS. 1 and 2), and the wiping element 332 may be constructed from any material suitable for constructing the wiping element 132 (see FIG. 2).

Figure 6:
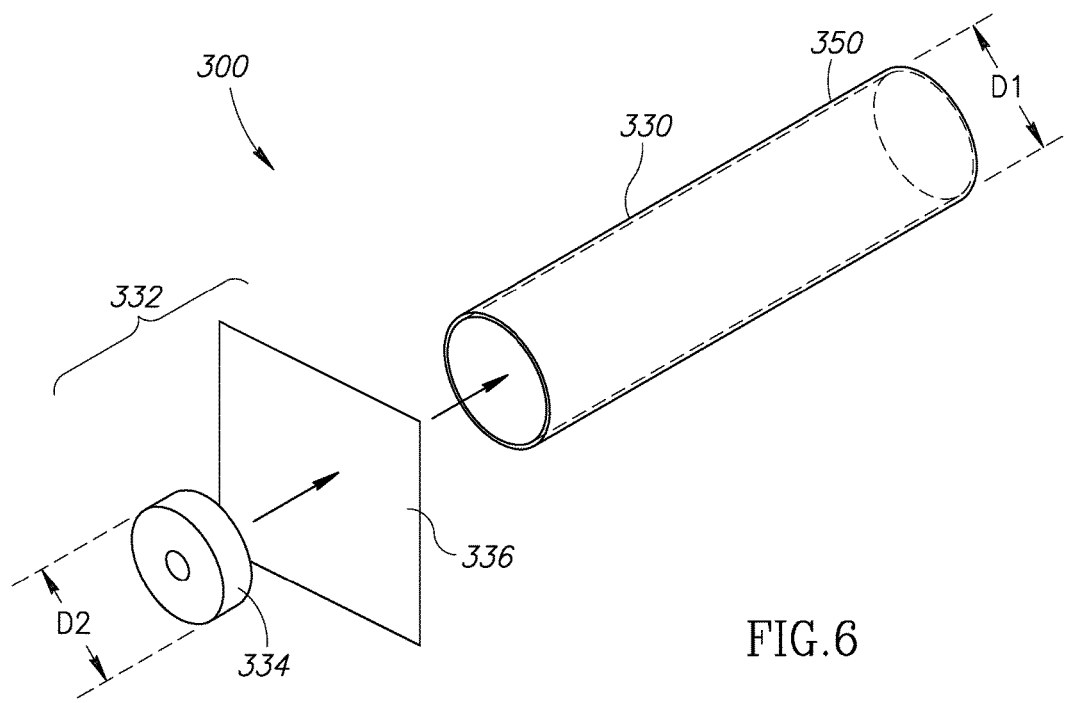
FIG. 6 is a perspective view of a tube segment, disk, and sheet of material that may be assembled to construct a third embodiment of a dust cap.
Figure 7:
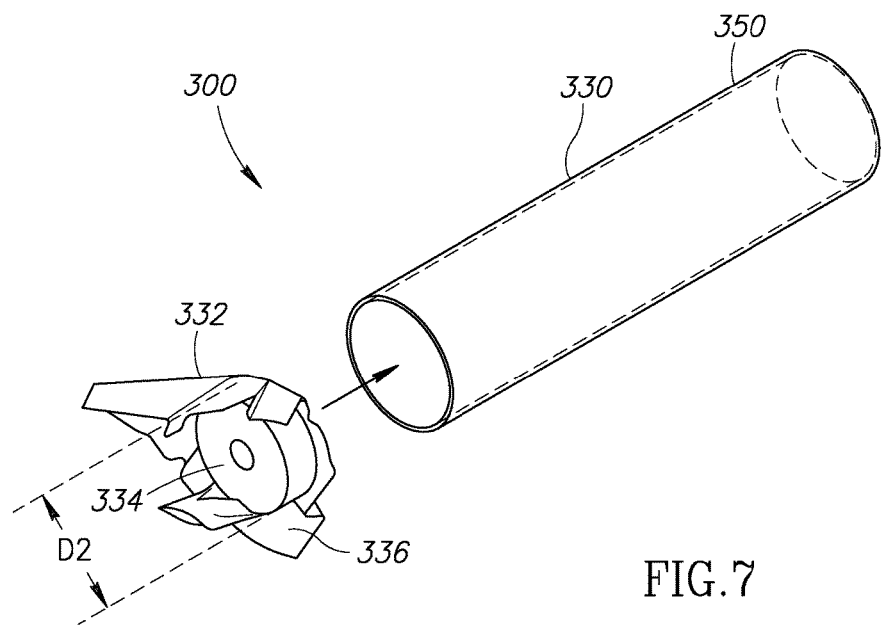
FIG. 7 is a perspective view of the disk and sheet assembled to form a wiping element positioned near one open end of the tube segment.

Referring to FIG. 6, the sleeve 330 is formed from an open-ended cylindrically shaped tube segment 350 into which the wiping element 332 is inserted. For ease of illustration, in FIGS. 6-10, the tube segment 350 is transparent. The tube segment 350 has an inner diameter D1. Referring to FIG. 7, the wiping element 332 has a generally round cross-sectional shape with an outer diameter D2. The outer diameter D2 and the inner diameter D1 are configured such that the wiping element 332 may be positioned inside the tube segment 350.

In the embodiment illustrated, the wiping element 332 has a generally disk-shaped outer shape. However, other shapes such as spherical, cylindrical, and the like may be used. Optionally, the wiping element 332 may include a disk 334 wrapped in a sheet 336. The sheet 336 may be substantially identical to the sheet 254 (see FIG. 5). When the wiping element 332 is positioned inside the tube segment 350, the disk 334 is approximately concentric with the tube segment 350.

Figure 8:
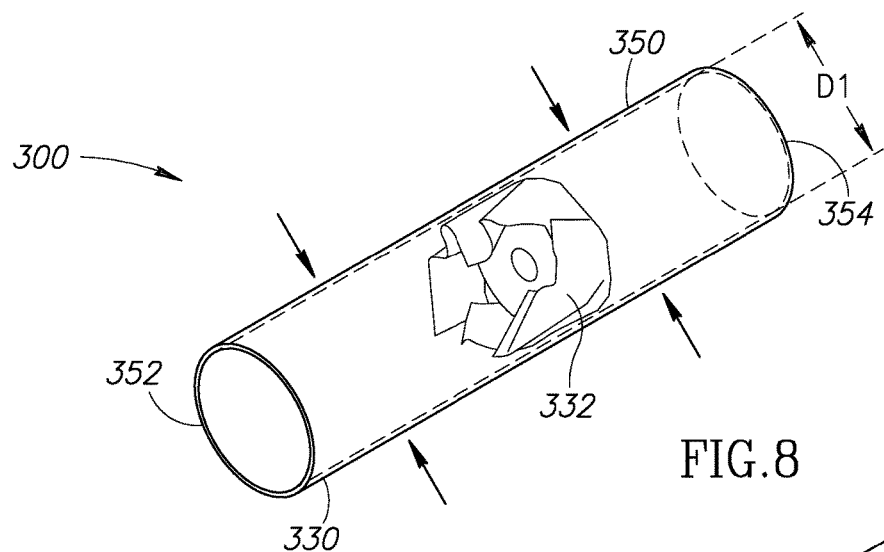
FIG. 8 is a perspective view of the wiping element after it has been inserted into the tube segment through the open end.
Figure 9:
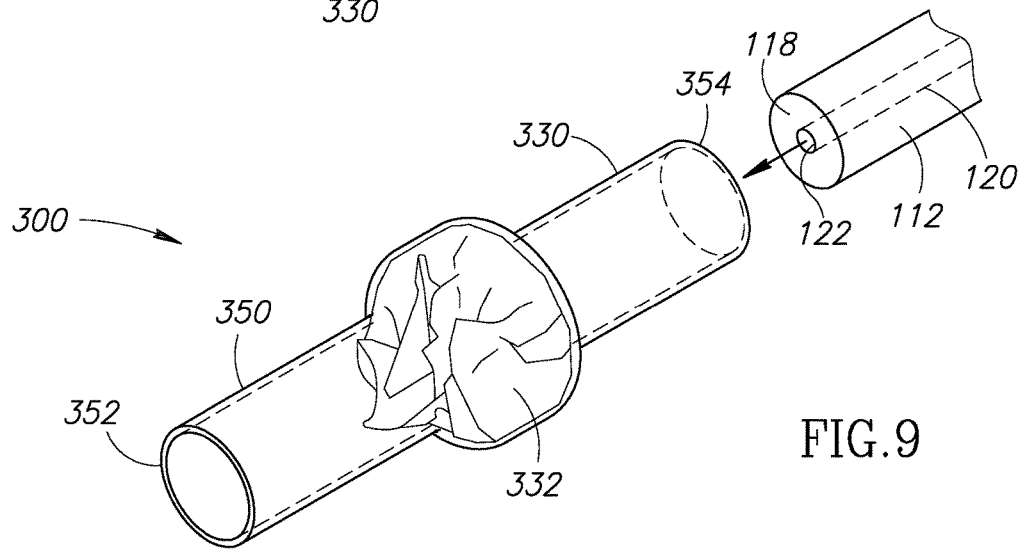
FIG. 9 is a perspective view of the third embodiment of a dust cap formed by reducing the diameter of the tube segment along both sides of the wiping element to trap the wiping element inside the tube segment.

Referring to FIGS. 8 and 9, in the embodiment illustrated, after the wiping element 332 is positioned inside the tube segment 350, the inner diameter D1 (see FIGS. 6 and 8) of the tube segment 350 is reduced on both sides of the wiping element 332 to trap the wiping element 332 inside the tube segment 350. In the embodiment illustrated in FIG. 9, the inner diameter D1 (see FIGS. 6 and 8) has been reduced from the wiping element 332 to a distal end portion 352 of the tube segment 350 and from the wiping element 332 to a proximal end portion 354 of the tube segment 350, which traps the wiping element 332 inside the tube segment 350. While the inner diameter D1 is reduced at the distal and proximal end portions 352 and 354 of the tube segment 350, the tube segment 350 remains open at both ends.

By way of a non-limiting example, the tube segment 350 may be constructed from a material that shrinks when heat is applied thereto. By way of non-limiting examples, the tube segment 350 may be constructed from fluoropolymer, polytetrafluoroethylene ("PTFE"), polyvinylidene fluoride ("PVDF"), fluorinated ethylene propylene ("FEP"), elastomer, silicone rubber, polyolefin, polyvinyl chloride, and the like. In embodiments in which the tube segment 350 shrinks when heat is applied thereto, the inner diameter D1 (see FIG. 6) of the tube segment 350 may be reduced or shrunk at desired locations by applying heat to those locations of tube segment 350.

In alternative embodiments, the inner diameter D1 (see FIG. 6) may be temporarily enlarged (e.g., using a speculum) and the wiping element 332 inserted into the tube segment 350. Then, the temporary enlargement may be terminated to trap the wiping element 332 inside the tube segment 350. Again, the tube segment 350 remains open at both ends.

Figure 10:
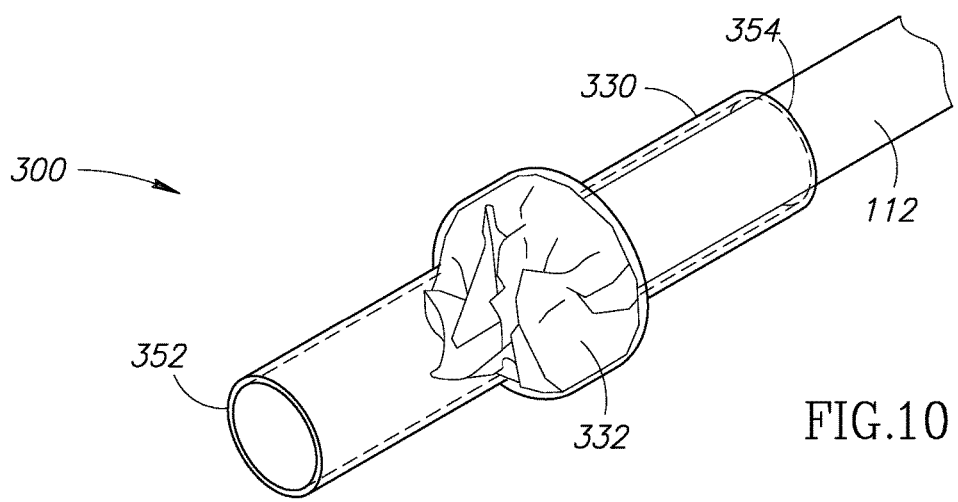
FIG. 10 is a perspective view of the dust cap of FIG. 9 installed on the ferrule of the fiber optic connector.

Referring to FIGS. 9 and 10, the ferrule 112 may be inserted into the proximal end portion 354 until the ferrule 112 abuts the wiping element 332. The wiping element 332 functions as a filter for any air that enters the dust cap 300 through the distal end portion 352.

Referring to FIG. 10, a user may use the dust cap 300 to remove contaminants from the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47). For example, the sleeve 330 may be rotated circumferentially around the ferrule 112 to rub the wiping element 332 along the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47) to thereby wipe away any contaminants on the polished end-face 122. Further, the sleeve 330 may be deflected laterally to allow the wiping element 332 to slide laterally across the polished end-face 122 (see FIGS. 2, 9, 12, 14, 15, 17, 20A, 22, 24, 42, 44A, and 47) to remove contaminants therefrom. Additionally, the tube segment 350 may be compressed or otherwise deformed to slide the wiping element 332 laterally across the polished end-face 122 (see FIGS. 2, 9, 12, 14, 15, 17, 20A, 22, 24, 42, 44A, and 47) to remove contaminants therefrom. In other words, the wiping element 332 may be moved or displaced with respect to the polished end-face 122 (see FIGS. 2, 9, 12, 14, 15, 17, 20A, 22, 24, 42, 44A, and 47) in a manner that wipes or cleans the polished end-face 122.

Fourth Embodiment

Figure 11:
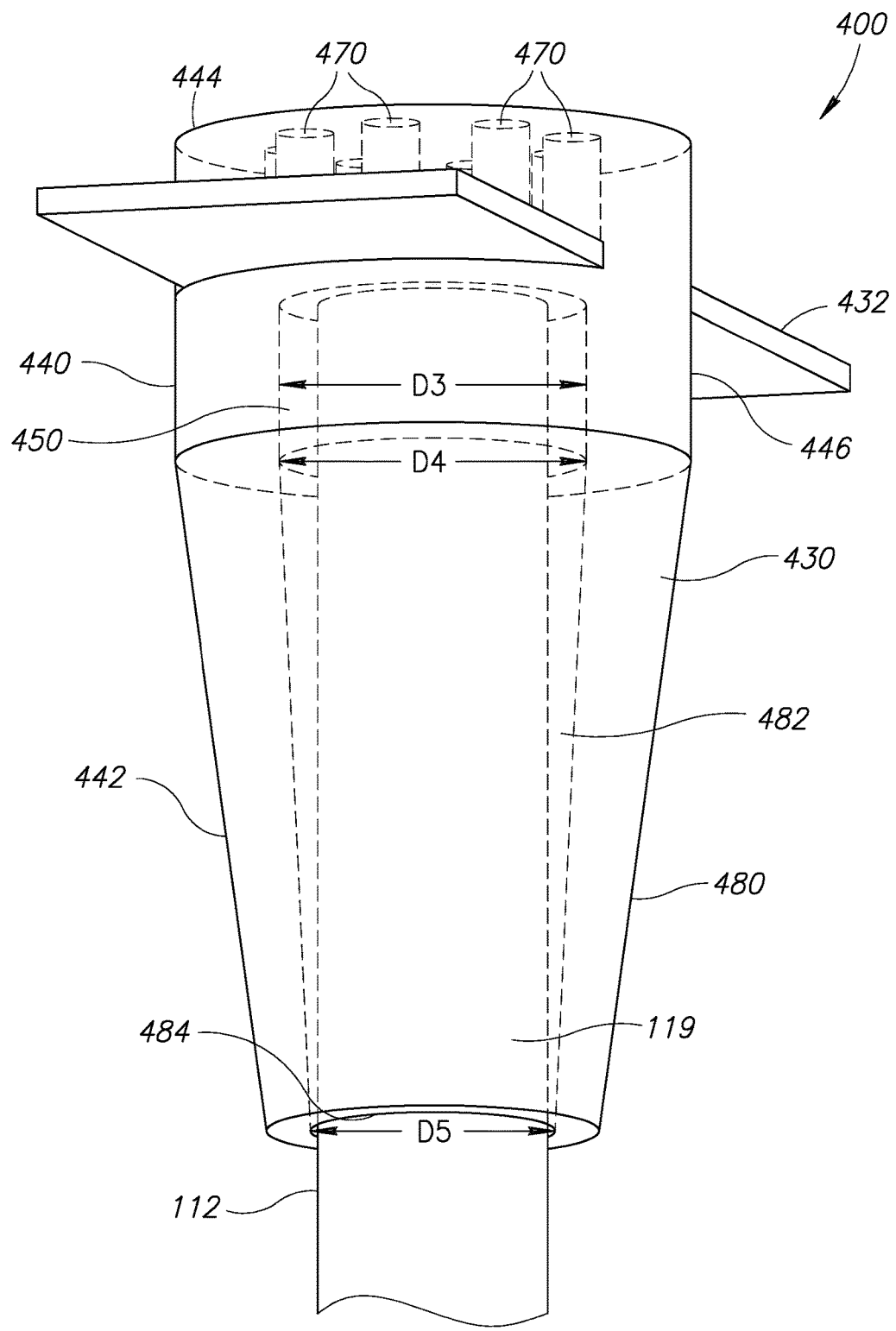
FIG. 11 is a side perspective view of a fourth embodiment of a dust cap installed on the ferrule of the fiber optic connector.
Figure 12:
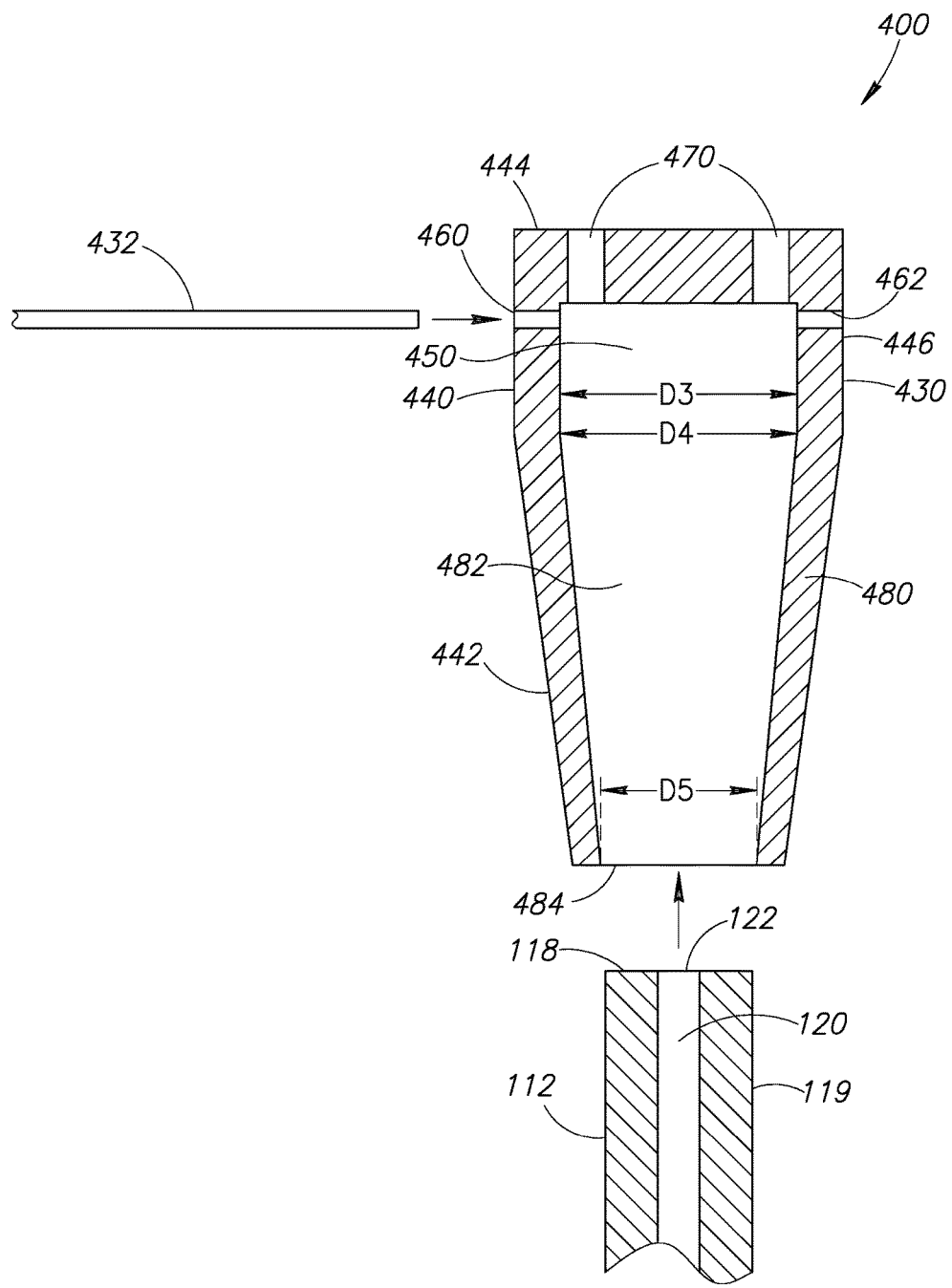
FIG. 12 is an exploded side view of the dust cap of FIG. 11.

FIGS. 11 and 12 depict an alternate embodiment of a dust cap 400. The dust cap 400 includes a sleeve 430 and a wiping element 432. The sleeve 430 may be constructed from any material suitable for constructing the sleeve 130 (see FIGS. 1 and 2), and the wiping element 432 may be constructed from any material suitable for constructing the wiping element 132 (see FIG. 2). In this embodiment, the wiping element 432 is implemented as a substantially planar sheet (e.g., of lint free cloth).

Referring to FIG. 11, the sleeve 430 has a cylindrical distal end portion 440 connected to a cone-shaped proximal portion 442. The distal end portion 440 has a generally planar end portion 444 and a curved outer sidewall 446 that extends from the end portion 444 toward the proximal portion 442. The outer sidewall 446 defines a central channel 450 having an inside diameter D3. Referring to FIG. 12, first and second slits 460 and 462 are formed in the outer sidewall 446. The slits 460 and 462 are positioned and aligned with one another across the central channel 450 such that the wiping element 432 may extend through both of the slits 460 and 462 at the same time. The slits 460 and 462 conform to the wiping element 432 and form seals therealong.

Optionally, one or more through-holes 470 may be formed in the end portion 444. The wiping element 432 functions as a filter for any air that enters the dust cap 400 through the optional through-hole(s) 470 and/or the slits 460 and 462 formed in the outer sidewall 446.

The proximal portion 442 has a sidewall 480 that defines an open ended tapered central channel 482 that is contiguous with the central channel 450 of the distal end portion 440. The tapered central channel 482 has an inside diameter D4 near the distal end portion 440 and an inside diameter D5 near an opening 484 opposite the end portion 444 of the distal end portion 440. The inside diameter D4 is approximately equal to the inside diameter D3.

The ferrule 112 is received inside the sleeve 430 through the opening 484. When fully inserted, the outwardly facing end surface 118 of the ferrule 112 abuts the wiping element 432. The wiping element 432 is positioned between the outwardly facing end surface 118 and the optional through-hole(s) 470, and prevents contaminants from reaching the outwardly facing end surface 118 through the optional through-hole(s) 470 and/or the slits 460 and 462.

The proximal portion 442 extends along a portion of the ferrule 112 and into the annular gap 116 (see FIGS. 1 and 2) and forms a sliding seal against the side surface 119 of the ferrule 112. The inside diameter D5 is sized such that the proximal portion 442 forms a seal with the side surface 119 of the ferrule 112. However, the inside diameters D3 and D4 are both larger than the inside diameter D5. Thus, the distal end portion 440 may shift laterally with respect to the ferrule 112 while the opening 484 maintains a seal with the side surface 119 of the ferrule 112. As the distal end portion 440 shifts, the wiping element 432 is wiped across the polished end-face 122 of the optical fiber 120. Further, the seal formed along the side surface 119 of the ferrule 112 by the proximal portion 442 remains unbroken as the distal end portion 440 is displaced laterally with respect to the ferrule 112.

A user may use the dust cap 400 to remove contaminants from the polished end-face 122 of the optical fiber 120. For example, the sleeve 430 may be rotated circumferentially around the ferrule 112 to rub the wiping element 432 along the polished end-face 122 of the optical fiber 120 to thereby wipe away any contaminants on the polished end-face 122. Further, the sleeve 430 may be deflected laterally to allow the wiping element 432 to slide laterally across the polished end-face 122 to remove contaminants therefrom. Additionally, the sleeve 430 may be compressed or otherwise deformed to slide the wiping element 432 laterally across the polished end-face 122 to remove contaminants therefrom. In other words, the wiping element 432 may be moved or displaced with respect to the polished end-face 122 in a manner that wipes or cleans the polished end-face 122.

Fifth Embodiment

Figure 13:
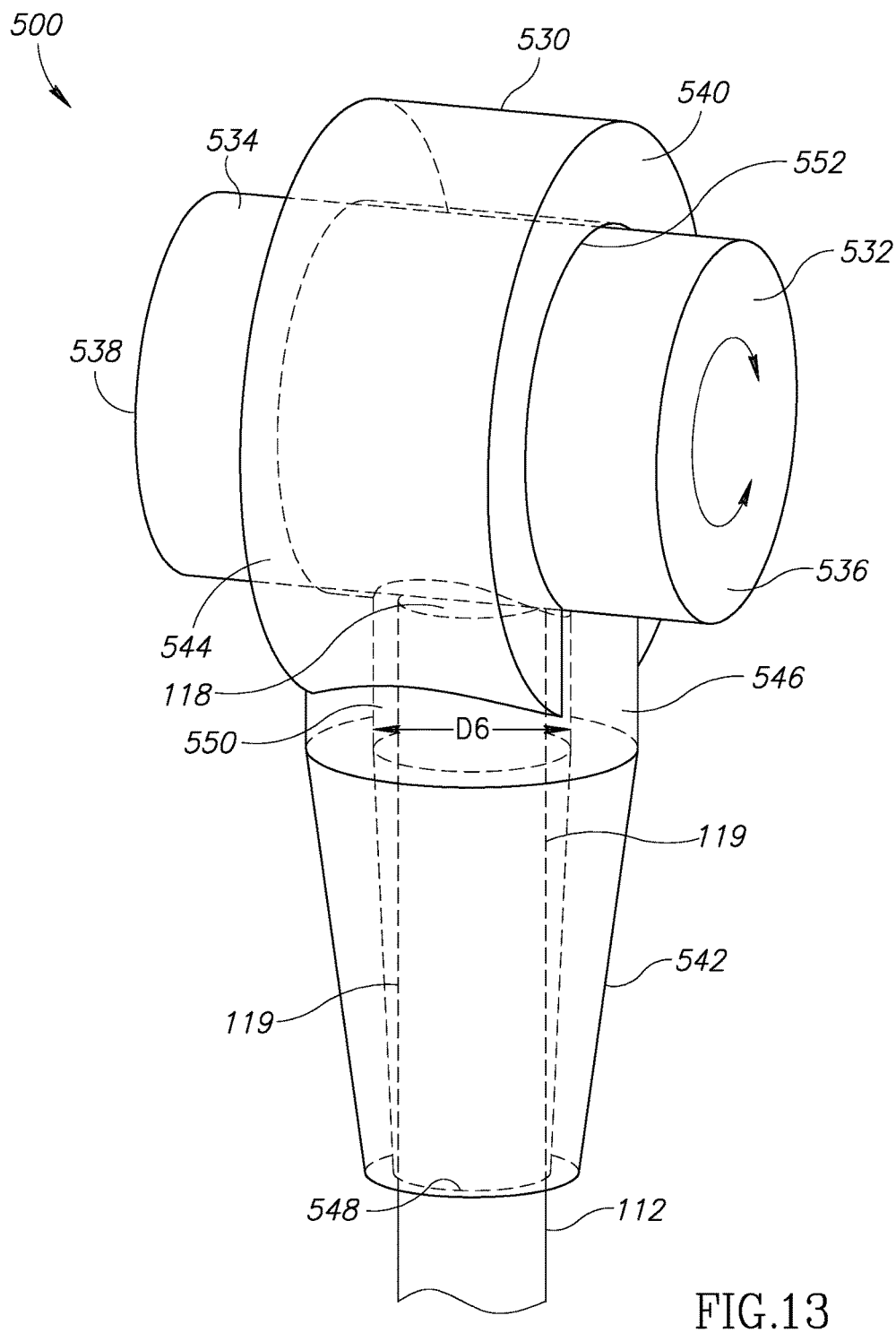
FIG. 13 is a side perspective view of a fifth embodiment of a dust cap installed on the ferrule of the fiber optic connector.

FIG. 13 depicts an alternate embodiment of a dust cap 500. The dust cap 500 includes a sleeve 530 and a wiping element 532. The sleeve 530 may be constructed from any material suitable for constructing the sleeve 130 (see FIGS. 1 and 2), and the wiping element 532 may be constructed from any material suitable for constructing the wiping element 132 (see FIG. 2).

In this embodiment, the wiping element 532 is implemented as a substantially cylindrically shaped element or plug having an annular side outer surface 534 that extends between first and second end portions 536 and 538. The wiping element 532 may be implemented as a single unit, like a cigarette filter. Alternatively, the wiping element 532 may be implemented using a sheet (e.g., of no-lint cleaning material) wrapped around a cylindrically shaped plug member.

The sleeve 530 has a distal end portion 540 opposite a cone-shaped proximal portion 542. The cone-shaped proximal portion 542 is substantially identical to the cone-shaped proximal portion 442 (see FIGS. 11 and 12) of the dust cap 400 (see FIGS. 11 and 12). The ferrule 112 is received inside the sleeve 530 through an opening 548 formed in the proximal portion 542. The opening 548 is substantially identical to the opening 484 (see FIGS. 11 and 12). When the ferrule 112 is inserted into the dust cap 500 through the opening 548, the proximal portion 542 extends along a portion of the ferrule 112, into the annular gap 116 (see FIGS. 1 and 2), and forms a sliding seal against the side surface 119 of the ferrule 112. However, the distal end portion 540 may shift laterally with respect to the ferrule 112 while the proximal portion 542 near the opening 584 maintains a seal with the side surface 119 of the ferrule 112.

The distal end portion 540 has a wiping element retaining portion 544 and a curved outer sidewall 546 that connects the wiping element retaining portion 544 with the proximal portion 542. The outer sidewall 546 defines an open-ended central channel 550 having an inside diameter D6 that is substantially identical to the inside diameter D3 (see FIGS. 11 and 12). When the ferrule 112 is inserted into the dust cap 500, the ferrule 112 extends from the proximal portion 542 and into the central channel 550 of the distal end portion 540.

The wiping element retaining portion 544 has an open ended channel 552 configured to receive and retain the wiping element 532 therein. The central channel 550 opens into the channel 552 so that the wiping element 532 may contact the end surface 118 of the ferrule 112 when the ferrule 112 is inserted into the dust cap 500 as shown in FIG. 13. The wiping element 532 functions as a filter for any air that enters the dust cap 500 through the channel 552. The channel 552 conforms to the side outer surface 534 of the wiping element 532 and forms a seal therealong. Nevertheless, the wiping element 532 may be rotated within the channel 552 when the ferrule 112 is inserted into the dust cap 500 as shown in FIG. 13.

A user may use the dust cap 500 to remove contaminants from the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47). When the ferrule 112 is fully inserted into the dust cap 500, the outwardly facing end surface 118 of the ferrule 112 abuts the wiping element 532. The user may move or displace the wiping element 532 with respect to the polished end-face 122 (see FIGS. 2, 9, 12, 14, 15, 17, 20A, 22, 24, 42, 44A, and 47) in a manner that wipes or cleans the polished end-face 122. For example, the wiping element 532 may be rotated within the channel 552 so that the side outer surface 534 of the rotating wiping element 532 may be wiped across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47). In the embodiment illustrated, the first and second end portions 536 and 538 protrude outwardly from the channel 552 and may be gripped by a user and used to rotate the wiping element 532 within the channel 552. As the wiping element 532 is rotated, clean portions of the side outer surface 534 wipe across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47).

By way of another non-limiting example, a user may rotate the sleeve 530 circumferentially around the ferrule 112 to rub the wiping element 532 along the polished end-face 122 of the optical fiber 120 to thereby wipe away any contaminants on the polished end-face 122.

By way of another non-limiting example, the sleeve 530 may be deflected laterally by the user to slide the wiping element 532 laterally across the polished end-face 122 to remove contaminants therefrom. The proximal portion 542 extends along a portion of the ferrule 112, into the annular gap 116 (see FIGS. 1 and 2), and forms a sliding seal against the side surface 119 of the ferrule 112. However, the distal end portion 540 may shift laterally with respect to the ferrule 112 while the proximal portion 542 near the opening 584 maintains a seal with the side surface 119 of the ferrule 112. As the distal end portion 540 shifts, the wiping element 532 is wiped across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47).

By way of another non-limiting example, the sleeve 530 may be compressed or otherwise deformed to slide the wiping element 532 laterally across the polished end-face 122 to remove contaminants therefrom.

Sixth Embodiment

Figure 14:
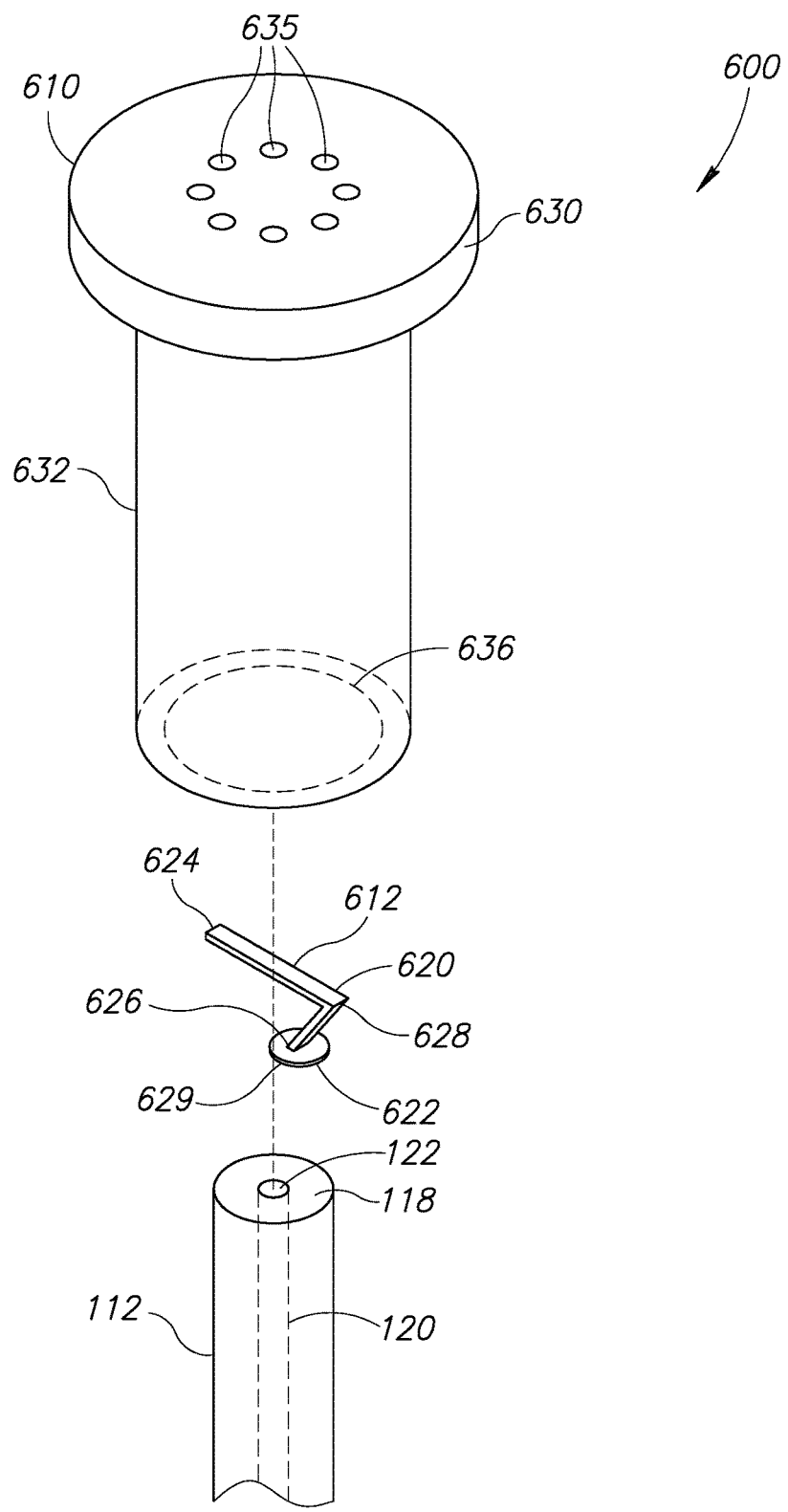
FIG. 14 is an exploded side perspective view of a sixth embodiment of a dust cap having a wiping element that includes a wiping member supported by an arm.

FIGS. 14-18 depict an alternate embodiment of a dust cap 600. Referring to FIG. 14, the dust cap 600 includes a cover or cap member 610 and a wiping element 612. The cap member 610 may be constructed from any material suitable for constructing a conventional dust cap. For ease of illustration, in FIGS. 15-17, the cap member 610 is transparent.

Referring to FIG. 14, in this embodiment, the wiping element 612 includes a finger or arm 620 supporting a planar disk-shaped wiping member 622. The wiping member 622 may be constructed from any material suitable for constructing the wiping element 132 (see FIG. 2). The arm 620 has a proximal end 624 and a distal end 626. The wiping member 622 is mounted on the distal end 626 of the arm 620, and (as explained below) the proximal end 624 of the arm 620 is coupled to the cap member 610. The arm 620 includes a bend 628 positioned between its proximal and distal ends 624 and 626. The arm 620 is configured to collapse or fold along the bend 628 when its distal end 626 is pressed toward its proximal end 624. The wiping member 622 has a wiping surface 629 configured to wipe across and clean the polished end-face 122 of the optical fiber 120.

Figure 15:
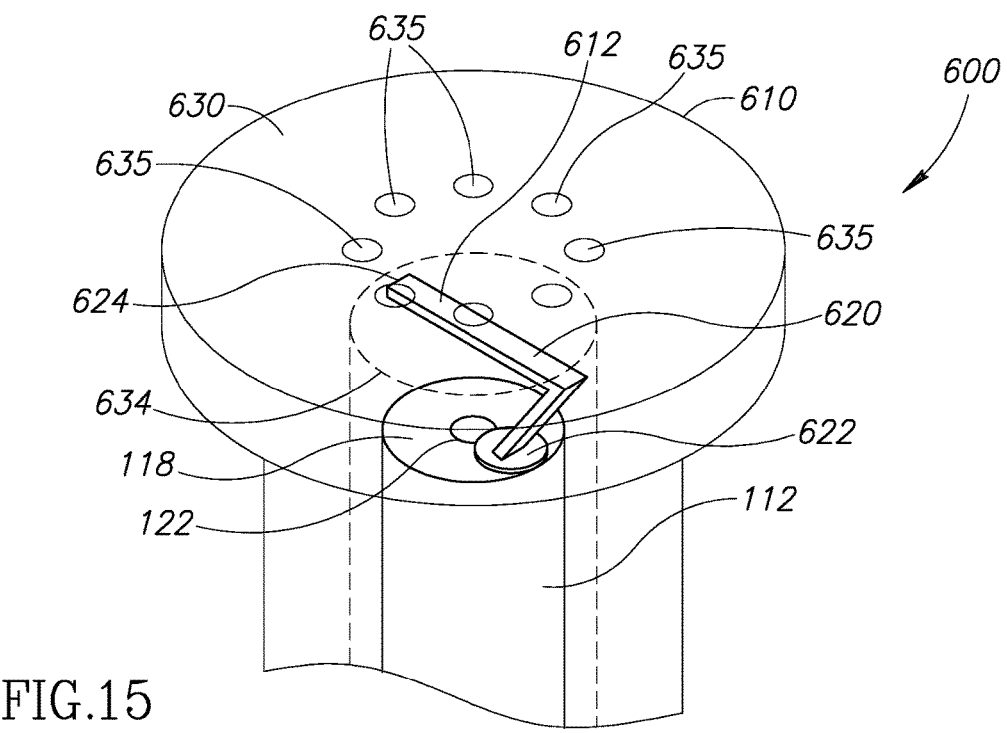
FIG. 15 is a perspective view of the dust cap of FIG. 14 and the ferrule as the ferrule first engages the wiping member.

The cap member 610 has a disk-shaped distal end portion 630 attached to a hollow cylindrically shaped proximal portion 632. Referring to FIG. 15, the distal end portion 630 has an inside surface 634 that faces into the hollow interior of the proximal portion 632. Optionally, the distal end portion 630 may include one or more through-holes 635 configured to function as air vents and allow air to flow into the proximal portion 632. Referring to FIG. 14, the ferrule 112 is received inside the cap member 610 through an opening 636 formed in the proximal portion 632 opposite the distal end portion 630. The ferrule 112 extends through the proximal portion 632 toward the distal end portion 630.

Figure 16:
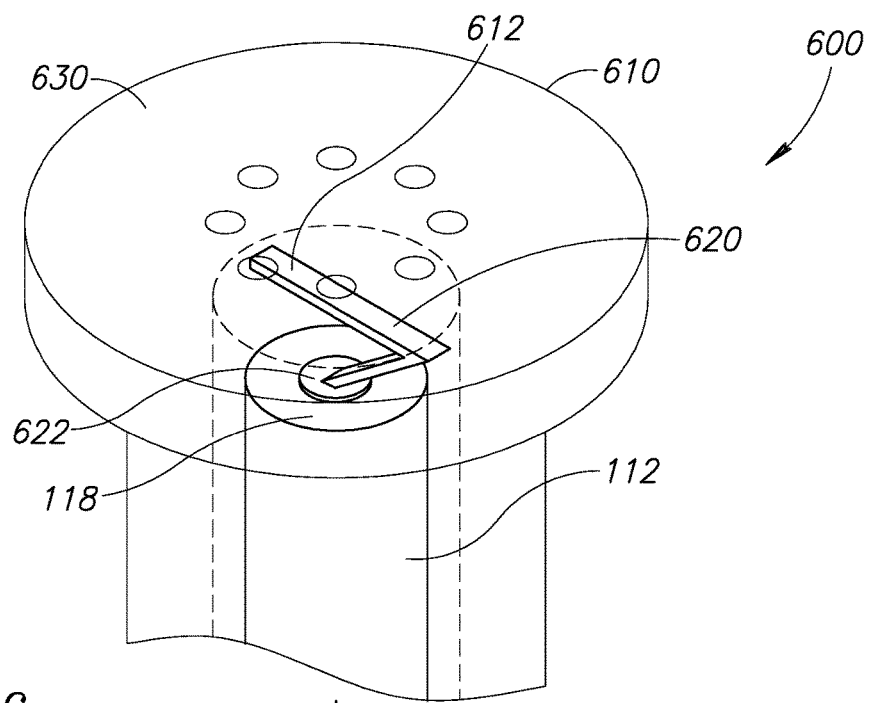
FIG. 16 is a perspective view of the dust cap of FIG. 14 and the ferrule as the ferrule presses on the wiping member and folds or collapses the arm causing the wiping member to wipe across the end of the ferrule.
Figure 17:
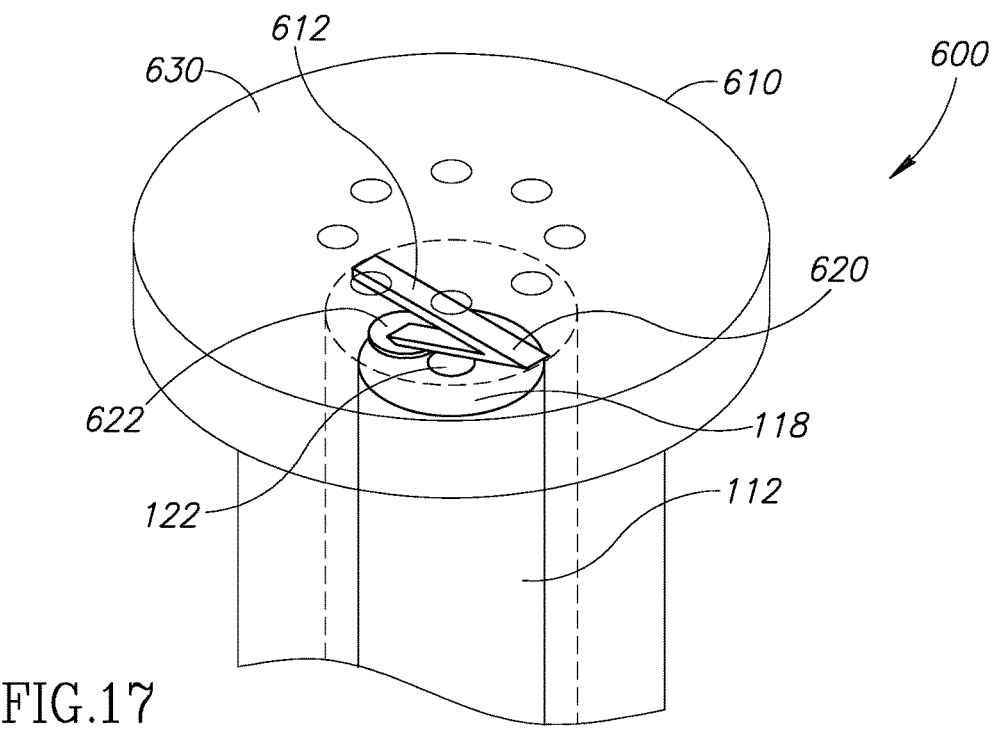
FIG. 17 is a perspective view of the dust cap of FIG. 14 with the ferrule received fully therein.

Referring to FIG. 15, the proximal end 624 of the arm 620 of the wiping element 612 is coupled to the inside surface 634 of the cap member 610. The arm 620 positions the wiping member 622 to engage the end surface 118 of the ferrule 112 when the ferrule 112 is inserted into the cap member 610 as shown in FIG. 15. As the ferrule 112 is inserted, it presses on the wiping member 622 toward the distal end portion 630, which causes the arm 620 to compress or fold. As shown in FIGS. 15-17, as the arm 620 compresses or folds, the wiping member 622 moves laterally and wipes across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47).

When the ferrule 112 is removed from the cap member 610, the arm 620 unfolds and returns to its uncompressed configuration. As the arm 620 unfolds, the wiping member 622 may move laterally and wipe across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47) a second time.

The wiping member 622 may rotate or swivel with respect to the distal end 626 (see FIG. 14) of the arm 620 such that the wiping surface 629 (see FIG. 14) of the wiping member 622 remains substantially engaged with the polished end-face 122 of the optical fiber 120 (see FIGS. 1, 2, 9, 12, 14, 20A, 22, 24, 42, 44A, and 47) as the arm 620 folds and/or unfolds.

Figure 18:
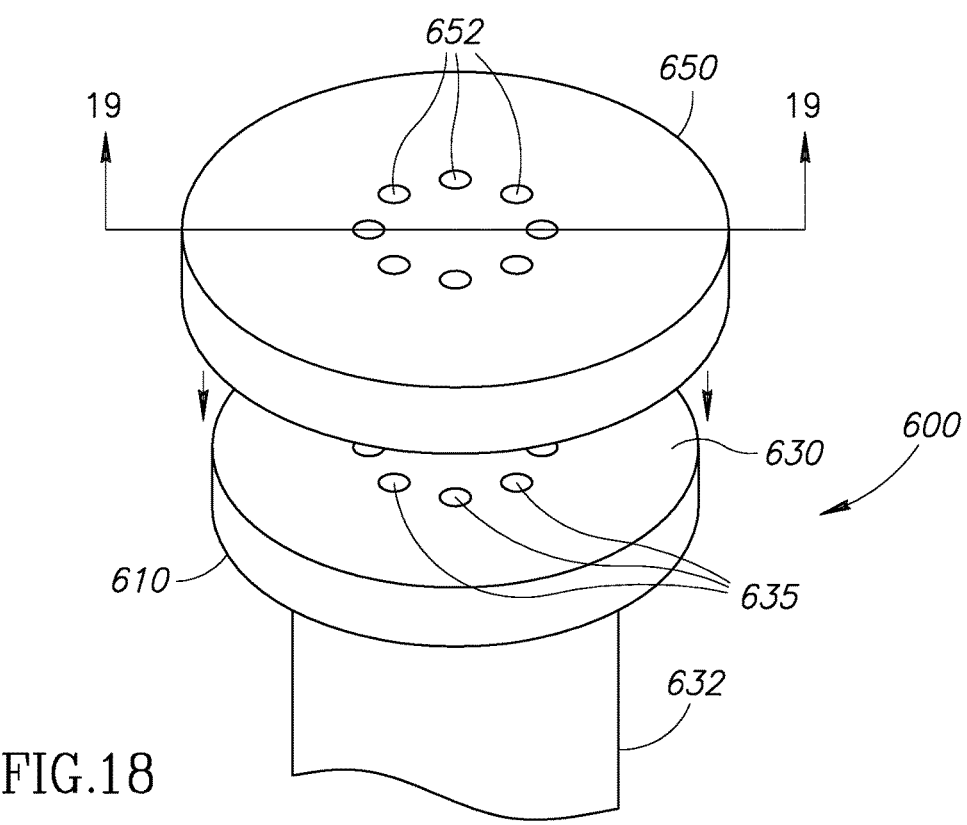
FIG. 18 is a perspective view of the dust cap of FIG. 14 and an optional outer cover.

Referring to FIG. 18, optionally, the dust cap 600 may include an outer cover 650. The optional outer cover 650 is configured to be snapped onto the disk-shaped distal end portion 630 of the cap member 610. The optional outer cover 650 includes through-holes 652 positioned to be aligned with the one or more through-holes 635 formed in the distal end portion 630 of the cap member 610. The through-holes 652 function as air vents and allow air to flow therethrough and into the one or more through-holes 635.

Figure 19:
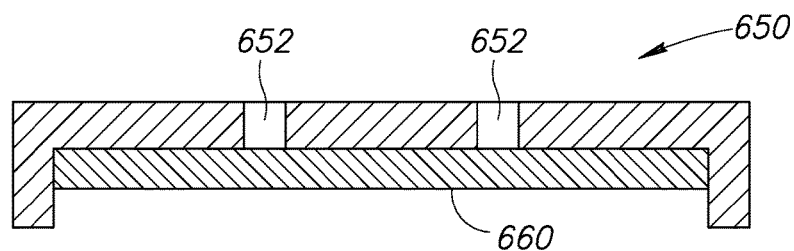
FIG. 19 is a cross-sectional view of the optional outer cover taken through line 19-19 of FIG. 18.

Referring to FIG. 19, the optional outer cover 650 includes a filter member 660 positioned adjacent the through-holes 652. When the optional outer cover 650 is snapped onto the distal end portion 630, the filter member 660 is sandwiched therebetween and filters air traveling between the through-holes 652 and the one or more through-holes 635 to prevent contaminants (e.g., dust) from encountering the end surface 118 (see FIGS. 2, 9, 12, 14-17, 20A-22, 24, 36, 41, 42, and 44A) of the ferrule 112 (see FIGS. 1, 2, 9, 11-17, 20A-25B, 28, 36, 38, 41, 42, 44A-45, and 47-48C) when the ferrule 112 is inside the cap member 610 (see FIGS. 14-18, 20A-23, and 26-28).

Seventh Embodiment

Figure 20A:
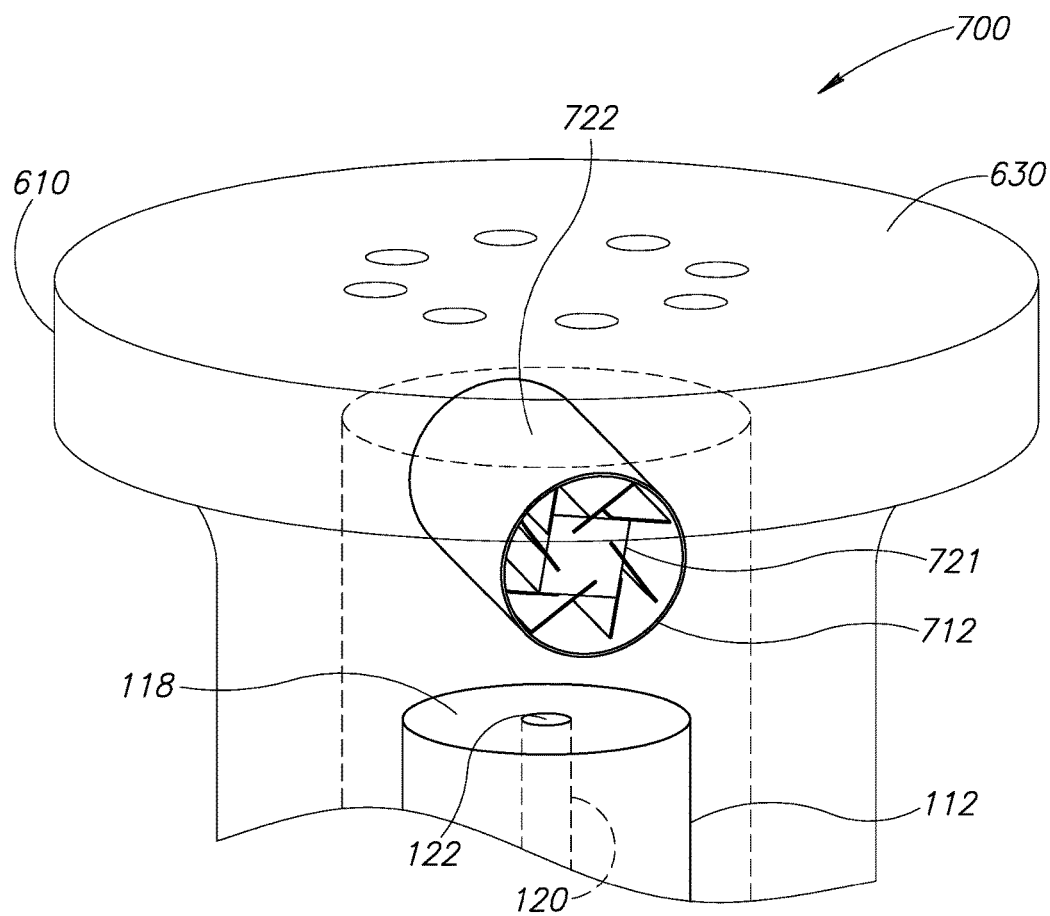
FIG. 20A is a perspective view of a seventh embodiment of a dust cap before the ferrule engages a wiping element that includes a plurality of vanes mounted on a spindle inside an open-ended hollow cylindrically-shaped (or drum-shaped) wiping member.
Figure 20B:
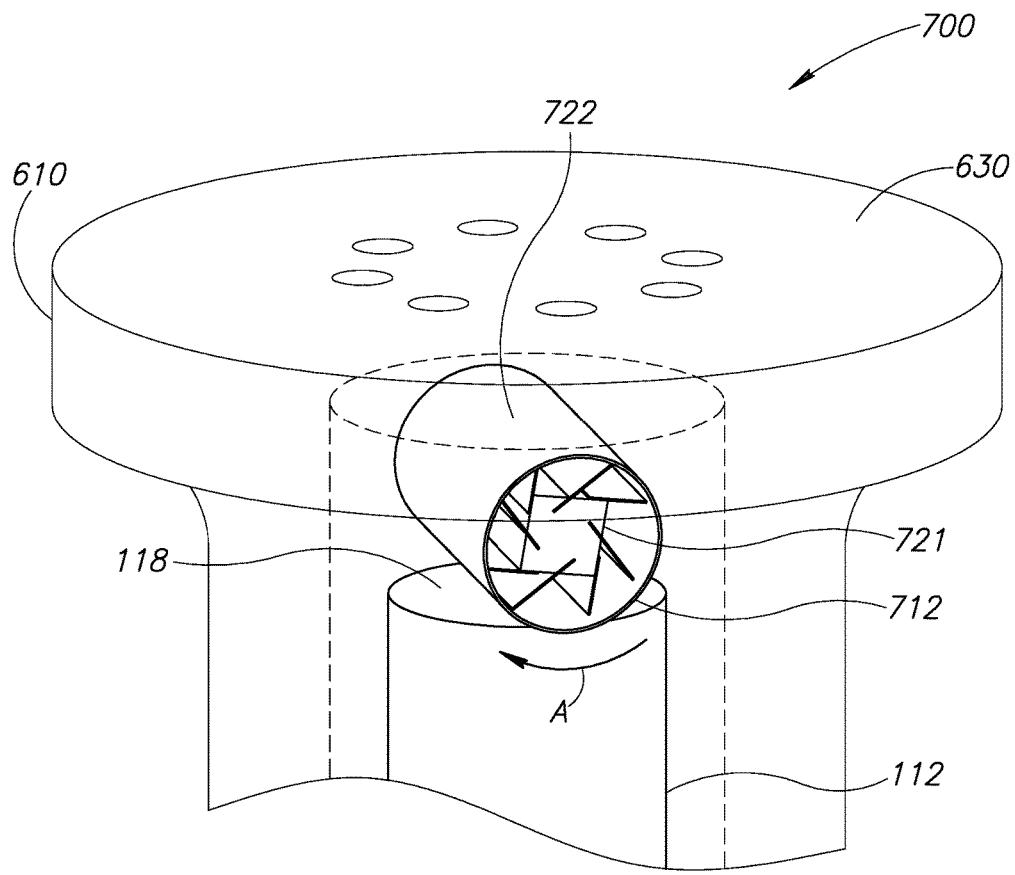
FIG. 20B is a perspective view of the dust cap of FIG. 20A with the ferrule received fully inside the dust cap and engaging the wiping element.

FIGS. 20A and 20B depict an alternate embodiment of a dust cap 700. The dust cap 700 includes the cap member 610 and a wiping element 712. Optionally, the dust cap 700 may include the outer cover 650 (see FIGS. 18 and 19). For ease of illustration, in FIGS. 20A and 20B, the cap member 610 is transparent.

Figure 21:
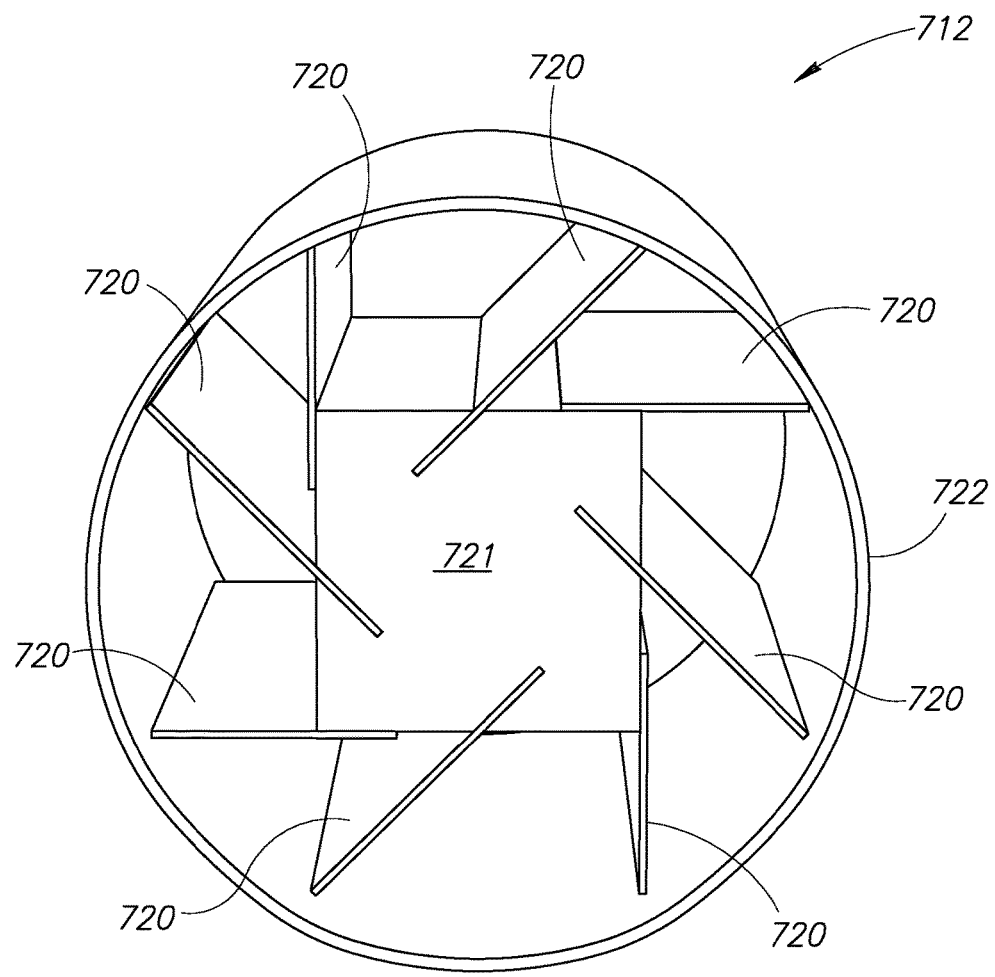
FIG. 21 is an enlarged perspective view of the wiping element of FIGS. 20A and 20B.

FIG. 21 provides an enlarged view of the wiping element 712. Referring to FIG. 21, the wiping element 712 includes a plurality of ratchet arms or vanes 720 mounted on a spindle 721 inside an open-ended hollow cylindrically-shaped or drum-shaped wiping member 722. The vanes 720 are fixedly attached to the spindle 721 and rotate therewith as a unit between a disengaged position (FIG. 20A) and a fully engaged position (FIG. 20B). Referring to FIGS. 20A and 20B, the wiping member 722 is positioned to engage the end surface 118 of the ferrule 112 when the ferrule 112 is inserted into the cap member 610. The wiping member 722 may be constructed from any material suitable for constructing the wiping element 132 (see FIG. 2).

When the ferrule 112 is inserted into the cap member 610 and engages the wiping member 722, the ferrule 112 presses the wiping member 722 toward the distal end portion 630 of the cap member 610. The wiping member 722 presses upon the vanes 720 (see FIG. 21), which cause the spindle 721 and the vanes 720 to rotate (in a direction identified by an arrow "A" in FIG. 20B) toward the fully engaged position (FIG. 20B). As the spindle 721 and the vanes 720 rotate, the vanes 720 push on and rotate the wiping member 722 (in the direction identified by the arrow "A" in FIG. 20B). As the wiping member 722 rotates, clean portions of the wiping member 722 wipe across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47).

When the wiping member 722 is no longer being pressed toward the distal end portion 630 of the cap member 610 by the ferrule 112 (e.g., when the ferrule 112 is removed from the cap member 610), the vanes 720, spindle 721, and the wiping member 722 may shift outwardly away from the distal end portion 630 of the cap member 610 but may remain in the same orientation. In other words, removing the ferrule 112 may not cause the wiping element 712 to rotate (e.g., in a direction opposite the direction identified by the arrow "A" in FIG. 20B). Thus, the vanes 720 and spindle 721 function as a ratchet that rotates the wiping member 722 only in the direction identified by the arrow "A," which exposes the end surface 118 of the ferrule 112 to a different portion of the wiping member 722 when the ferrule 112 is inserted more than once or different ferrules are inserted into the dust cap 700.

Referring to FIG. 20B, when the ferrule 112 is inserted into the cap member 610 and engages the wiping member 722, the cap member 610 may be rotated circumferentially around the ferrule 112 to rub the wiping member 722 on the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47) to thereby wipe away any contaminants on the polished end-face 122. Further, the cap member 610 may be deflected laterally to allow the wiping member 722 to slide laterally across the polished end-face 122 (see FIGS. 2, 9, 12, 14, 15, 17, 20A, 22, 24, 42, 44A, and 47) to remove contaminants therefrom. Additionally, the cap member 610 may be compressed or otherwise deformed to slide the wiping member 722 laterally across the polished end-face 122 (see FIGS. 2, 9, 12, 14, 15, 17, 20A, 22, 24, 42, 44A, and 47) to remove contaminants therefrom. In other words, the wiping member 722 may be moved or displaced with respect to the polished end-face 122 (see FIGS. 2, 9, 12, 14, 15, 17, 20A, 22, 24, 42, 44A, and 47) in a manner that wipes or cleans the polished end-face 122.

Eighth Embodiment

Figure 22:
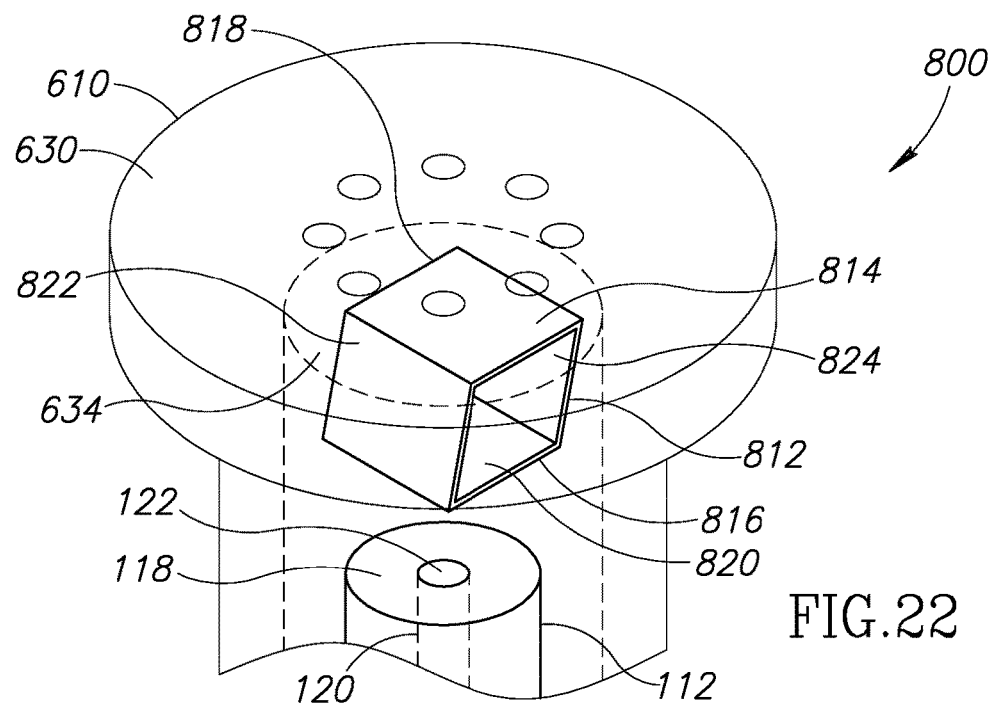
FIG. 22 is a perspective view of an eighth embodiment of a dust cap before the ferrule engages a wiping element of the dust cap.
Figure 23:
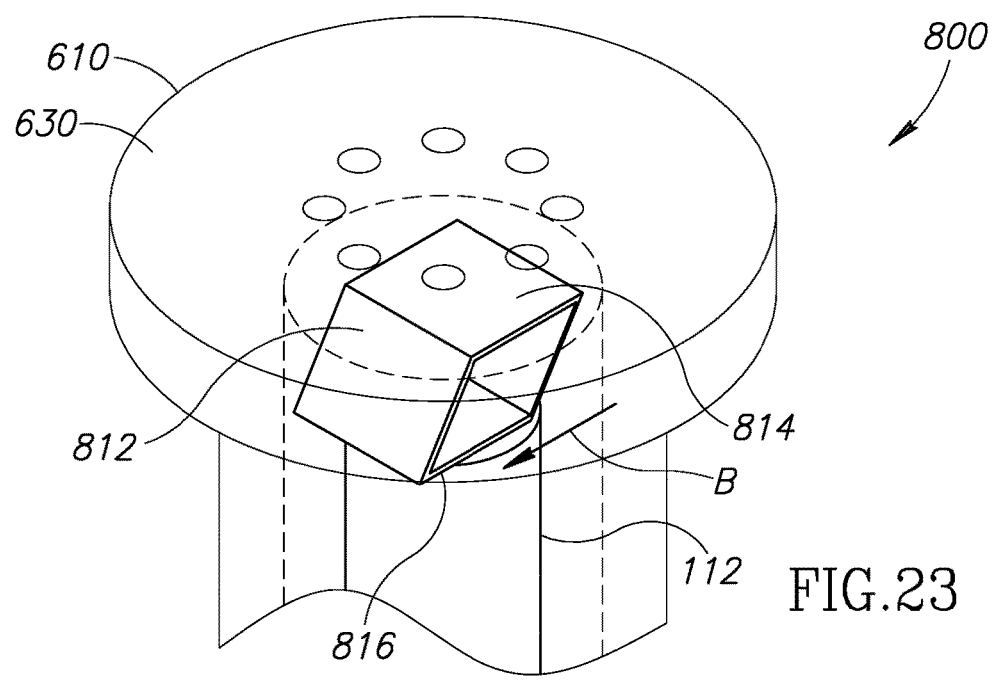
FIG. 23 is a perspective view of the dust cap of FIG. 22 with the ferrule received fully therein.

FIGS. 22 and 23 depict an alternate embodiment of a dust cap 800. The dust cap 800 includes the cap member 610 and a wiping element 812. Optionally, the dust cap 800 may include the outer cover 650 (see FIGS. 18 and 19). For ease of illustration, in FIGS. 22 and 23, the cap member 610 is transparent.

The wiping element 812 is configured to transition between a disengaged configuration (FIG. 22) and a fully engaged configuration (FIG. 23). In this embodiment, the wiping element 812 has a parallelepiped shape with a mounting surface 814 opposite a wiping surface 816. The wiping surface 816 may be constructed from any material suitable for constructing the wiping element 132 (see FIG. 2). In the embodiment illustrated, the mounting surface 814 is an outwardly facing surface of a distal planar member 818, and the wiping surface 816 is an outwardly facing surface of a proximal planar member 820. The distal planar member 818 is connected to the proximal planar member 820 by first and second spaced apart sidewalls 822 and 824. The first and second sidewalls 822 and 824 are substantially parallel with one another. The first and second sidewalls 822 and 824 are at an angle other than perpendicular with the distal and proximal planar members 818 and 820. Together, the first and second sidewalls 822 and 824 and the distal and proximal planar members 818 and 820 may define a cross-sectional shape that is a parallelogram.

The mounting surface 814 is coupled to the inside surface 634 of the distal end portion 630 of the cap member 610. Before the ferrule 112 engages the wiping surface 816 of the wiping element 812 (e.g., before the ferrule 112 is inserted into the cap member 610), the wiping element 812 is in the disengaged configuration (FIG. 22). In this configuration, the mounting surface 814 positions the wiping surface 816 to engage the outwardly facing end surface 118 of the ferrule 112 when the ferrule 112 is inserted into the cap member 610 as shown in FIG. 22.

The wiping element 812 is configured to collapse or fold when the wiping surface 816 is pressed toward the distal end portion 630 by the ferrule 112 and transition from the disengaged configuration (FIG. 22) to the fully engaged configuration (FIG. 23). In the embodiment illustrated, the wiping element 812 folds at and along the intersections of the first and second sidewalls 822 and 824 with the distal and proximal planar members 818 and 820. As the ferrule 112 is inserted, it presses the wiping surface 816 toward the distal end portion 630, which causes the wiping element 812 to compress or fold. As shown in FIGS. 22 and 23, as the wiping element 812 compresses or folds, the wiping surface 816 moves laterally and wipes across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47), which cleans the polished end-face 122 of the optical fiber 120. As shown in FIG. 23, the wiping surface 816 may be large enough to completely cover the polished end-face 122 of the optical fiber 120 when the ferrule 112 is fully inserted in the cap member 610 and the wiping element 812 is in the fully engaged configuration (FIG. 23).

The wiping element 812 may be configured to unfold or otherwise return to the disengaged configuration (FIG. 22) when the ferrule 112 is removed from the dust cap 800. As the ferrule 112 is removed, the wiping surface 816 may move laterally and wipe across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47) a second time to again clean the polished end-face 122 of the optical fiber 120.

Referring to FIG. 23, when the ferrule 112 is inserted into the cap member 610 and is pressed against the wiping surface 816, the cap member 610 may be rotated circumferentially around the ferrule 112 to rub the wiping surface 816 on the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47) to thereby wipe away any contaminants on the polished end-face 122. Further, the cap member 610 may be deflected laterally to allow the wiping surface 816 to slide laterally across the polished end-face 122 (see FIGS. 2, 9, 12, 14, 15, 17, 20A, 22, 24, 42, 44A, and 47) to remove contaminants therefrom. Additionally, the cap member 610 may be compressed or otherwise deformed to slide the wiping surface 816 laterally across the polished end-face 122 (see FIGS. 2, 9, 12, 14, 15, 17, 20A, 22, 24, 42, 44A, and 47) to remove contaminants therefrom. In other words, the wiping surface 816 may be moved or displaced with respect to the polished end-face 122 (see FIGS. 2, 9, 12, 14, 15, 17, 20A, 22, 24, 42, 44A, and 47) in a manner that wipes or cleans the polished end-face 122.

Ninth Embodiment

Figure 24:
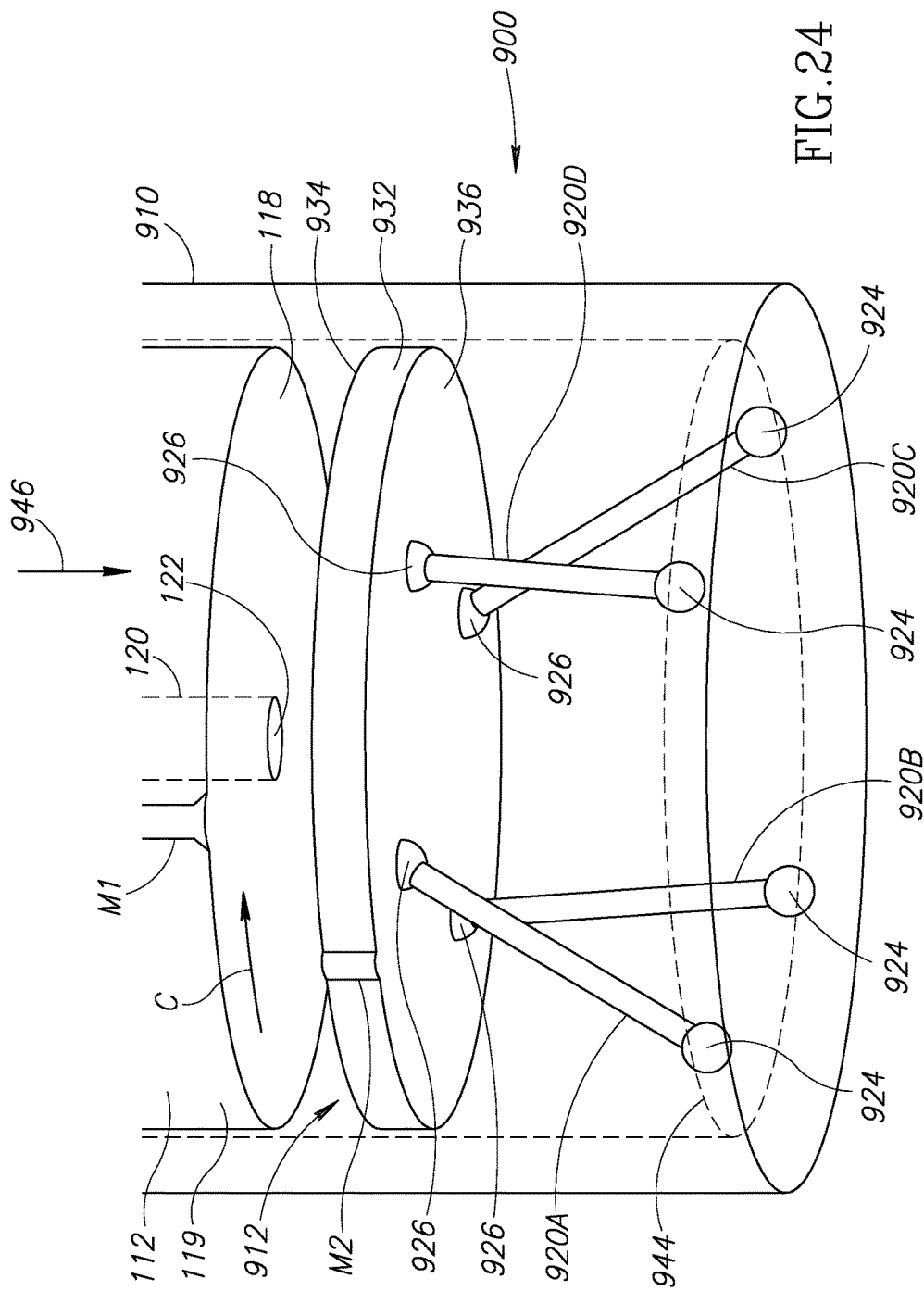
FIG. 24 is a perspective view of a ninth embodiment of a dust cap before the ferrule engages a wiping assembly of the dust cap.
Figure 25A:
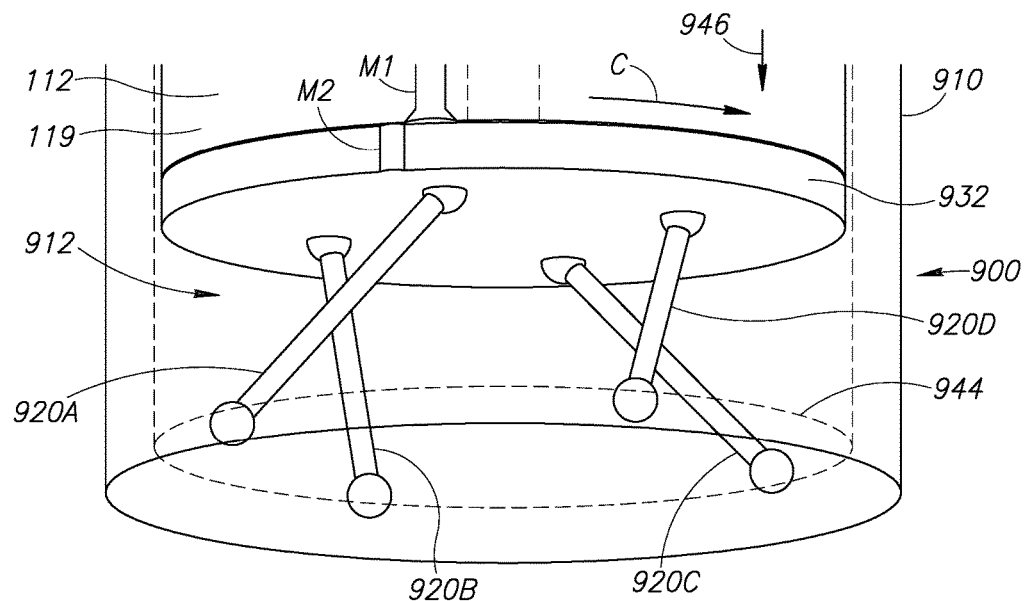
FIG. 25A is a perspective view of the dust cap of FIG. 24 with the ferrule partially received therein.
Figure 25B:
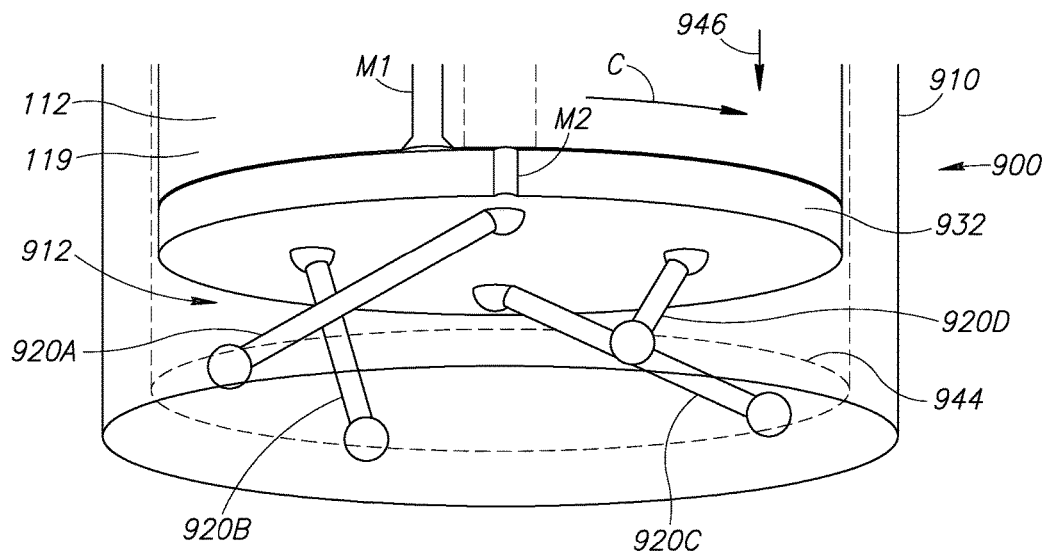
FIG. 25B is a perspective view of the dust cap of FIG. 24 with the ferrule received fully therein.

FIGS. 24-25B depict an alternate embodiment of a dust cap 900. The dust cap 900 includes a cap member 910 and a wiping assembly 912. The cap member 910 is substantially similar to the cap member 610 (see FIGS. 14-18, 20A-23, and 26-28). Optionally, the cap member 910 may include through-holes (not shown) substantially similar to the through-holes 652 (see FIGS. 18 and 19) of the cap member 610 (see FIGS. 14-18, 20A-23, and 26-28). In such embodiments, the dust cap 900 may optionally include the outer cover 650 (see FIGS. 18 and 19).

The wiping assembly 912 is configured to transition between a disengaged configuration (FIG. 24) and a fully engaged configuration (FIG. 25B). Referring to FIG. 24, the wiping assembly 912 includes a plurality of pivot arms 920A-920D and a wiping element 932. For ease of illustration, in FIGS. 24-25B, the cap member 910 has been illustrated as being transparent. Therefore, the pivot arms 920A-920D, the wiping element 932, and an end portion of the ferrule 112 are drawn using solid lines. However, in these figures, the pivot arms 920A-920D, the wiping element 932, and the end portion of the ferrule 112 are positioned inside the cap member 910.

Referring to FIG. 24, the wiping element 932 may be constructed from any material suitable for constructing the wiping element 132 (see FIG. 2). The wiping element 932 is generally disk shaped. The wiping element 932 has an outwardly facing wiping surface 934 configured to wipe and clean the polished end-face 122 of the optical fiber 120. Opposite the wiping surface 934, the wiping element 932 has an inwardly facing surface 936.

The pivot arms 920A-920D each have a first end 924 opposite a second end 926. The first end 924 of each of the pivot arms 920A-920D is attached to an inside surface 944 of the cap member 910. The second end 926 is attached to the inwardly facing surface 936 of the wiping element 932. For ease of illustration, in FIGS. 24-25B, a first reference projection or mark M1 has been provided on the side surface 119 of the ferrule 112 and a second reference projection or mark M2 has been provided on the wiping element 932. Referring to FIG. 24, when the dust cap 900 is placed on the ferrule 112, the ferrule 112 travels linearly within the cap member 910 (in an inward direction identified by an arrow 946) from the disengaged configuration (FIG. 24) toward the wiping assembly 912. Referring to FIGS. 25A and 25B, the wiping assembly 912 is configured to automatically transition from the disengaged configuration (FIG. 24) to the fully engaged configuration (FIG. 25B) when the outwardly facing end surface 118 (see FIGS. 2, 9, 12, 14-17, 20A-22, 24, 36, 41, 42, and 44A) of the ferrule 112 presses against the wiping element 932 of the wiping assembly 912. The pivot arms 920A-920D are each configured to pivot toward the inside surface 944 of the cap member 910 when the wiping element 932 is pressed toward the inside surface 944 of the cap member 910 by the ferrule 112. As the pivot arms 920A-920D pivot toward the inside surface 944, the pivot arms 920A-920D press on and rotate the wiping element 932 (in a forward rotational direction identified by a curved arrow "C"). This rotation may be seen in FIGS. 24-25B by the displacement of the second reference mark M2 with respect to the first reference mark M1 as the ferrule 112 is inserted further into the cap member 910. As the wiping element 932 rotates, it wipes and cleans the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47). Thus, the linear motion of the ferrule 112 is converted or translated into rotational motion of the wiping element 932.

The center of rotation of the wiping element 932 may be eccentric with respect to the ferrule 112. Optionally, the pivot arms 920A-920D may have different lengths which will cause them to move the wiping element 932 laterally in addition to rotating the wiping element 932.

Referring to FIG. 24, when the ferrule 112 is fully inserted into the cap member 910 (as shown in FIG. 25B) and is pressed against the wiping surface 934, the cap member 910 may be rotated circumferentially around the ferrule 112 to rub the wiping surface 934 on the polished end-face 122 of the optical fiber 120 to thereby wipe away any contaminants on the polished end-face 122. Further, the cap member 910 may be deflected laterally to allow the wiping surface 934 to slide laterally across the polished end-face 122 to remove contaminants therefrom. Additionally, the cap member 910 may be compressed or otherwise deformed to slide the wiping surface 934 laterally across the polished end-face 122 to remove contaminants therefrom. In other words, the wiping surface 934 may be moved or displaced with respect to the polished end-face 122 in a manner that wipes or cleans the polished end-face 122.

When the ferrule 112 is removed from the cap member 910, the pivot arms 920A-920D return to the disengaged configuration shown in FIG. 24. As the pivot arms 920A-920D return to the disengaged configuration, they push the wiping element 932 in an outward direction opposite the inward direction identified by the arrow 946 and rotate the wiping element 932 in a backward rotational direction opposite the forward rotational direction identified by the curved arrow "C" in FIGS. 25A and 25B.

Tenth Embodiment

Figure 26:
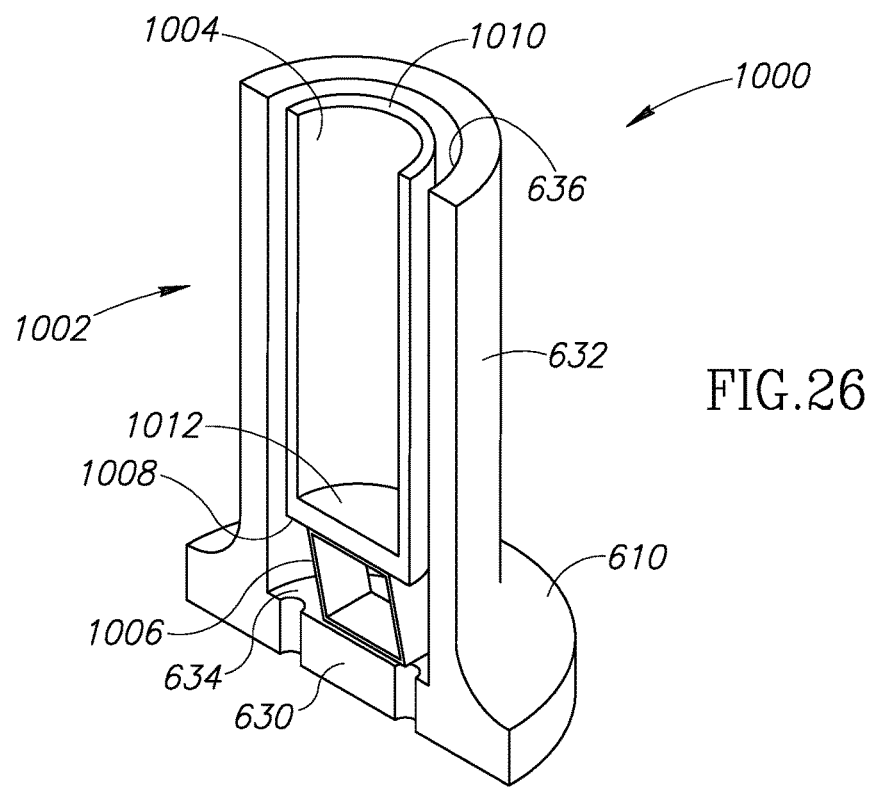
FIG. 26 is a cross-sectional view of a tenth embodiment of a dust cap taken through line 26-26 of FIG. 27.
Figure 27:
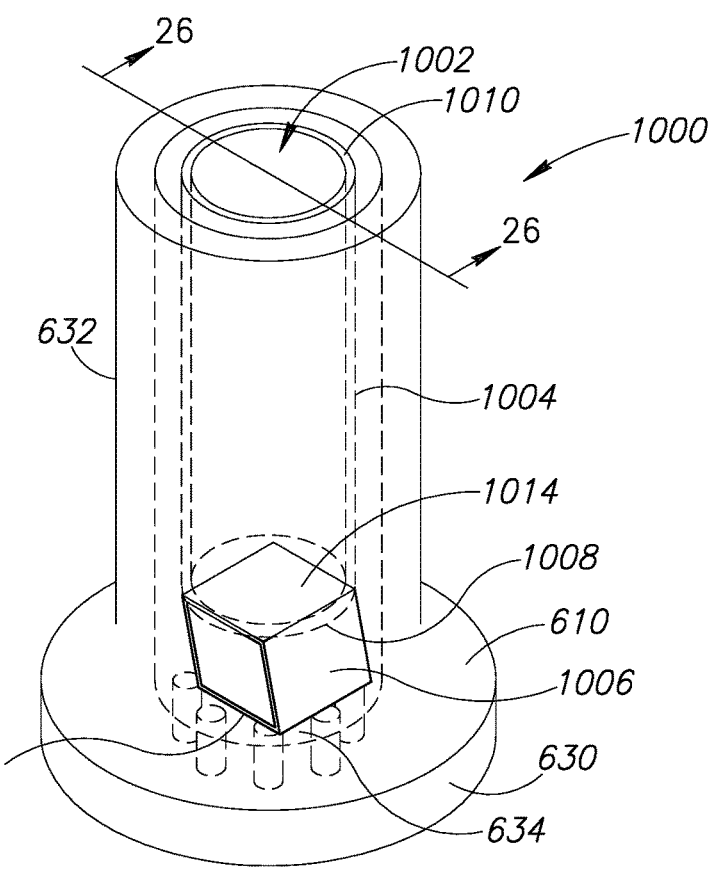
FIG. 27 is a perspective view of the dust cap of FIG. 26 before the ferrule is inserted therein.
Figure 28:
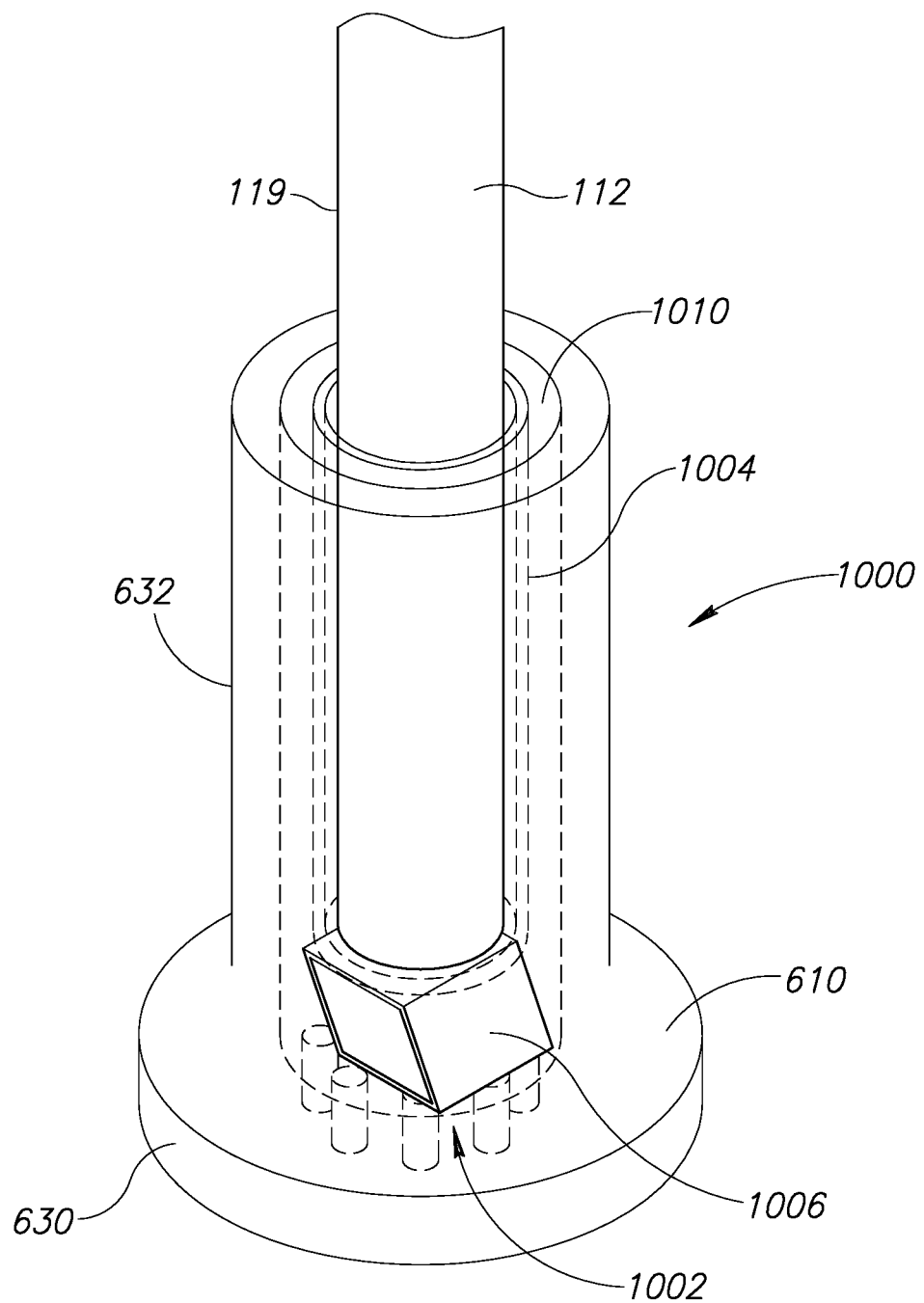
FIG. 28 is a perspective view of the dust cap of FIG. 26 with the ferrule received fully therein.

FIGS. 26-28 depict an alternate embodiment of a dust cap 1000. The dust cap 1000 includes the cap member 610 and a wiping assembly 1002. Optionally, the dust cap 1000 may include the outer cover 650 (see FIGS. 18 and 19). For ease of illustration, in FIGS. 27 and 28, the cap member 610 is transparent.

The wiping assembly 1002 is configured to transition between a disengaged configuration (FIGS. 26 and 27) and a fully engaged configuration (FIG. 28). Referring to FIG. 26, the wiping assembly 1002 includes a wiping sleeve 1004 coupled to a displacement member 1006. The displacement member 1006 is positioned inside the cap member 610 and coupled to the inside surface 634 (see FIG. 26) of the distal end portion 630 of the cap member 610. The displacement member 1006 is positioned between the inside surface 634 (see FIG. 26) and the wiping sleeve 1004. The displacement member 1006 is configured to shift the wiping sleeve 1004 laterally within the cap member 610.

The wiping sleeve 1004 extends along at least a portion of the inside of the proximal portion 632 of the cap member 610. The wiping sleeve 1004 is hollow and has an interior shape configured to correspond to the outer shape of the ferrule 112 (see FIGS. 1, 2, 9, 11-17, 20A-25B, 28, 36, 38, 41, 42, 44A-45, and 47-48C), and an exterior shape configured to correspond to the inner shape of the proximal portion 632 of the cap member 610. Thus, in the embodiment illustrated, the interior and exterior shapes of the wiping sleeve 1004 are both cylindrical. Referring to FIG. 28, the wiping sleeve 1004 wipes and cleans at least a portion of the side surface 119 of the ferrule 112 upon insertion into and/or removal from to the dust cap 1000.

Referring to FIG. 26, the wiping sleeve 1004 has a closed distal end 1008 opposite an open proximal end 1010. The open proximal end 1010 may be adjacent the opening 636 in the cap member 610 through which the ferrule 112 may be inserted. The closed distal end 1008 has a wiping surface 1012 constructed from any material suitable for constructing the wiping element 132 (see FIG. 2). Depending upon the implementation details, the wiping sleeve 1004 may be constructed entirely or partially from any material suitable for constructing the wiping element 132 (see FIG. 2).

In this embodiment, the displacement member 1006 has a parallelepiped shape that may be substantially identical to that of the wiping element 812 (see FIGS. 22 and 23). However, the displacement member 1006 need not be constructed from a wiping material or have any surfaces that are constructed from a wiping material. Instead, referring to FIG. 28, the displacement member 1006 laterally displaces the wiping sleeve 1004, and wipes the wiping surface 1012 (see FIG. 26) across the end surface 118 (see FIGS. 2, 9, 12, 14-17, 20A-22, 24, 36, 41, 42, and 44A) of the ferrule 112 when the ferrule 112 is inserted into the dust cap 1000.

Referring to FIG. 27, in the embodiment illustrated, the displacement member 1006 has a first surface 1014 that is parallel and opposite to a second surface 1016. The first surface 1014 is coupled to the closed distal end 1008 of the wiping sleeve 1004. The second surface 1016 is coupled to the inside surface 634 of the distal end portion 630 of the cap member 610.

Before the ferrule 112 (see FIGS. 1, 2, 9, 11-17, 20A-25B, 28, 36, 38, 41, 42, 44A-45, and 47-48C) is inserted into the dust cap 1000, the wiping assembly 1002 is in the disengaged configuration (FIGS. 26 and 27). In this configuration, the wiping sleeve 1004 may receive the ferrule 112 (see FIGS. 1, 2, 9, 11-17, 20A-25B, 28, 36, 38, 41, 42, 44A-45, and 47-48C) through its open proximal end 1010. The displacement member 1006 is configured to collapse or fold (like the wiping element 812 depicted in FIGS. 22 and 23) when the ferrule 112 (see FIGS. 1, 2, 9, 11-17, 20A-25B, 28, 36, 38, 41, 42, 44A-45, and 47-48C) presses on the closed distal end 1008 of the wiping sleeve 1004 until the wiping assembly 1002 transitions from the disengaged configuration (FIGS. 26 and 27) to the fully engaged configuration (FIG. 28). As shown in FIG. 28, as the displacement member 1006 compresses or folds, the wiping surface 1012 (see FIG. 26) of the closed distal end 1008 moves laterally and wipes across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47), which cleans the polished end-face 122 of the optical fiber 120.

When the ferrule 112 is removed from the dust cap 1000, the wiping assembly 1002 may return automatically to the disengaged configuration shown in FIGS. 26 and 27. As the displacement member 1006 returns to the disengaged configuration, the wiping surface 1012 (see FIG. 26) of the closed distal end 1008 moves laterally and may wipe across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47) a second time to again clean the polished end-face 122 of the optical fiber 120.

Referring to FIG. 28, when the ferrule 112 is inserted into the dust cap 1000 and is pressed against the wiping surface 1012, the cap member 610 may be rotated circumferentially around the ferrule 112 to rub the wiping surface 1012 on the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47) to thereby wipe away any contaminants on the polished end-face 122. Further, the cap member 610 may be deflected laterally to allow the wiping surface 1012 to slide laterally across the polished end-face 122 (see FIGS. 2, 9, 12, 14, 15, 17, 20A, 22, 24, 42, 44A, and 47) to remove contaminants therefrom. Additionally, the cap member 610 may be compressed or otherwise deformed to slide the wiping surface 1012 laterally across the polished end-face 122 (see FIGS. 2, 9, 12, 14, 15, 17, 20A, 22, 24, 42, 44A, and 47) to remove contaminants therefrom. In other words, the wiping surface 1012 may be moved or displaced with respect to the polished end-face 122 (see FIGS. 2, 9, 12, 14, 15, 17, 20A, 22, 24, 42, 44A, and 47) in a manner that wipes or cleans the polished end-face 122.

Eleventh Embodiment

Figure 29:
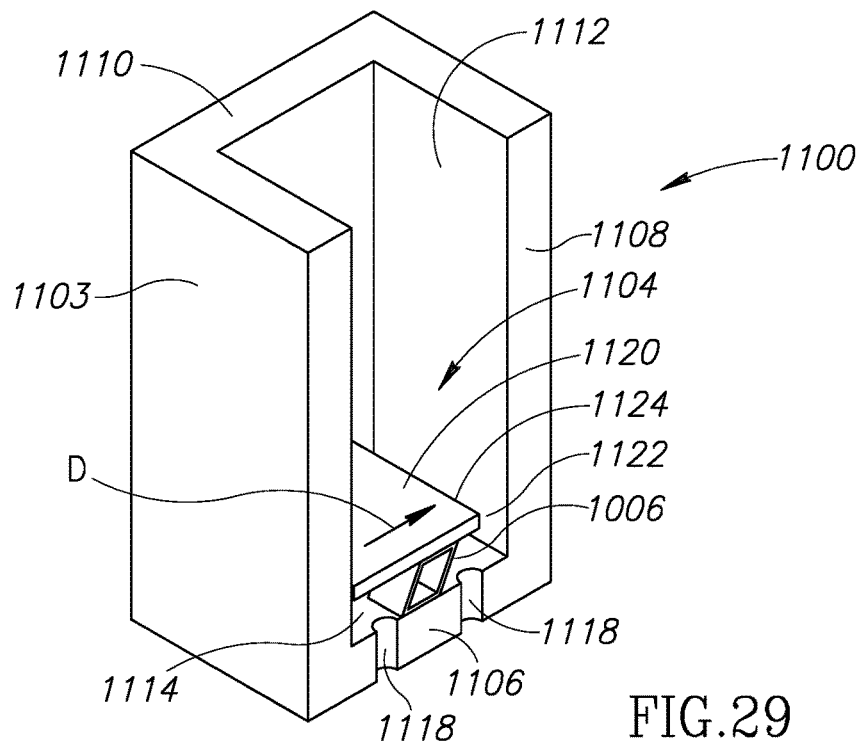
FIG. 29 is a cross-sectional view of an eleventh embodiment of a dust cap taken through line 29-29 of FIG. 30.
Figure 30:
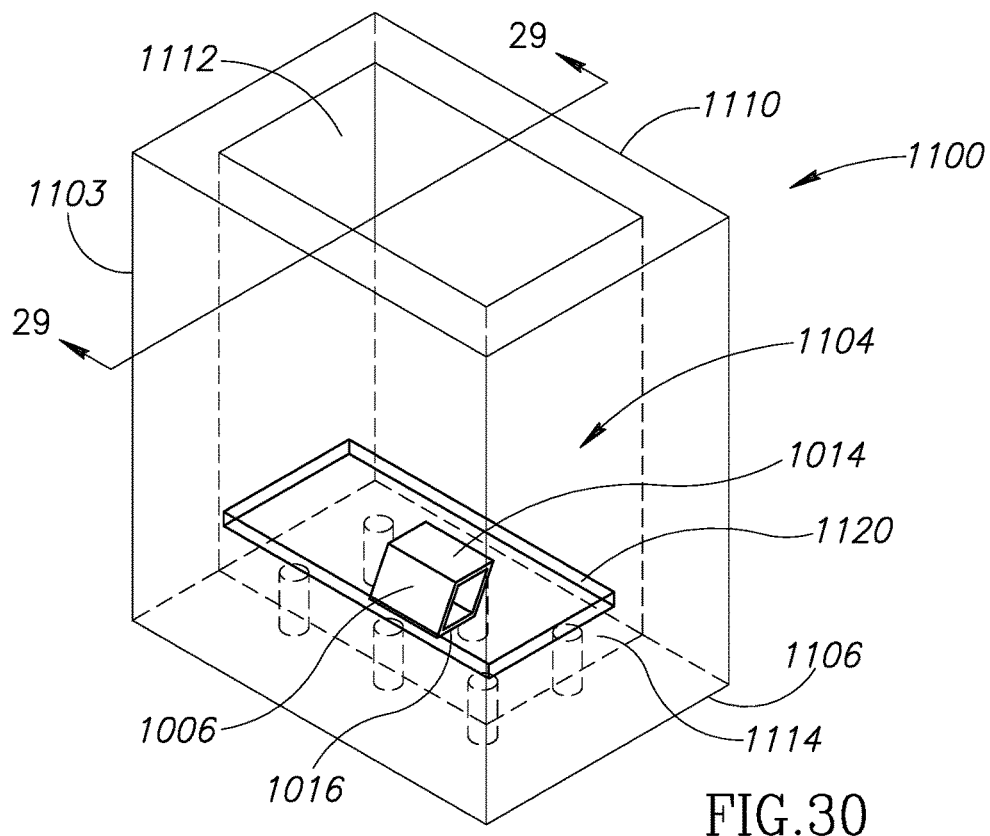
FIG. 30 is a perspective view of the dust cap of FIG. 29 before a ferrule having a square or rectangular cross-sectional shape is inserted therein.
Figure 31:
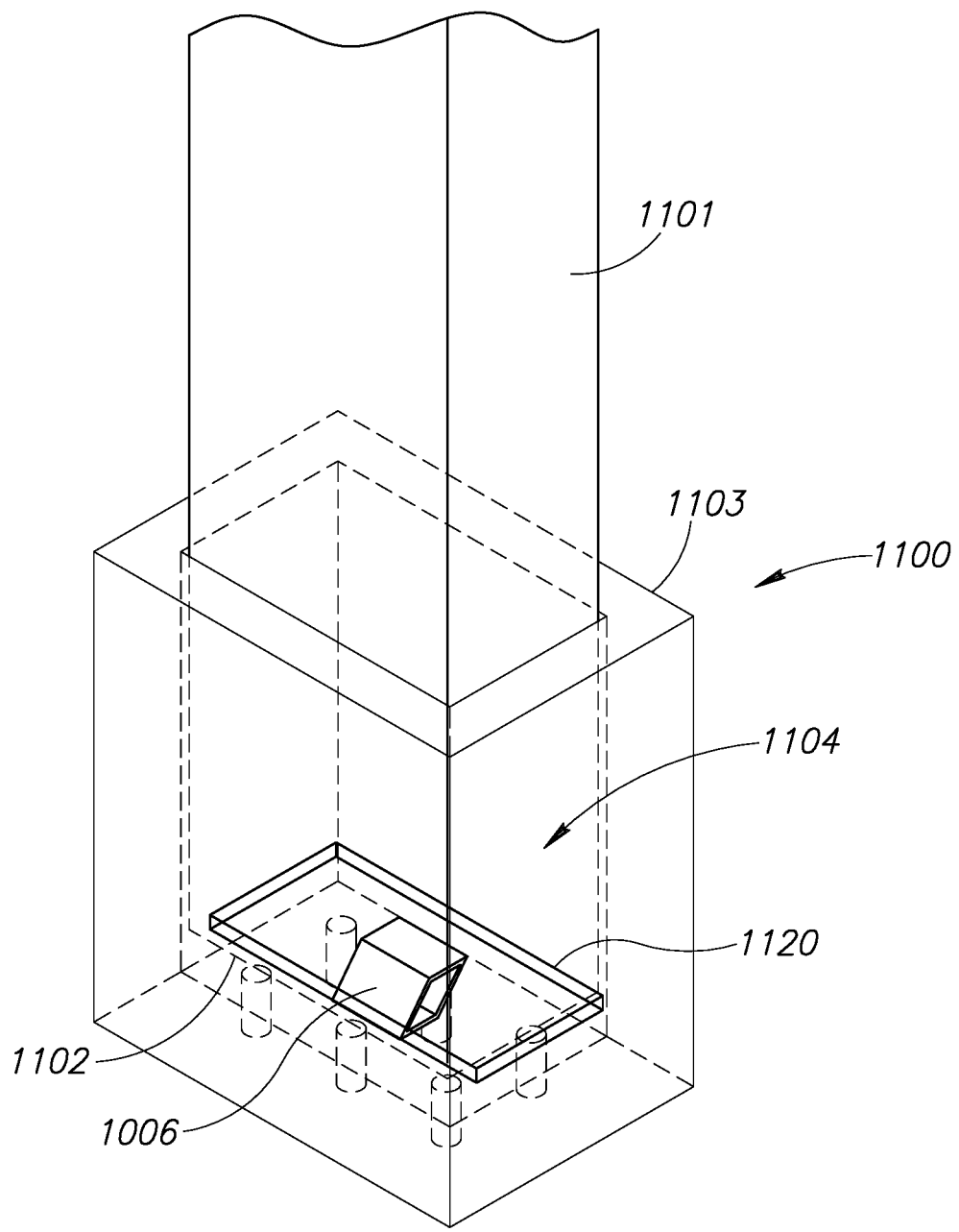
FIG. 31 is a perspective view of the dust cap of FIG. 29 with the ferrule having a square or rectangular cross-sectional shape received fully therein.

FIGS. 29-31 depict an alternate embodiment of a dust cap 1100 for use with a ferrule 1101 (see FIG. 31) having a substantially square or rectangular lateral cross-sectional shape. Non-limiting examples of such connectors include MTP style connectors, and the like. Referring to FIG. 31, the ferrule 1101 has an outwardly facing end surface 1102 substantially similar to the outwardly facing end surface 118 (see FIGS. 2, 9, 12, 14-17, 20A-22, 24, 36, 41, 42, and 44A) of the ferrule 112 (see FIGS. 1, 2, 9, 11-17, 20A-25B, 28, 36, 38, 41, 42, 44A-45, and 47-48C) except that the end surface 1102 is square or rectangular instead of round. The ferrule 1101 includes an optical fiber (not shown) substantially identical to the optical fiber 120 (see FIGS. 1, 2, 9, 12, 14, 20A, 22, 24, 42, 44A, and 47) having a polished end-face (not shown) substantially identical to the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47).

Referring to FIG. 29, the dust cap 1100 includes a cover or cap member 1103 and a wiping assembly 1104. Optionally, the dust cap 1100 may include an outer cover similar to the outer cover 650 (see FIGS. 18 and 19) but configured to snap onto the cap member 1103 instead of the cap member 610 (see FIGS. 14-18, 20A-23, and 26-28). For ease of illustration, in FIGS. 30 and 31, the wiping assembly 1104 has been illustrated using solid lines. However, as shown in FIG. 29, the wiping assembly 1104 is inside the cap member 1103.

The cap member 1103 has a closed end 1106 and a continuous sidewall 1108 that extends away from the closed end 1106. The sidewall 1108 has an open end 1110 opposite the closed end 1106. Together, the sidewall 1108 and the closed end 1106 define a hollow interior 1112 configured to receive the ferrule 1101 (see FIG. 31) through the open end 1110.

The closed end 1106 has an inwardly facing surface 1114. Optionally, one or more through-holes 1118 may be formed in the closed end 1106. The through-holes 1118 are substantially identical to the through-holes 652 (see FIGS. 18 and 19) and function as air vents that allow air to flow therethrough into the cap member 1103.

The wiping assembly 1104 is configured to transition between a disengaged configuration (FIGS. 29 and 30) and a fully engaged configuration (FIG. 31). The wiping assembly 1104 includes a wiping element 1120 coupled to the displacement member 1006. The wiping element 1120 is substantially planar and may be implemented using a sheet material. The wiping element 1120 may be constructed from any material suitable for constructing the wiping element 132 (see FIG. 2). The wiping element 1120 is configured to be shifted laterally (in a direction identified by an arrow "D") by the displacement member 1006. Thus, a gap 1122 exists between an edge 1124 of the wiping element 1120 and the sidewall 1108 of the cap member 1103.

Referring to FIG. 30, the displacement member 1006 is positioned inside the cap member 1103 with its second surface 1016 coupled to the inside surface 1114 of the closed end 1106 of the cap member 1103. The displacement member 1006 is positioned between the closed end 1106 and the wiping element 1120. The first surface 1014 of the displacement member 1006 is coupled to the wiping element 1120.

The wiping assembly 1104 is in the disengaged configuration (FIGS. 29 and 30) before the ferrule 1101 (see FIG. 31) is inserted into the cap member 1103. Referring to FIG. 29, as mentioned above, the displacement member 1006 is configured to shift the wiping element 1120 laterally in the direction identified by the arrow "D" into the gap 1122 within the cap member 1103 when the ferrule 1101 (see FIG. 31) is inserted into the cap member 1103. The displacement member 1006 collapses or folds when the ferrule 1101 presses on the wiping element 1120 until the wiping assembly 1104 transitions from the disengaged configuration (FIGS. 29 and 30) to the fully engaged configuration (FIG. 31). As shown in FIG. 31, as the displacement member 1006 compresses or folds, the wiping element 1120 moves laterally and wipes across the end surface 1102 of the ferrule 1101, which cleans the polished end-face (not shown) of the optical fiber (not shown) of the ferrule 1101. When the ferrule 1101 is removed from the cap member 1103, the wiping assembly 1104 may return automatically to the disengaged configuration shown in FIGS. 29 and 30. As the wiping assembly 1104 returns to the disengaged configuration, the wiping element 1120 may move laterally and wipe across the end surface 1102 of the ferrule 1101 a second time to again clean the polished end-face (not shown) of the optical fiber (not shown) of the ferrule 1101.

Referring to FIG. 31, when the ferrule 1101 is inserted into the dust cap 1000 and is pressed against the wiping element 1120, the cap member 1103 may be deflected laterally to allow the wiping element 1120 to slide laterally across at least a portion of the end surface 1102 of the ferrule 1101 to remove contaminants from the polished end-face (not shown) of the optical fiber (not shown). Additionally, the cap member 1103 may be compressed or otherwise deformed to slide the wiping element 1120 laterally across at least a portion of the end surface 1102 of the ferrule 1101 to remove contaminants from the polished end-face (not shown) of the optical fiber (not shown). In other words, the wiping element 1120 may be moved or displaced with respect to the end surface 1102 of the ferrule 1101 in a manner that wipes or cleans contaminants from the polished end-face (not shown) of the optical fiber (not shown).

Twelfth Embodiment

Figure 32:
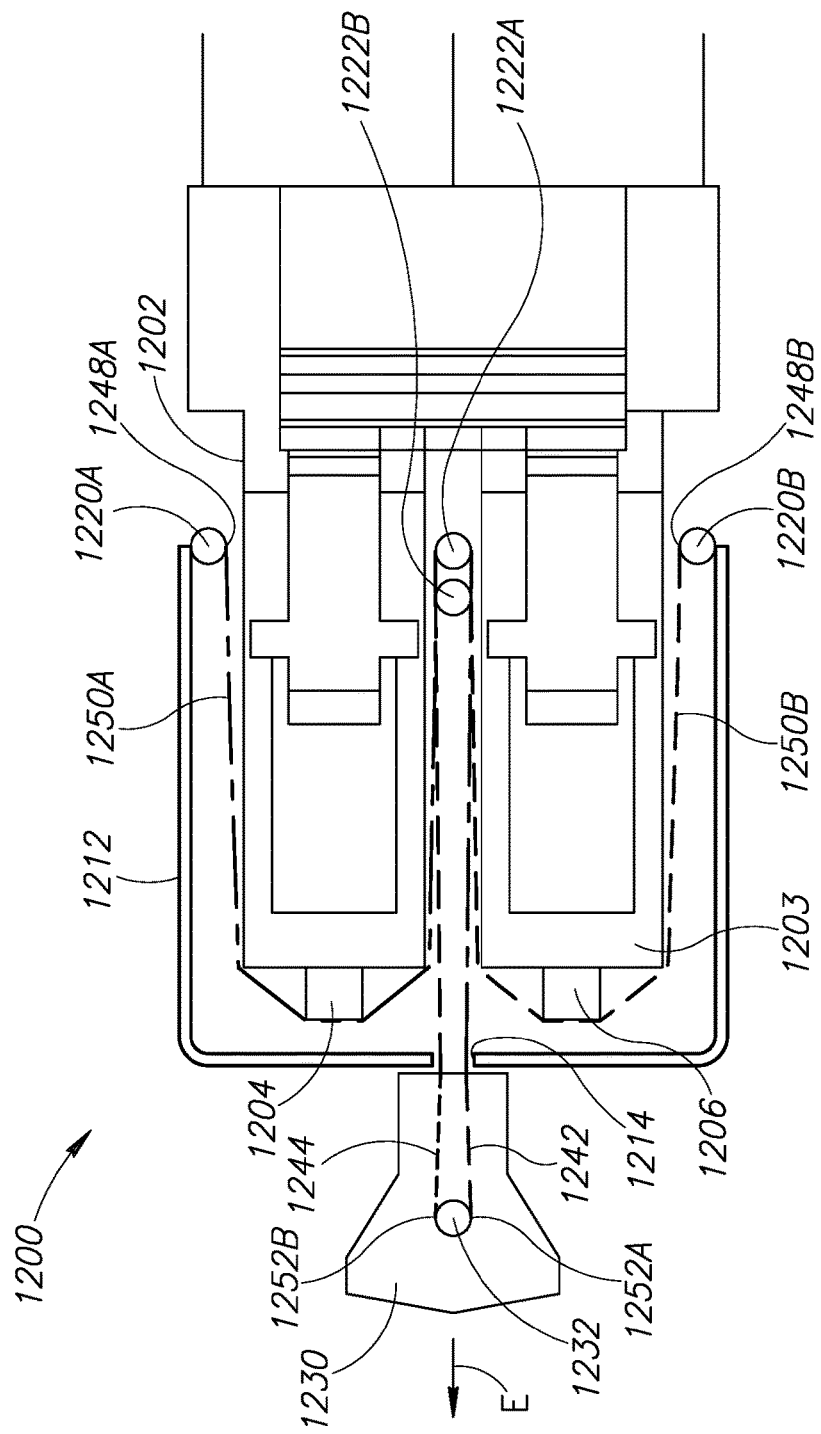
FIG. 32 is a cross-sectional view of a twelfth embodiment of a dust cap installed on a mating end of a fiber optic connector having a pair of ferrules each having an end surface.
Figure 33:
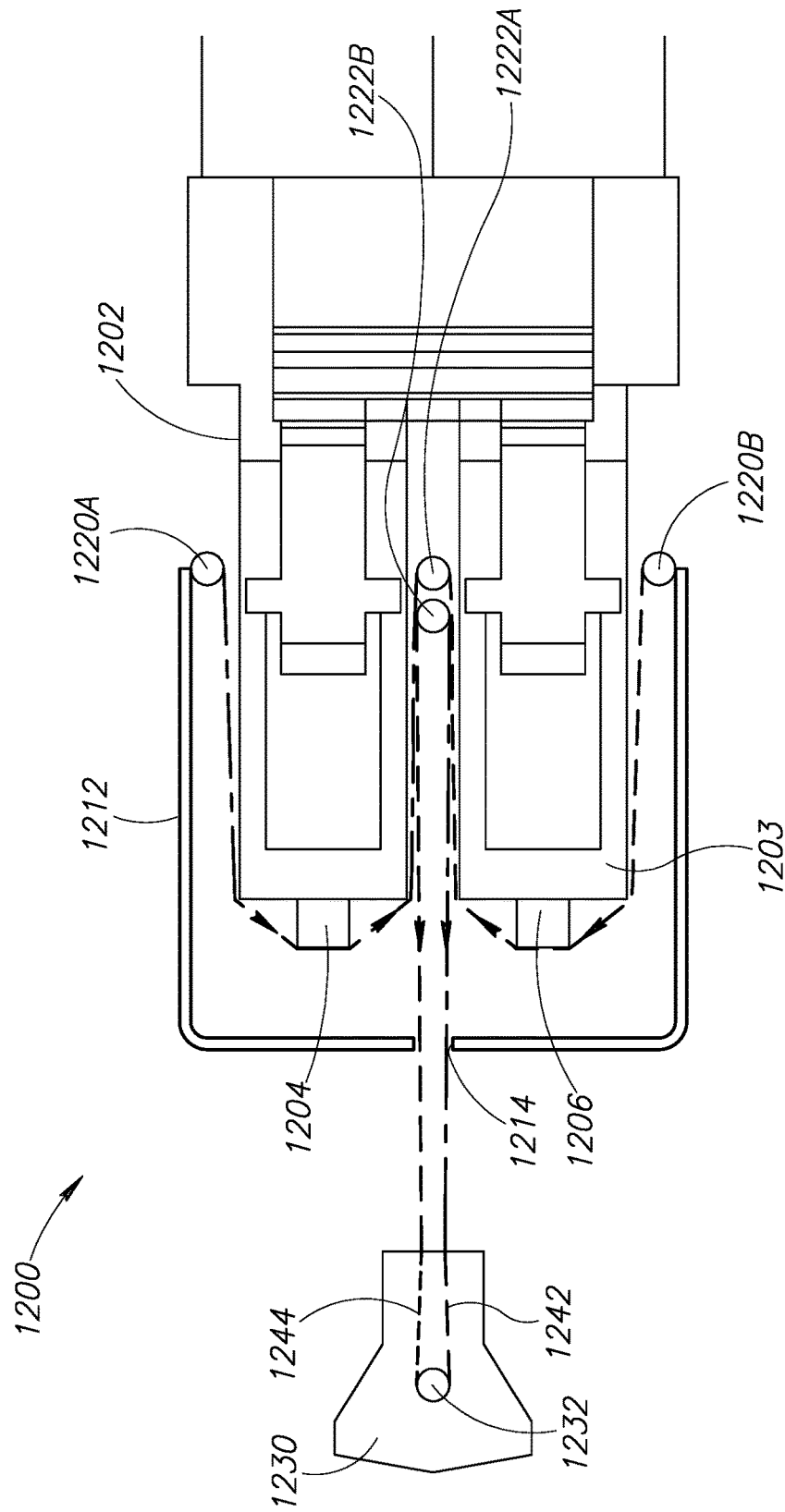
FIG. 33 is a cross-sectional view of the dust cap of FIG. 32 with its pull member being pulled away from the mating end of the fiber optic connector to thereby pull wiping tapes coupled to the pull member across the end surfaces of the ferrules.
Figure 34:
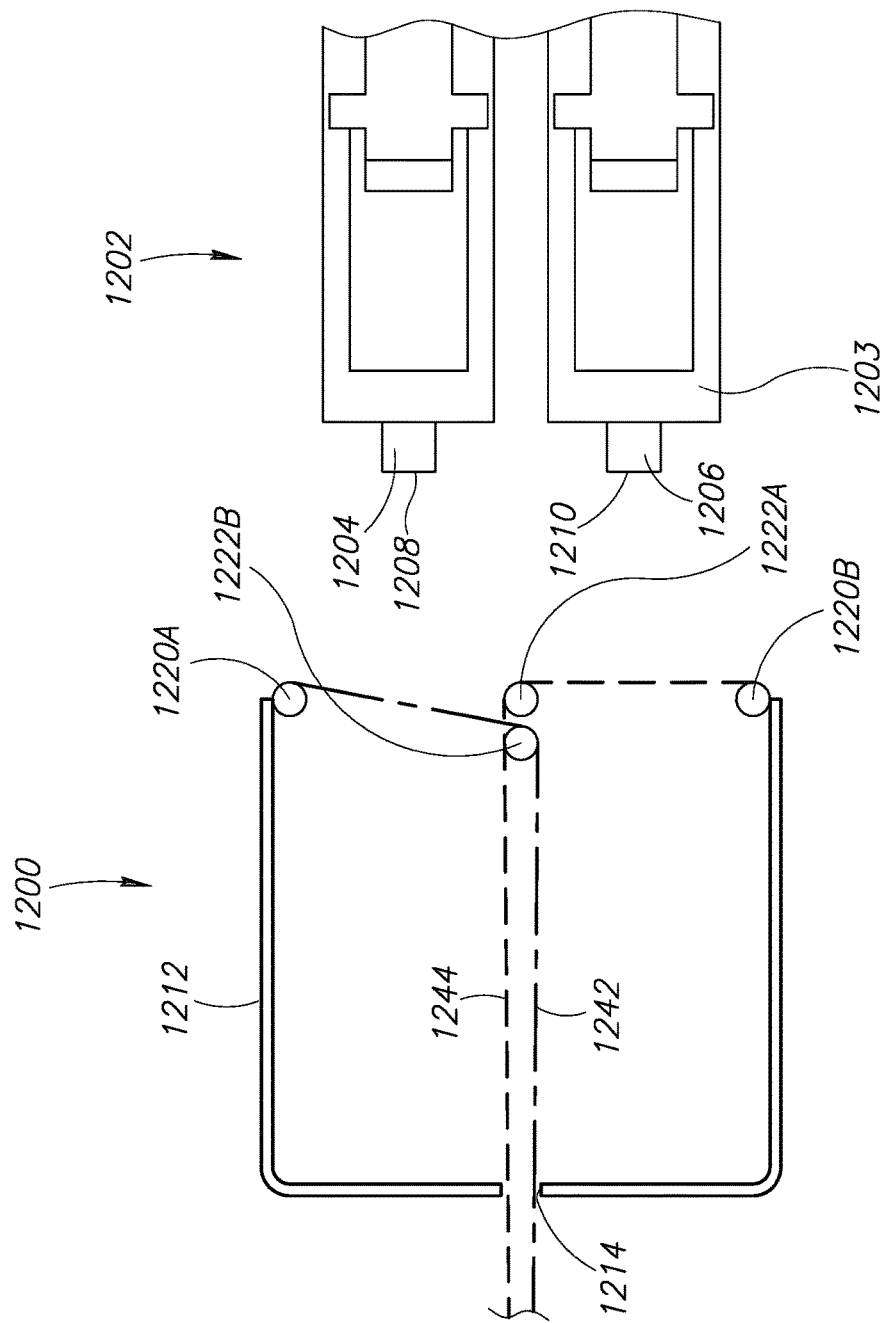
FIG. 34 is a cross-sectional view of the dust cap of FIG. 32 removed completely from the mating end of the fiber optic connector.

FIGS. 32-34 depict an alternate embodiment of a dust cap 1200 for use with a fiber optic connector 1202. The fiber optic connector 1202 has a mating end 1203 with one or more ferrules each having an end surface. In the embodiment illustrated, the fiber optic connector 1202 has a first ferrule 1204 and a second ferrule 1206. Referring to FIG. 34, the first ferrule 1204 has a first end surface 1208, and the second ferrule 1206 has a second end surface 1210. The first and second end surfaces 1208 and 1210 may each be substantially similar to the outwardly facing end surface 118 (see FIGS. 2, 9, 12, 14-17, 20A-22, 24, 36, 41, 42, and 44A) of the ferrule 112 (see FIGS. 1, 2, 9, 11-17, 20A-25B, 28, 36, 38, 41, 42, 44A-45, and 47-48C). Each of the ferrules (e.g., the first and second ferrules 1204 and 1206) includes an optical fiber (not shown) substantially identical to the optical fiber 120 (see FIGS. 1, 2, 9, 12, 14, 20A, 22, 24, 42, 44A, and 47) having a polished end-face (not shown) substantially identical to the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47). By way of a non-limiting example, the fiber optic connector 1202 may be implemented as a MTP style connector, a MPO style connector, a SC style connector, and the like.

Referring to FIG. 32, the dust cap 1200 includes a cover or cap member 1212 configured to fit over the mating end 1203 of the fiber optic connector 1202 and completely cover the one or more ferrules (e.g., the first and second ferrules 1204 and 1206) of the fiber optic connector 1202. The cap member 1212 is configured to grip the mating end 1203 but is removable therefrom when pulled with sufficient force in a direction identified by an arrow "E." The cap member 1212 has a through-hole 1214 formed therein. The cap member 1212 includes a tape anchor and a tape guide for each ferrule. Thus, in the embodiment illustrated, the cap member 1212 includes a tape anchor 1220A and a tape guide 1222A for the first ferrule 1204, and a tape anchor 1220B and a tape guide 1222B for the second ferrule 1206.

The dust cap 1200 includes a pull member 1230 configured to be gripped by a user and pulled in the direction identified by the arrow "E." The pull member 1230 includes a tape anchor 1232. The dust cap 1200 includes a wiping tape for each ferrule. Thus, in the embodiment illustrated, the cap member 1212 includes first and second wiping tapes 1242 and 1244 for the first and second ferrules 1204 and 1206, respectively. By way of a non-limiting example, the first and second wiping tapes 1242 and 1244 may each be implemented as an optical cleaning tape. By way of a non-limiting example, suitable cleaning tape such as that found in the Cletop Cassette Cleaner, effective in the removal of oil, grease, dust and other contaminants from fiber optic connector end faces and ferrule surfaces, may be purchased from Cletop.com of McKinney, Tex. A first end portion 1248A of the first wiping tape 1242 is coupled to the tape anchor 1220A. An intermediate portion 1250A of the first wiping tape 1242 extends from the tape anchor 1220A, wraps around the tape guide 1222A, and extends through the through-hole 1214 toward the pull member 1230. A second end portion 1252A of the first wiping tape 1242 is coupled to the tape anchor 1232 of the pull member 1230. In other words, the first wiping tape 1242 extends from the tape anchor 1232 through the through-hole 1214 around the tape guide 1222A and is coupled to the tape anchor 1220A. Thus, the tape anchor 1232 is tethered to the tape anchor 1220A by the first wiping tape 1242.

A first end portion 1248B of the second wiping tape 1244 is coupled to the tape anchor 1220B. An intermediate portion 1250B of the second wiping tape 1244 extends from the tape anchor 1220B, wraps around the tape guide 1222B, and extends through the through-hole 1214 toward the pull member 1230. A second end portion 1252B of the second wiping tape 1244 is coupled to the tape anchor 1232 of the pull member 1230. In other words, the second wiping tape 1244 extends from the tape anchor 1232 through the through-hole 1214 around the tape guide 1222B and is coupled to the tape anchor 1220B. Thus, the tape anchor 1232 is tethered to the tape anchor 1220B by the second wiping tape 1244.

To clean the end surfaces 1208 and 1210 (see FIG. 34) of the first and second ferrules 1204 and 1206, respectively, the user pulls the pull member 1230 in the direction identified by the arrow "E," which pulls the cap member 1212 therewith in the direction identified by the arrow "E." As the cap member 1212 moves in the direction identified by the arrow "E," the intermediate portions 1250A and 1250B of the first and second wiping tapes 1242 and 1244, respectively, wipe across the end surfaces 1208 and 1210 (see FIG. 34), respectively, of the first and second ferrules 1204 and 1206, respectively, and remove contaminants therefrom. The user may continue to pull on the pull member 1230 to thereby pull on the first and second wiping tapes 1242 and 1244 (which are tethered to the tape anchors 1220A and 1220B, respectively) and disengage the cap member 1212 from the mating end 1203 of the fiber optic connector 1202.

Optionally, referring to FIG. 34, after the dust cap 1200 is disengaged from the mating end 1203 of the fiber optic connector 1202, the dust cap 1200 may be reused by placing the dust cap 1200 over the mating end 1203 of the fiber optic connector 1202 or a different fiber optic connector. As the dust cap 1200 is placed over the mating end 1203 of the fiber optic connector 1202, the first and second ferrules 1204 and 1206 press on the first and second wiping tapes 1242 and 1244, respectively, which will pull the pull member 1230 (see FIGS. 32 and 33) back to its original position illustrated in FIG. 32. In other words, the mating end 1203 of the fiber optic connector 1202 retracts the first and second wiping tapes 1242 and 1244 and pulls the pull member 1230 (see FIGS. 32 and 33) back to its original position. As the first and second wiping tapes 1242 and 1244 retract, they will wipe across the end surfaces 1208 and 1210, respectively, of the first and second ferrules 1204 and 1206, respectively, and remove contaminants therefrom.

Thirteenth Embodiment

Figure 35:
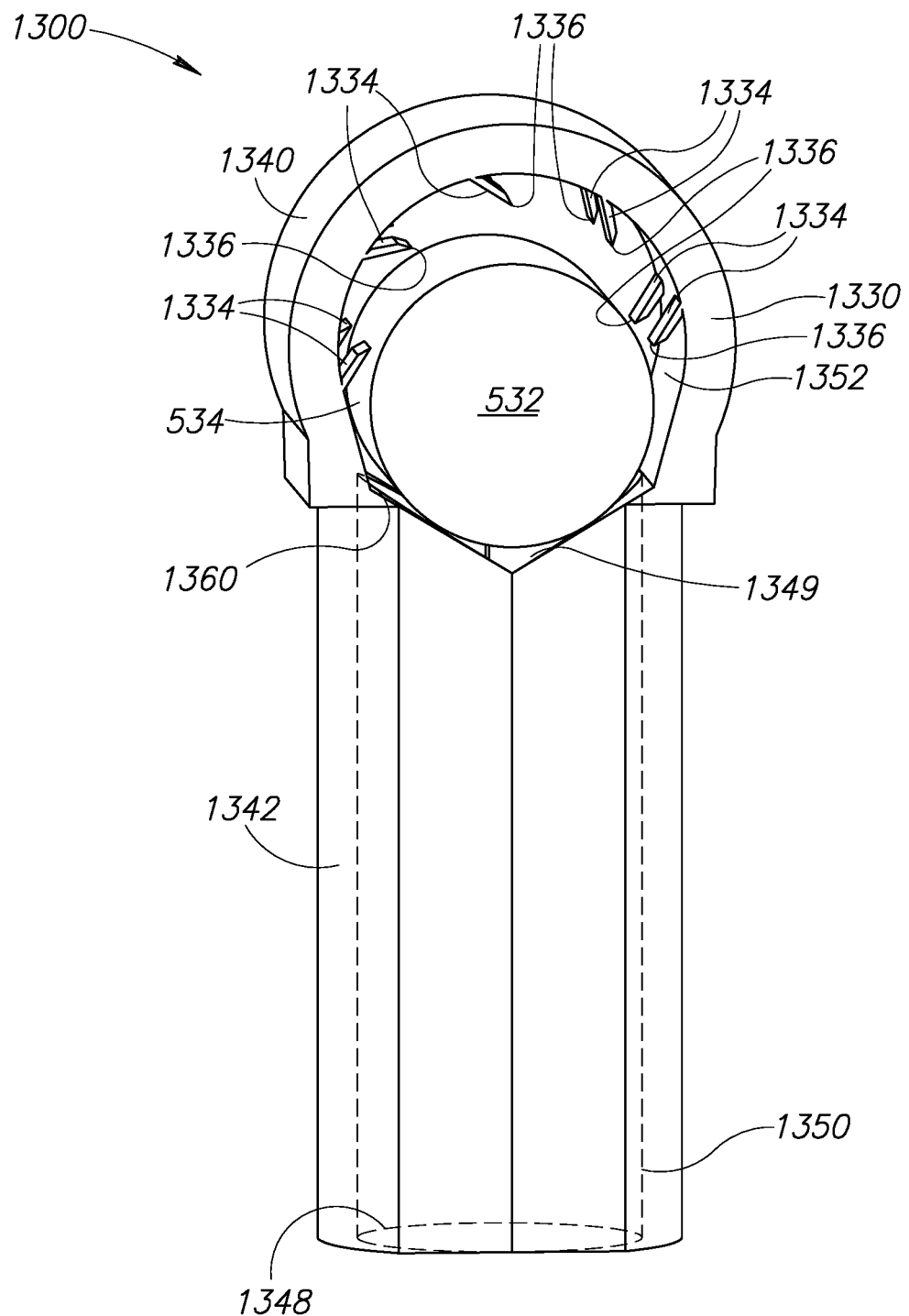
FIG. 35 is a perspective view of a thirteenth embodiment of a dust cap before the ferrule engages a wiping element of the dust cap.

FIGS. 35-38 depict an alternate embodiment of a dust cap 1300. The dust cap 1300 may be characterized as being a variant of the dust cap 500 (see FIG. 13). Referring to FIG. 35, the dust cap 1300 includes a sleeve 1330 and the wiping element 532.

The sleeve 1330 may be constructed from any material suitable for constructing the sleeve 130 (see FIGS. 1 and 2). The sleeve 1330 is substantially similar to the sleeve 530 (see FIG. 13) but differs from the sleeve 530 in one main respect. Specifically, the sleeve 1330 includes a plurality of ratchet arms or vanes 1334 that extend inwardly toward the wiping element 532.

Figure 36:
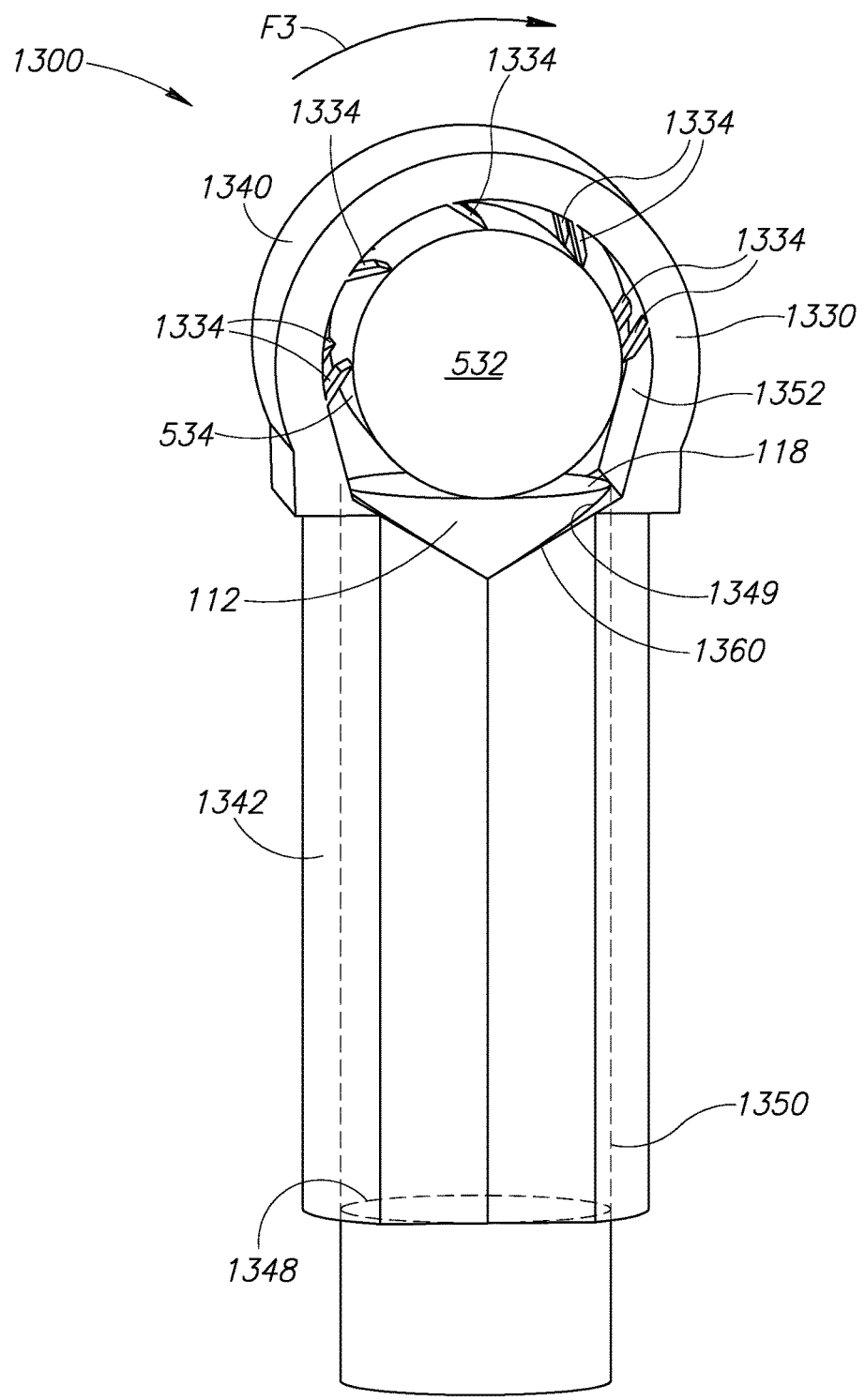
FIG. 36 is a perspective view of the dust cap of FIG. 35 with the ferrule received fully therein.

In the embodiment illustrated, the sleeve 1330 has a generally cylindrically-shaped body portion 1342 connected to a wiping element retaining portion 1340. Referring to FIG. 36, the body portion 1342 is configured to fit snuggly around the ferrule 112. Thus, referring to FIG. 13, the body portion 1342 (see FIGS. 35-38) replaces the curved outer sidewall 546 and the cone-shaped proximal portion 542 of the sleeve 530.

Referring to FIG. 35, an open-ended longitudinally extending central channel 1350 is formed in the body portion 1342. The channel 1350 has a proximal opening 1348 opposite a distal opening 1349. The proximal opening 1348 is substantially identical to the opening 584 (see FIG. 13). Referring to FIG. 36, the ferrule 112 is received inside the sleeve 1330 through the proximal opening 1348. When the ferrule 112 is inserted into the dust cap 1300 through the proximal opening 1348, the body portion 1342 extends along a portion of the ferrule 112, into the annular gap 116 (see FIGS. 1 and 2), and forms a sliding seal against the side surface 119 of the ferrule 112. However, the wiping element retaining portion 1340 may shift laterally with respect to the ferrule 112 while the body portion 1342 maintains a seal with the side surface 119 of the ferrule 112.

Figure 37:
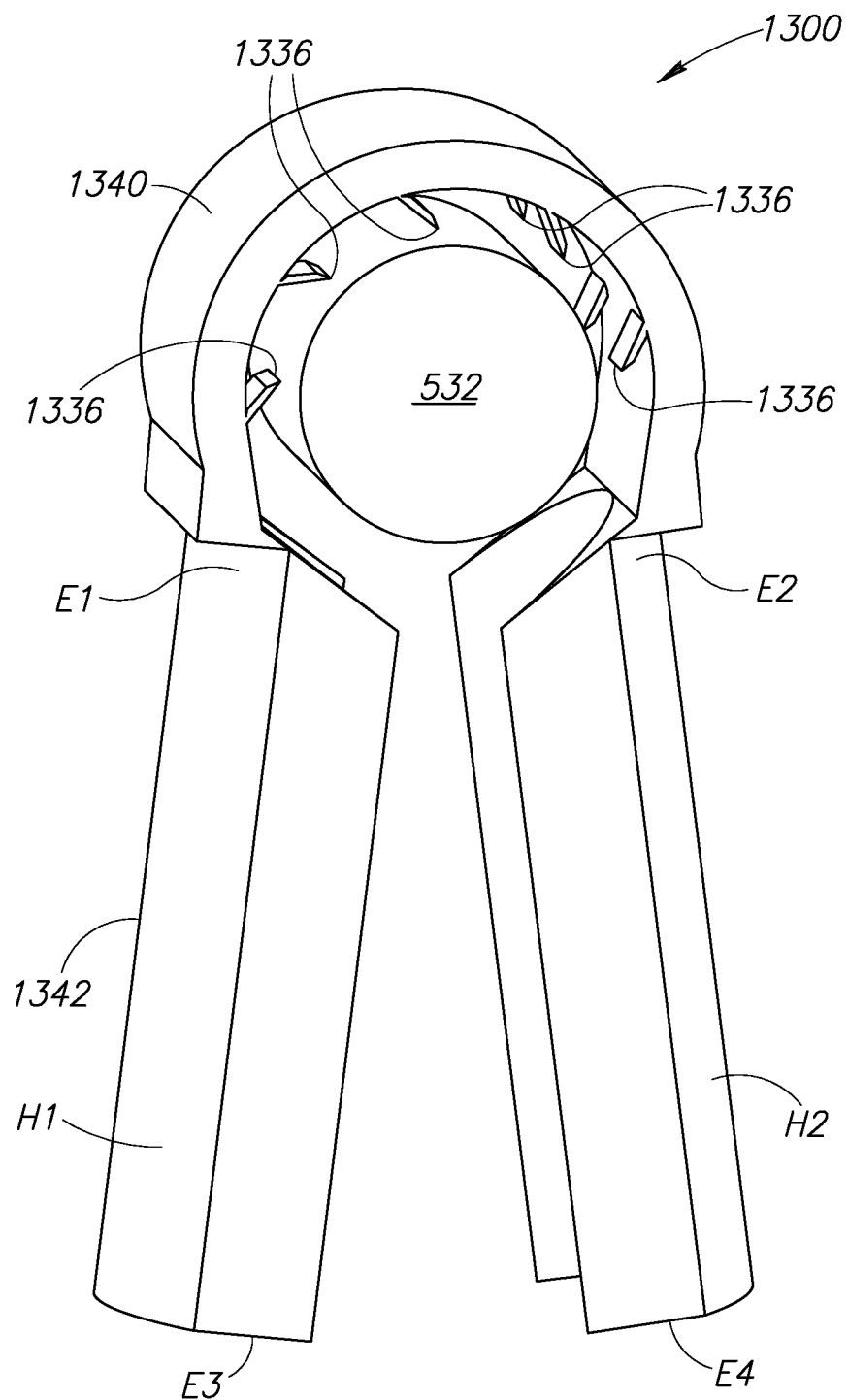
FIG. 37 is a perspective view of the dust cap of FIG. 35 showing its body portion split into two halves.

Referring to FIG. 37, in the embodiment illustrated, the body portion 1342 is formed in two halves H1 and H2 that are connected together at their ends E1 and E2, respectively, by the wiping element retaining portion 1340. Thus, the body portion 1342 may be characterized as being a split body. The body portion 1342 may be formed by molding plastic (without undercuts).

Figure 38:
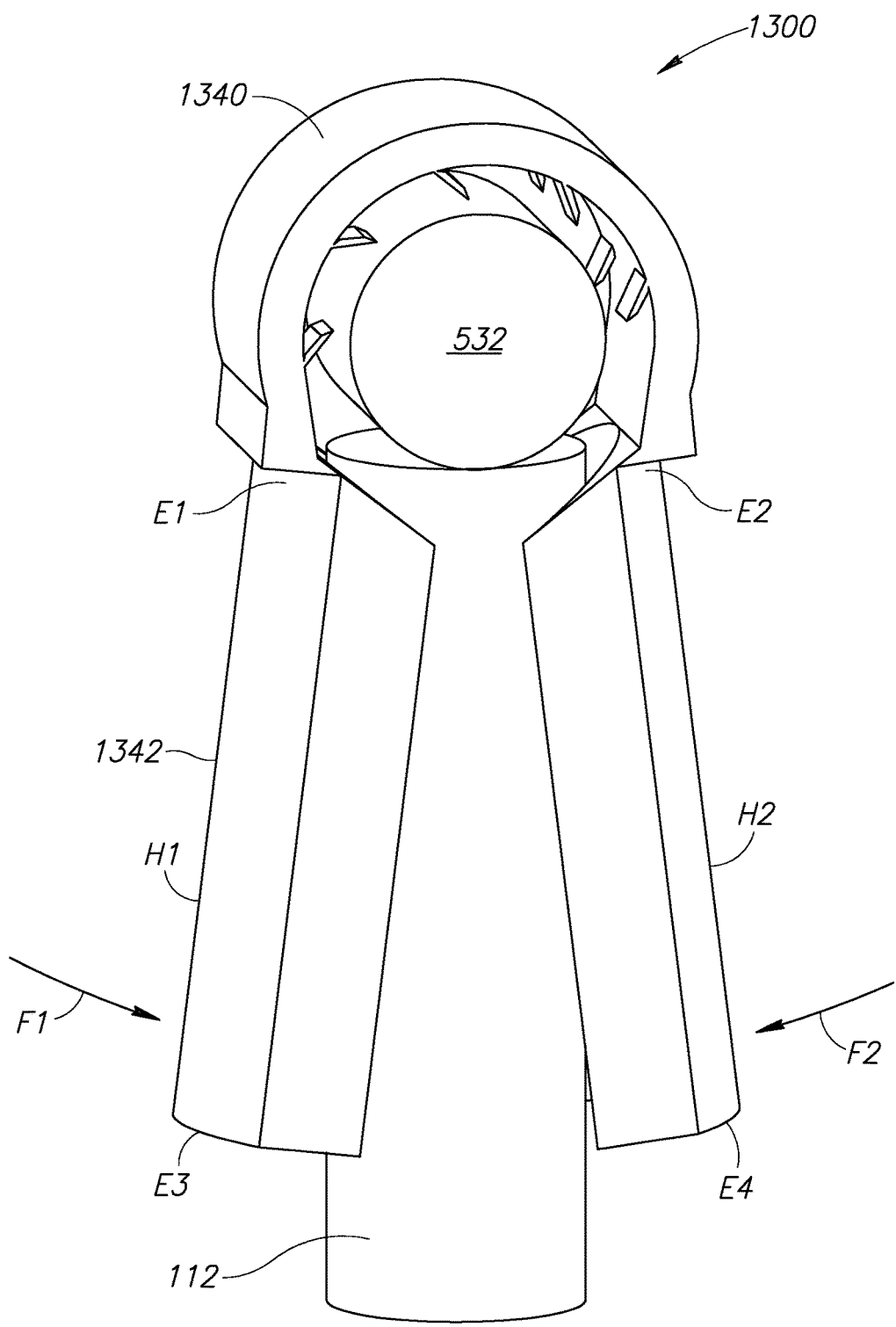
FIG. 38 is a perspective view of the dust cap of FIG. 37 showing the two halves of its body portion being clamped onto the ferrule.

Referring to FIG. 38, free ends E3 and E4 of the halves H1 and H2, respectively, may be spaced apart from one another initially and compressed or pinched around the ferrule 112 (e.g., in directions indicted by arrows "F1" and "F2," respectively). A retainer device (not shown) or an ultrasonic finish weld could be used to retain the halves around the ferrule 112 and form the shape illustrated in FIGS. 35 and 36. Optionally, wiping material (not shown) could be wrapped around the ferrule 112 and sandwiched between the halves H1 and H2 to capture contamination. Air leakage through gaps or slits defined between the halves H1 and H2 may help reduce air pistoning.

Referring to FIG. 36, the wiping element retaining portion 1340 defines an open-ended transverse channel 1352 configured to receive and retain the wiping element 532 therein. The distal opening 1349 of the central channel 1350 opens into the channel 1352 so that the wiping element 532 may contact the end surface 118 of the ferrule 112 when the ferrule 112 is inserted into the dust cap 1300 as shown in FIG. 36. The channel 1352 is configured to allow the wiping element 532 to move longitudinally between a disengaged position (FIG. 35) and a fully engaged position (FIG. 36). When the ferrule 112 is fully inserted into the dust cap 1300, the ferrule 112 presses the wiping element 532 from the disengaged position (FIG. 35) to the fully engaged position (FIG. 36). When the ferrule 112 is removed from the dust cap 1300, the wiping element 532 is free to return to the disengaged position (FIG. 35) from the fully engaged position (FIG. 36).

The channel 1352 is further configured to allow the wiping element 532 to rotate therein about a transverse axis (not shown) in a direction identified by an arrow "F3." The vanes 1334 extend inwardly from the wiping element retaining portion 1340 partway into the channel 1352. The vanes 1334 are configured to engage the side outer surface 534 of the wiping element 532 when the ferrule 112 presses the wiping element 532 into the fully engaged position (FIG. 36). As free ends 1336 (see FIG. 37) of the vanes 1334 contact the wiping element 532, they rotate the wiping element 532 in the direction identified by the arrow "F3."

The body portion 1342 may include a distal portion 1360 alongside both the distal opening 1349 of the central channel 1350 and the transverse channel 1352. The distal portion 1360 may be contoured or recessed to allow the wiping element 532 to partially or completely block the distal opening 1349 of the central channel 1350 such that the wiping element 532 functions as a filter for any air that enters the central channel 1350 through the distal opening 1349 of the central channel 1350.

When the ferrule 112 is fully inserted into the dust cap 1300, the outwardly facing end surface 118 of the ferrule 112 abuts the wiping element 532 and pushes it distally until the side outer surface 534 of the wiping element 532 contacts the free ends 1336 (see FIG. 37) of the vanes 1334. The vanes 1334 rotate the wiping element 532 (in the direction identified by the arrow "F3") as the ferrule 112 presses the wiping element 532 against them. As the wiping element 532 rotates, clean portions of the side outer surface 534 of the wiping element 532 wipe across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47). In this manner, the wiping element 532 cleans the end surface 118 of the ferrule 112. At this point, the wiping element 532 is in the fully engaged position (FIG. 36).

When the wiping element 532 is no longer being pressed against the vanes 1334 by the ferrule 112 (e.g., when the ferrule 112 is removed from the dust cap 1300), the wiping element 532 may move proximally (e.g., along with the end surface 118 of the ferrule 112) from the fully engaged position (FIG. 36) to the disengaged position (FIG. 35). In this manner, the wiping element 532 may be spaced apart from the vanes 1334 but may remain in the same orientation. In other words, removing the ferrule 112 may not cause the wiping element 532 to rotate (e.g., in a direction opposite the direction identified by the arrow "F3"). Thus, the vanes 1334 function as a ratchet that rotates the wiping element 532 only in the direction identified by the arrow "F3," which exposes the end surface 118 of the ferrule 112 to a different portion of the side outer surface 534 of the wiping element 532 when the ferrule 112 is inserted more than once or different ferrules are inserted into the dust cap 1300. When the wiping element 532 rests upon the distal portion 1360 of the body portion 1342, the wiping element 532 is in the disengaged position (FIG. 35).

The user may manually move or displace the wiping element 532 with respect to the polished end-face 122 (see FIGS. 2, 9, 12, 14, 15, 17, 20A, 22, 24, 42, 44A, and 47) in a manner that wipes or cleans the polished end-face 122. For example, the wiping element 532 may be rotated manually within the channel 552 (in the direction identified by the arrow "F3") so that the side outer surface 534 of the rotating wiping element 532 wipes across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47). Optionally, the first and second end portions 536 and 538 may protrude outwardly from the channel 552 and may be gripped by a user and used to rotate the wiping element 532 within the channel 552. As the wiping element 532 is rotated, clean portions of the side outer surface 534 wipe across the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47).

By way of another non-limiting example, a user may rotate the sleeve 1330 circumferentially around the ferrule 112 to rub the wiping element 532 along the polished end-face 122 of the optical fiber 120 to thereby wipe away any contaminants on the polished end-face 122.

By way of another non-limiting example, the wiping element 532 may be deflected laterally or transversely by the user thereby sliding the wiping element 532 laterally across the polished end-face 122 to remove contaminants therefrom.

By way of another non-limiting example, the sleeve 1330 may be compressed or otherwise deformed to slide the wiping element 532 laterally across the polished end-face 122 to remove contaminants therefrom.

Fourteenth Embodiment

Figure 39:
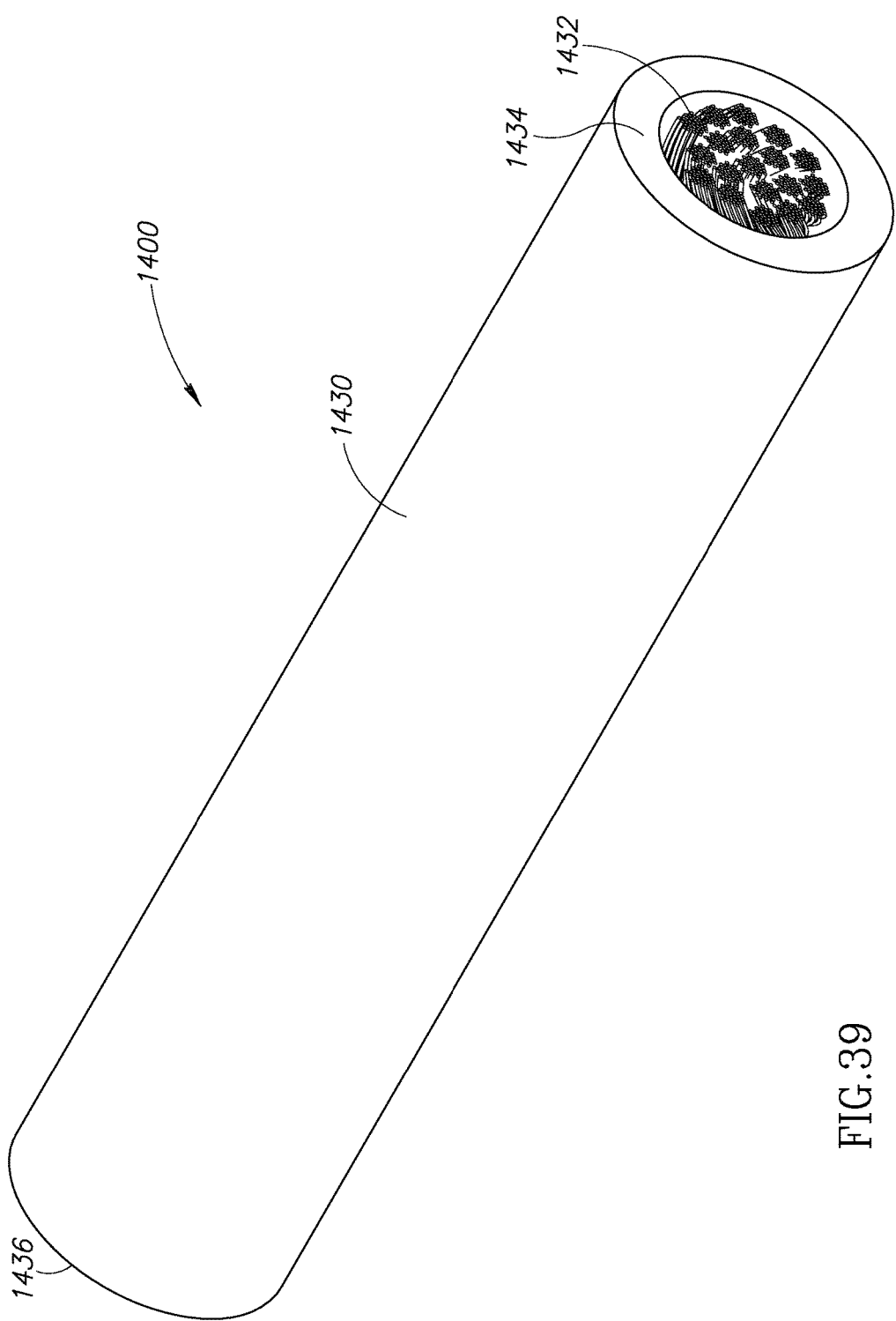
FIG. 39 is a perspective view of a fourteenth embodiment of a dust cap.

FIGS. 39, 41, and 42 depict an alternate embodiment of a dust cap 1400. The dust cap 200 includes a sleeve 1430 and a wiping element 1432. The sleeve 1430 may be constructed from any material suitable for constructing the sleeve 130 (see FIGS. 1 and 2), and the wiping element 1432 may be constructed from any material suitable for constructing the wiping element 132 (see FIG. 2). The sleeve 1430 has a generally cylindrical outer shape and is open at both ends 1434 and 1436. The sleeve 1430 surrounds the wiping element 1432, which may optionally extend or protrude outwardly from one or both open ends 1434 and 1436 of the sleeve 1430.

Figure 40A:
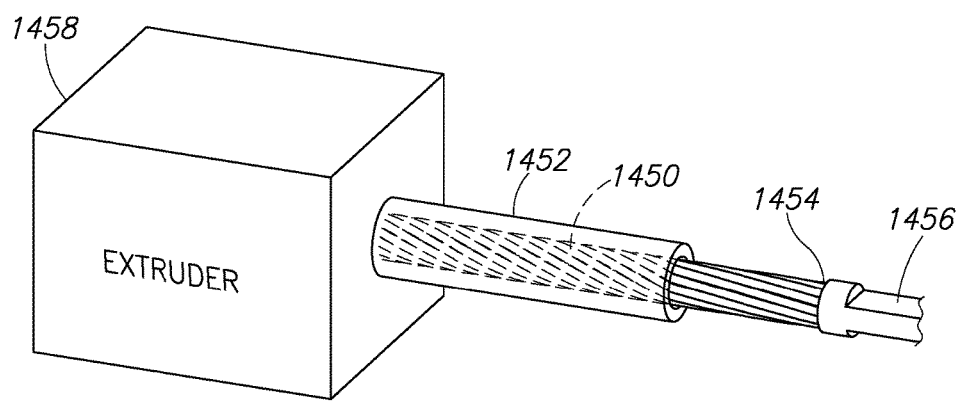
FIG. 40A is a perspective view of tubing being extruded around microfiber yarn.
Figure 40B:
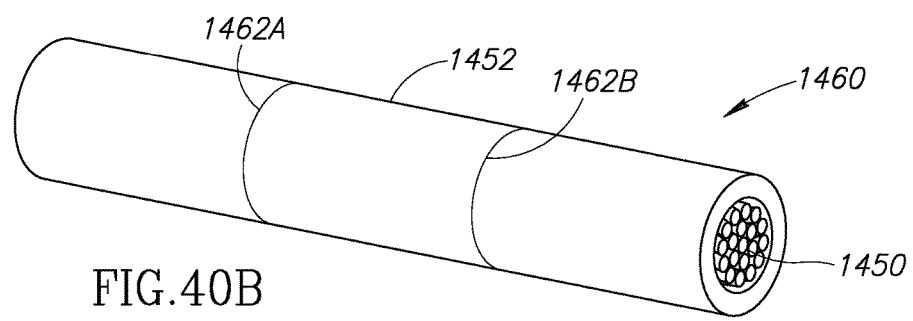
FIG. 40B is a perspective view of an extrusion formed by the extrusion of the tubing around microfiber yarn.
Figure 40C:
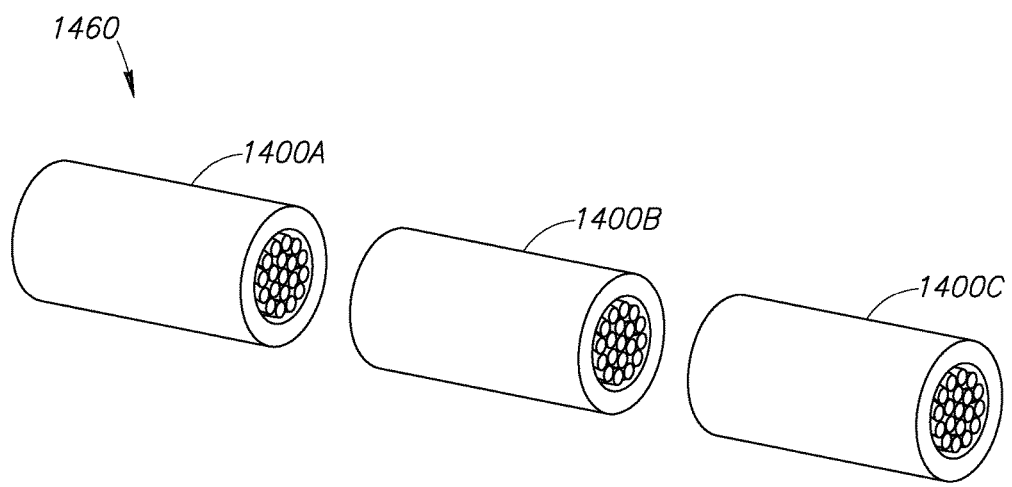
FIG. 40C is a perspective view of the extrusion of FIG. 40B cut into a plurality of dust caps each like the dust cap of FIG. 39.

By way of a non-limiting example, the sleeve 1430 may be a section of tubing and the wiping element 1432 may be a segment of yarn or braid of microfiber. In such embodiments, the dust cap 1400 may be constructed by extruding the sleeve 1430 over the wiping element 1432. In other words, the wiping element 1432 may be co-extruded together with the sleeve 1430. For example, referring to FIG. 40A, a microfiber braid or yarn 1450 may be pulled or stretched to reduce its diameter as tubing 1452 (e.g., a silicon tubing, tubing made from a material sold under the trademark VITON®, and the like) is formed around the yarn 1450 by an extruder 1458. A free end 1454 of the yarn 1450 may be coupled to a tensioning mechanism 1456 that pulls on the yarn 1450 as the tubing 1452 is extruded (by the extruder 1458) around the yarn 1450. An extrusion 1460 (see FIG. 40B) is obtained by releasing the yarn 1450 from the tensioning mechanism 1456 and, if necessary, separating the tubing 1452 and/or the yarn 1450 from the extruder 1458. After the yarn 1450 is released from the tensioning mechanism 1456, its diameter increases inside the tubing 1452. Then, referring to FIG. 40C, the resulting extrusion 1460 is cut into individual dust caps 1400A-1400C each like the dust cap 1400. This cutting may remove tension in the yarn 1450, causing the yarn 1450 to expand in diameter to completely fill the tubing 1452. The extrusion 1460 may be cut in the field immediately before one of the individual dust caps 1400A-1400C is installed on the ferrule 112 (see FIG. 42). This provides a clean open end into which to insert the ferrule 112. Optionally, the extrusion 1460 may include markings 1462A and 1462B showing where to cut the extrusion 1460 to obtain the individual dust caps 1400A-1400C.

Referring to FIG. 42, the ferrule 112 is pushed into the open end 1434 of the sleeve 1430. As the end surface 118 of the ferrule 112 pushes through and compresses the wiping element 1432 (e.g., microfiber yarn), the end surface 118 of the ferrule 112 (including the polished end-face 122 of the optical fiber 120) is cleaned by the wiping element 1432. The sleeve 1430 helps maintain the wiping element 1432 on the ferrule 112. The sleeve 1430 may seal the annular gap 116 around the ferrule 112.

The wiping element 1432 prevents contaminants from reaching the polished end-face 122 of the optical fiber 120. A user may also use the dust cap 1400 to remove contaminants from the polished end-face 122 of the optical fiber 120. For example, the sleeve 1430 may be rotated circumferentially around the ferrule 112 to rub the wiping element 1432 along the polished end-face 122 of the optical fiber 120 to thereby wipe away any contaminants on the polished end-face 122. Further, the sleeve 1430 may be deflected laterally to allow the wiping element 1432 to slide laterally across the polished end-face 122 to remove contaminants therefrom.

Optionally, the end 1436 of the sleeve 1430 may be sealed or closed (e.g., by a plug) to maintain the wiping element 1432 inside the sleeve 1430. Optionally, air may enter the sleeve 1430 through the end 1436. In such embodiments, the wiping element 1432 functions as an air filter that prevents contaminants (e.g., dust) from entering the dust cap 1400 through the end 1436. Thus, the wiping element 1432 may filter any "pistoned" air that enters the dust cap 1400 through the end 1436 when the dust cap 1400 is removed from the ferrule 112.

Figure 43:
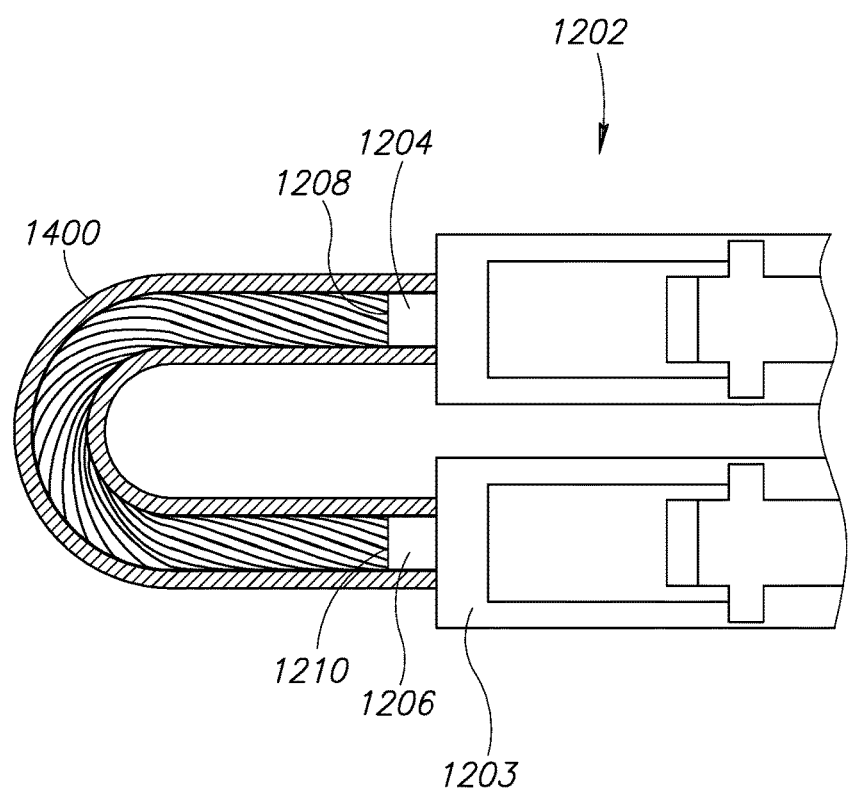
FIG. 43 is a cross-sectional view of the dust cap of FIG. 39 installed on the fiber optic connector of FIGS. 32-34, which is illustrated as a side view.

Referring to FIG. 43, by way of another non-limiting example, the dust cap 1400 may be used with a fiber optic connector (like the fiber optic connector 1202) that includes the ferrules 1204 and 1206. In such embodiments, the dust cap 1400 may be bent and the ends 1434 and 1436 placed over the ferrules 1204 and 1206, respectively. Thus, both of the ferrules 1204 and 1206 are protected from contamination and/or physical damage by the dust cap 1400.

Fifteenth Embodiment

Figure 44A:
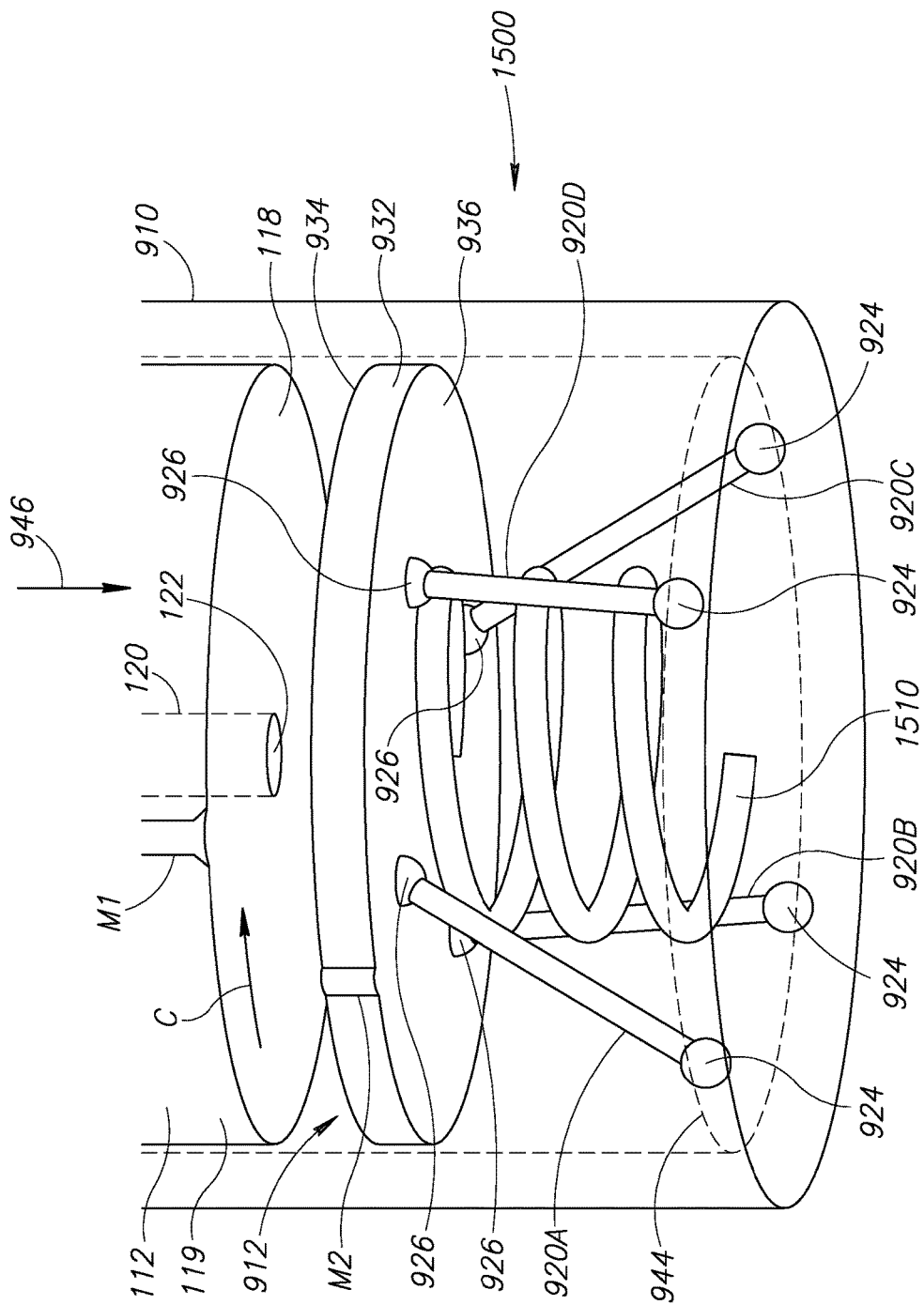
FIG. 44A is a perspective view of a fifteenth embodiment of a dust cap before the ferrule engages a wiping assembly of the dust cap.
Figure 44B:
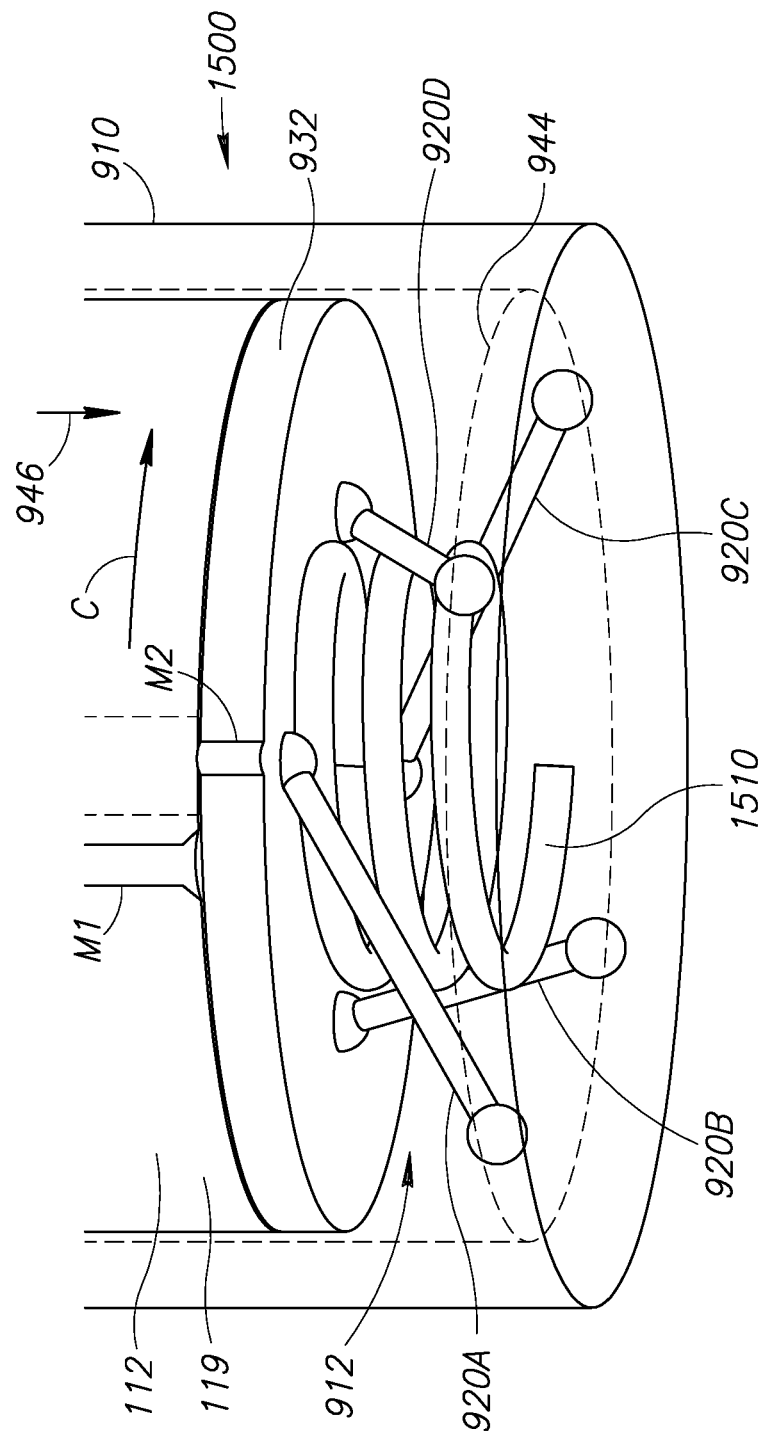
FIG. 44B is a perspective view of the dust cap of FIG. 44A with the ferrule received fully therein.

FIGS. 44A and 44B depict an alternate embodiment of a dust cap 1500. The dust cap 1500 is substantially similar to the dust cap 900 illustrated in FIGS. 24-25B and like reference numerals have been used to identify like components in FIGS. 24-25B, 44A, and 44B.

Unlike the dust cap 900, referring to FIGS. 44A and 44B, the dust cap 1500 includes a biasing element 1510 (e.g., a coil spring) positioned inside the cap member 910 between the inside surface 944 of the cap member 910 and the wiping element 932. In the embodiment illustrated, the pivot arms 920A-920D are positioned around and spaced apart from the biasing element 1510. Thus, the biasing element 1510 does not interfere with the pivot arms 920A-920D as the wiping assembly 912 transitions between the disengaged configuration (FIG. 44A) and the fully engaged configuration (FIG. 44B). The biasing element 1510 may be a separate component or formed (e.g., molded) in the cap member 910. The biasing element 1510 may be constructed from a flexible material.

For ease of illustration, in FIGS. 44A and 44B, the cap member 910 has been illustrated as being transparent. Therefore, the biasing element 1510, the pivot arms 920A-920D, the wiping element 932, and an end portion of the ferrule 112 are drawn using solid lines. However, in these figures, the biasing element 1510, the pivot arms 920A-920D, the wiping element 932, and the end portion of the ferrule 112 are positioned inside the cap member 910.

The biasing element 1510 applies a linear biasing force to the inwardly facing surface 936 of the wiping element 932 that biases (or pushes) the wiping element 932 in the outward direction opposite the inward direction identified by the arrow 946. Referring to FIG. 44A, when the dust cap 1500 is placed on the ferrule 112, the ferrule 112 travels linearly within the cap member 910 (in the inward direction identified by the arrow 946) from the disengaged configuration (FIG. 44A) toward the wiping assembly 912. When the outwardly facing end surface 118 of the ferrule 112 applies sufficient force to the wiping surface 934 in the inward direction to overcome the biasing force (in the outward direction) applied by the biasing element 1510, the wiping assembly 912 automatically transitions from the disengaged configuration (FIG. 44A) to the fully engaged configuration (FIG. 44B). In other words, as the wiping element 932 is pressed toward the inside surface 944, the pivot arms 920A-920D each pivot toward the inside surface 944 and press on and rotate the wiping element 932 (in the forward rotational direction identified by the curved arrow "C"). This rotation may be seen in FIGS. 44A and 44B by the displacement of the second reference mark M2 with respect to the first reference mark M1 as the ferrule 112 is inserted further into the cap member 910. Referring to FIG. 44A, as the wiping element 932 rotates, it wipes and cleans the polished end-face 122 of the optical fiber 120. Thus, the linear motion of the ferrule 112 is converted or translated into rotational motion of the wiping element 932.

Referring to FIG. 44A, when the ferrule 112 is fully inserted into the cap member 910 (as shown in FIG. 44B) and pressed against the wiping surface 934, the cap member 910 may be rotated circumferentially around the ferrule 112 to rub the wiping surface 934 on the polished end-face 122 of the optical fiber 120 to thereby wipe away any contaminants on the polished end-face 122. Further, the cap member 910 may be deflected laterally to allow the wiping surface 934 to slide laterally across the polished end-face 122 to remove contaminants therefrom. Additionally, the cap member 910 may be compressed or otherwise deformed to slide the wiping surface 934 laterally across the polished end-face 122 to remove contaminants therefrom. In other words, the wiping surface 934 may be moved or displaced with respect to the polished end-face 122 in a manner that wipes or cleans the polished end-face 122.

When the ferrule 112 is removed from the cap member 910, the pivot arms 920A-920D return to the disengaged configuration shown in FIG. 44A and press the wiping element 932 outwardly and away from the inside surface 944. Additionally, the biasing force applied to the inwardly facing surface 936 of the wiping element 932 by the biasing element 1510 biases (or pushes) the wiping element 932 outwardly (in the outward direction) and away from the inside surface 944. As the pivot arms 920A-920D return to the disengaged configuration, they rotate the wiping element 932 in the backward rotational direction, which is opposite the forward rotational direction identified by the curved arrow "C" in FIGS. 44A and 44B.

Sixteenth Embodiment

FIGS. 45 and 47-48C depict an alternate embodiment of a dust cap 1600. Referring to FIG. 48A, the dust cap 1600 includes a wiping member 1608 and a cover or cap member 1610.

Figure 45:
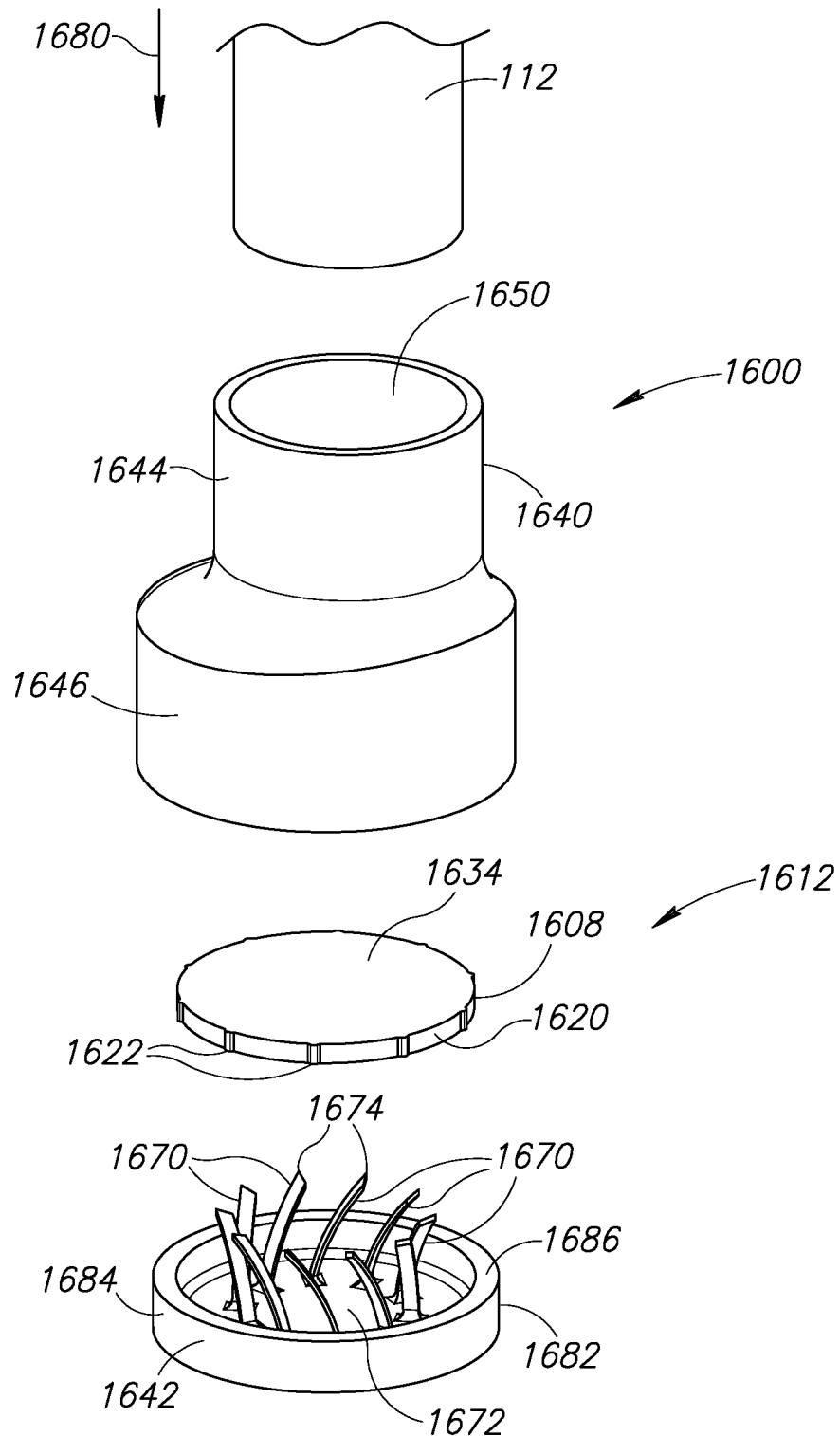
FIG. 45 is an exploded perspective view of a sixteenth embodiment of a dust cap that includes a wiping element and a sleeve that includes a body portion and an end portion.
Figure 47:
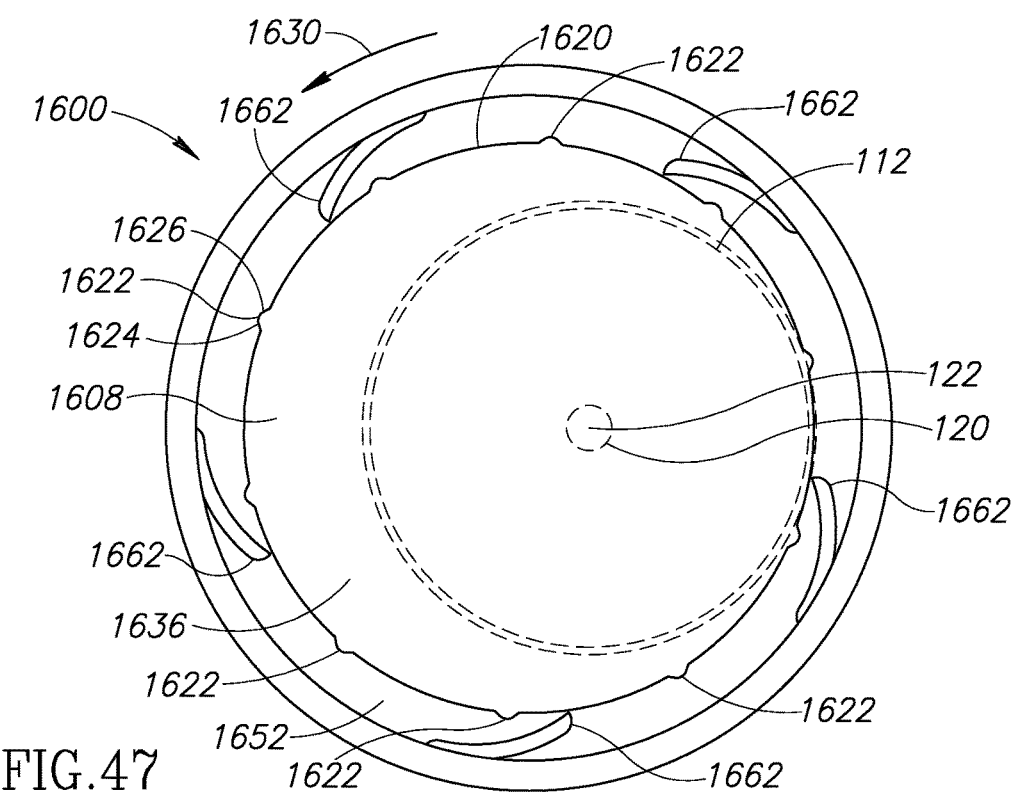
FIG. 47 is a perspective view into an end of the dust cap of FIG. 45 omitting the end portion of the sleeve.

Referring to FIG. 45, the wiping member 1608 may be constructed from any material suitable for constructing the wiping element 132 (see FIG. 2). The wiping member 1608 is generally disk-shaped and has a peripheral edge 1620 that defines a generally round cross-sectional shape. Circumferentially spaced apart indexing teeth or projections 1622 are formed along and extend radially outwardly from the peripheral edge 1620. In the embodiment illustrated, the wiping member 1608 is configured to rotate in a forward rotational direction identified by a curved arrow 1630 in FIGS. 47 and 48B. Referring to FIG. 47, each of the indexing projections 1622 has a forward facing edge 1624 and a backward facing edge 1626. The wiping member 1608 has an outwardly facing wiping surface 1634 (see FIGS. 45 and 48A) configured to wipe and clean the polished end-face 122 of the optical fiber 120. Opposite the wiping surface 1634 (see FIGS. 45 and 48A), the wiping member 1608 has an inwardly facing surface 1636.

Figure 48A:
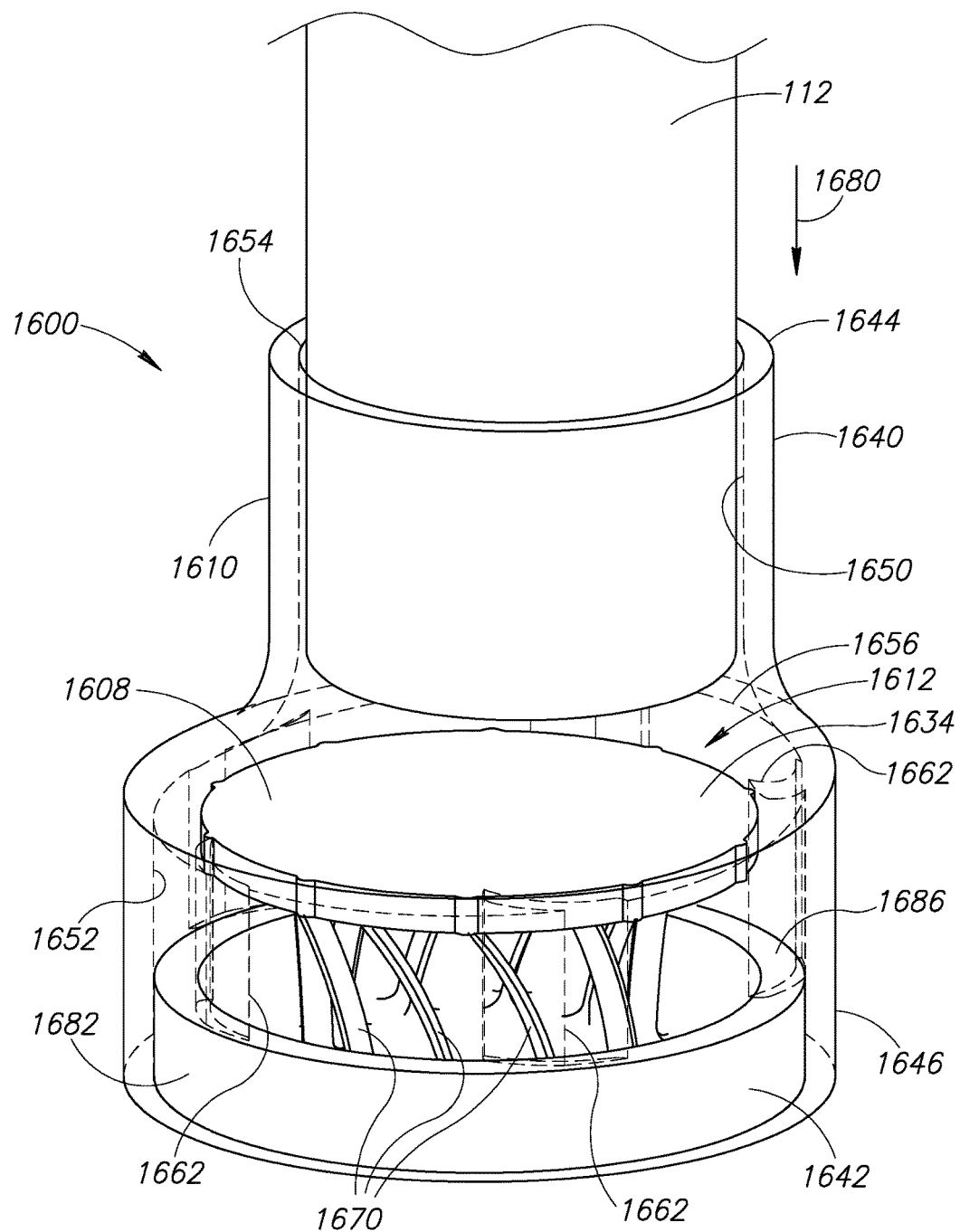
FIG. 48A is a perspective view of the dust cap of FIG. 45 before the ferrule engages the wiping element of the dust cap.

Referring to FIG. 48A, the cap member 1610 may be constructed from any material suitable for constructing the cap member 610 (see FIGS. 14-18, 20A-23, and 26-28). The cap member 1610 includes a body 1640 and an end portion 1642. For ease of illustration, in FIGS. 48A-48C, the body 1640 is transparent. Therefore, the end portion 1642, the wiping member 1608, and an end portion of the ferrule 112 are drawn using solid lines. However, in these figures, the end portion 1642, the wiping member 1608, and the end portion of the ferrule 112 are positioned inside the body 1640.

Referring to FIG. 48A, the body 1640 has first and second body portions 1644 and 1646 with first and second channels 1650 and 1652, respectively, formed therein. As shown in FIG. 48A, the first and second channels 1650 and 1652 may be offset laterally from one another. This asymmetrical design helps prevent the wiping member 1608 from cycling dust or debris over the same area of the end surface 118 (see FIGS. 2, 9, 12, 14-17, 20A-22, 24, 36, 41, 42, and 44A) of the ferrule 112. Opposite first and second openings 1654 and 1656 into the first channel 1650 are formed in the first body portion 1644. The first opening 1654 is configured to receive the ferrule 112 and the second opening 1656 opens into the second channel 1652. The first channel 1650 is configured to allow the ferrule 112 to pass therethrough and enter the second channel 1652 through the second opening 1656.

Figure 46:
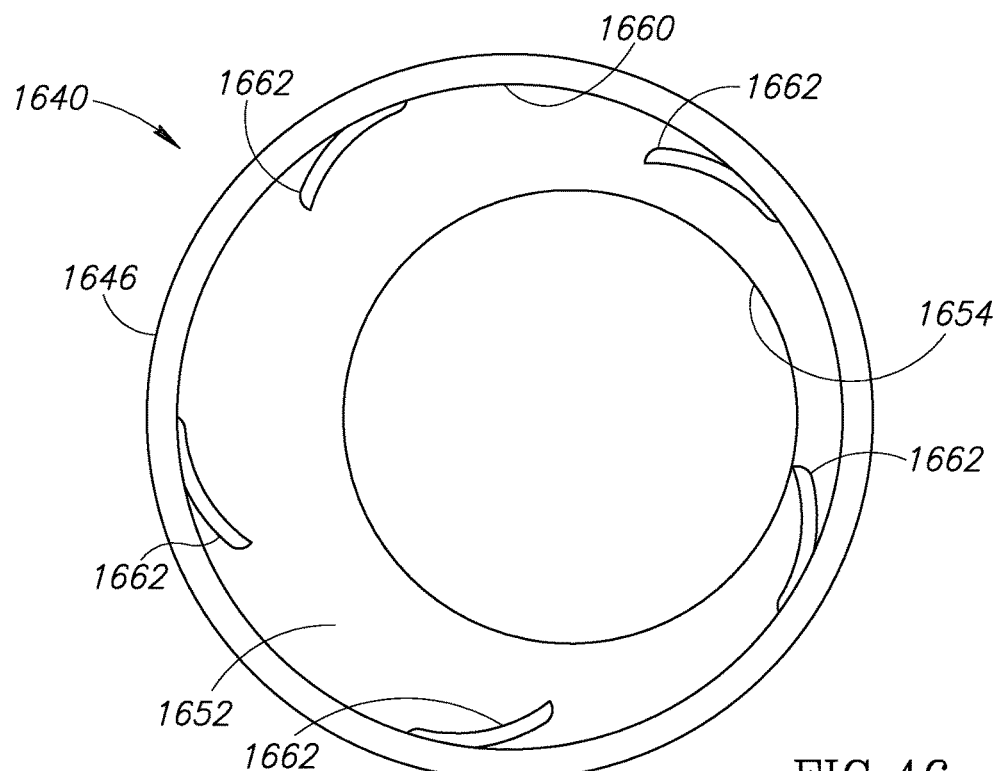
FIG. 46 is a perspective view into an end of the body portion configured to receive the end portion of the sleeve.

The second channel 1652 is configured to house the wiping member 1608. Referring to FIG. 46, the second body portion 1646 has an opening 1660 configured to receive the end portion 1642 (see FIGS. 45 and 48A-48C). One or more indexing projections or arms 1662 extend from the second body portion 1646 into the second channel 1652. Referring to FIG. 47, the indexing arms 1662 are configured to contact and slide along the peripheral edge 1620 of the wiping member 1608 as the wiping member 1608 rotates in the forward rotational direction indicated by the curved arrow 1630. The indexing arms 1662 are also each configured to abut the backward facing edge 1626 of one of the indexing projections 1622 to prevent the wiping member 1608 from rotating in a backward rotational direction opposite the forward rotational direction.

Figure 48B:
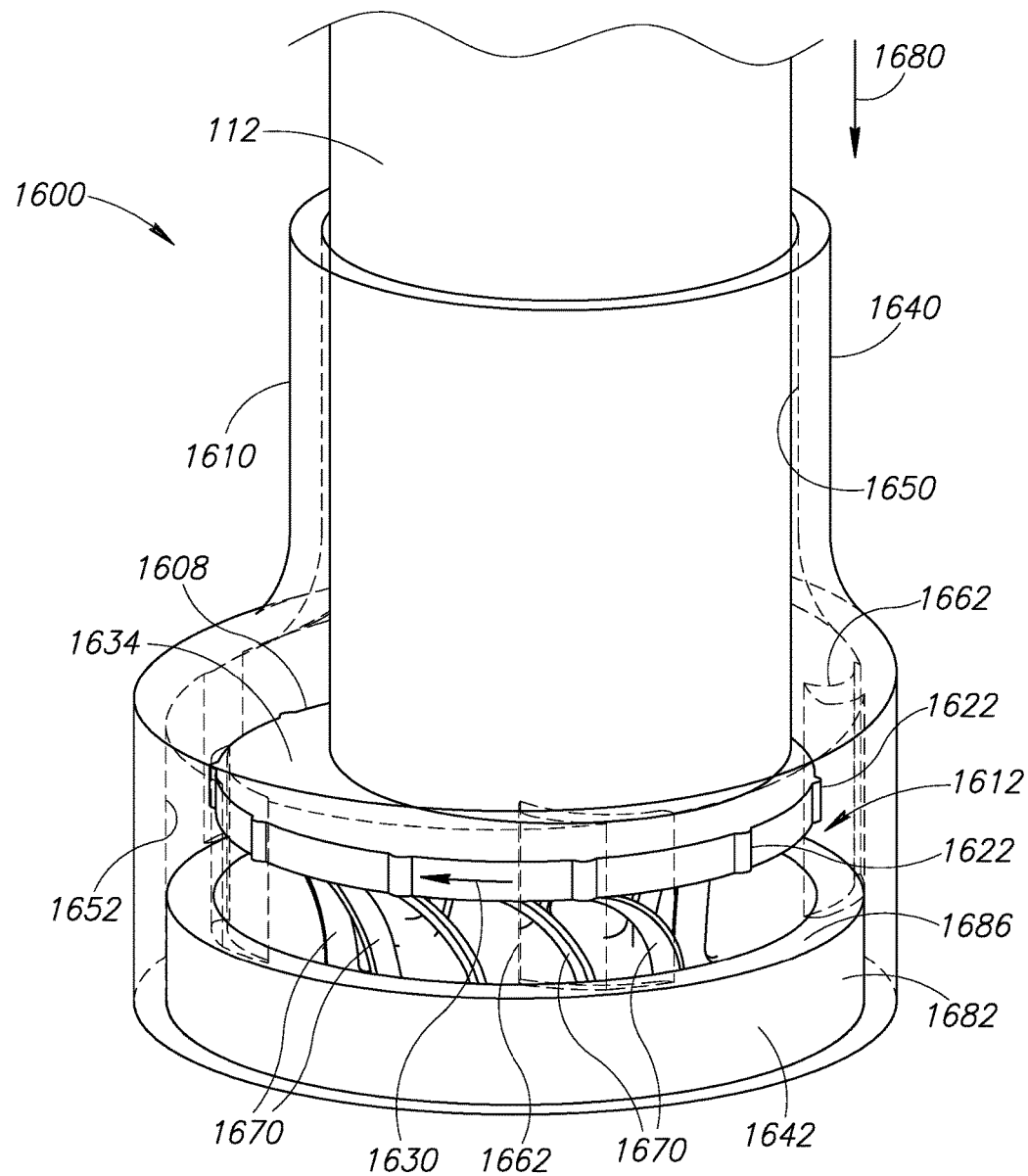
FIG. 48B is a perspective view of the dust cap of FIG. 45 with the ferrule partially received therein.
Figure 48C:
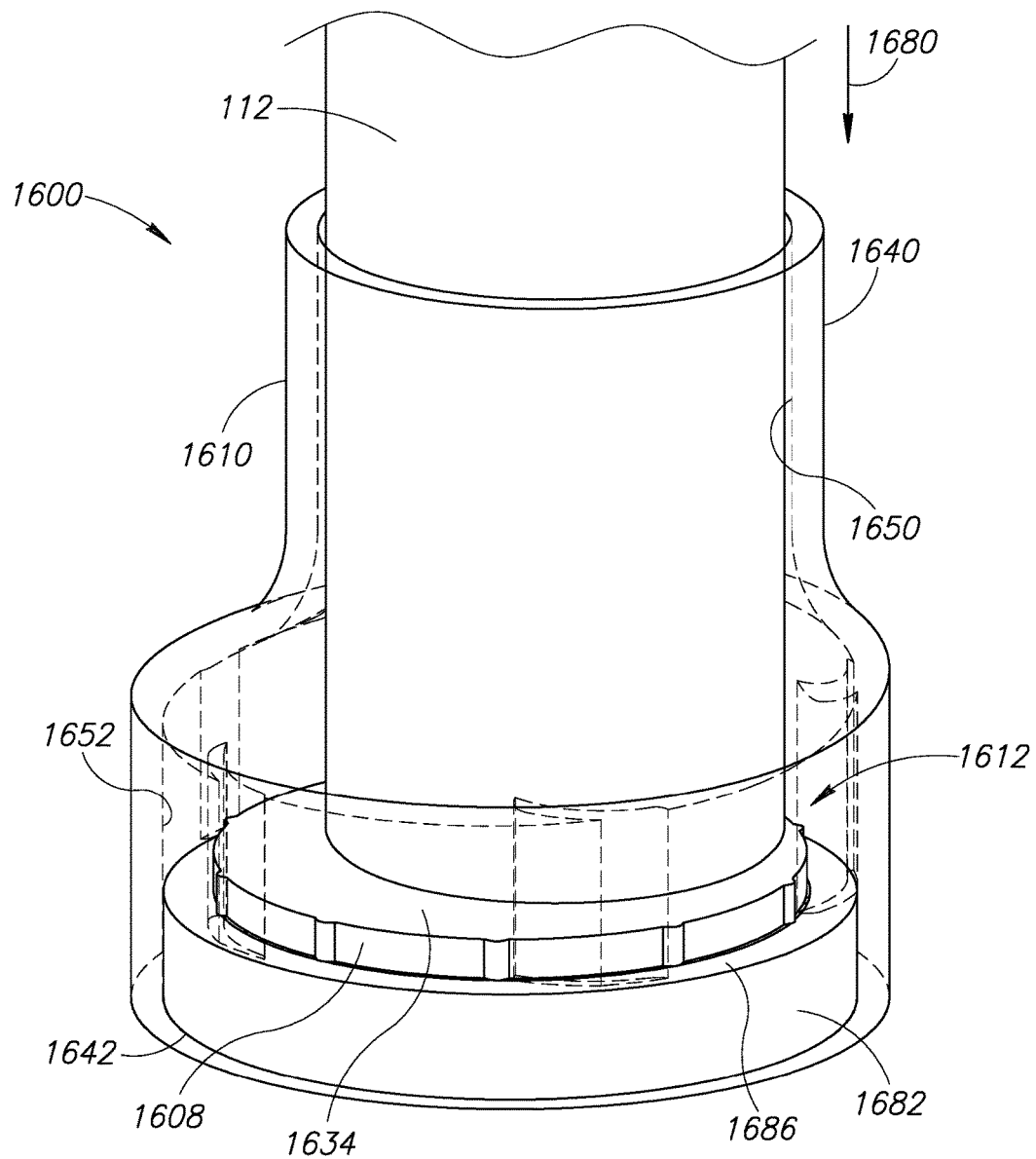
FIG. 48C is a perspective view of the dust cap of FIG. 45 with the ferrule received fully therein.

Referring to FIG. 45, the end portion 1642 has one or more inwardly extending spring arms 1670 configured to contact and support the wiping member 1608 inside the second channel 1652 (see FIGS. 46-48C). In the embodiment illustrated, the spring arms 1670 extend inwardly (toward the wiping member 1608) from an inwardly facing surface 1672 of the end portion 1642. Each spring arm 1670 may have a relieved or pointed free end 1674 configured to grip and/or dig into the inwardly facing surface 1636 (see FIG. 47) of the wiping member 1608. The spring arms 1670 apply a linear biasing force to the inwardly facing surface 1636 (see FIG. 47) of the wiping member 1608 that biases (or pushes) the wiping member 1608 in an outward direction (opposite an inward direction identified by an arrow 1680). While in the embodiment illustrated, ten spring arms have been illustrated, the end portion 1642 may include any number of spring arms. The spring arms 1670 may be constructed from a flexible material. The spring arms 1670 may be part of a separate component (e.g., an insert) or formed (e.g., molded) into the end portion 1642. Together, the spring arms 1670 and the wiping element 1612 may be characterized as forming a wiping assembly 1612 configured to transition between a disengaged configuration (FIG. 48A) and a fully engaged configuration (FIG. 48C).

The end portion 1642 has a peripheral rim or sidewall 1682 that extends inwardly within the second channel 1652 (see FIGS. 46-48C) along the second body portion 1646. The sidewall 1682 has an outwardly facing side surface 1684 that may be attached (e.g., glued) to the second body portion 1646 inside the second channel 1652 (see FIGS. 46-48C) or held therein by friction. The sidewall 1682 has an inwardly facing end surface 1686. As shown in FIG. 48A, when the wiping assembly 1612 is in the disengaged configuration, the spring arms 1670 extend upwardly beyond the end surface 1686 and position the wiping member 1608 above the end surface 1686. On the other hand, as shown in FIG. 48C, when the wiping assembly 1612 is in the fully engaged configuration, the wiping member 1608 may rest upon the end surface 1686 of the sidewall 1682.

Optionally, the body 1640 or the end portion 1642 may include through-holes (not shown) substantially similar to the through-holes 652 (see FIGS. 18 and 19) of the cap member 610 (see FIGS. 14-18, 20A-23, and 26-28). Such through-holes (not shown) may be positioned between the spring arms 1670. In such embodiments, the dust cap 1600 may optionally include the outer cover 650 (see FIGS. 18 and 19).

As described below, the wiping assembly 1612 automatically transitions from the disengaged configuration (FIG. 48A) to the fully engaged configuration (FIG. 48C). Referring to FIG. 48A, when the dust cap 1600 is placed on the ferrule 112, the ferrule 112 travels linearly within the cap member 1610 (in the inward direction identified by the arrow 1680) from the disengaged configuration (FIG. 48A) toward the wiping assembly 1612. Referring to FIG. 48B, when the outwardly facing end surface 118 (see FIGS. 2, 9, 12, 14-17, 20A-22, 24, 36, 41, 42, and 44A) of the ferrule 112 applies sufficient force to the wiping surface 1634 in the inward direction (identified by the arrow 1680) to overcome the biasing force applied by the spring arms 1670 (in the outward direction), the spring arms 1670 bend or flex toward the inside surface 1672 (see FIG. 45) and their pointed free ends 1674 (see FIG. 45) press on and rotate the wiping member 1608 (in the forward direction identified by the curved arrow 1630). Referring to FIG. 47, the rotational force applied to the wiping member 1608 by the spring arms 1670 (see FIGS. 45, 48A, and 48B) is sufficient to cause the indexing arms 1662 to travel over one or more of the indexing projections 1622 as the wiping member 1608 rotates. In other words, the indexing projections 1622 push the indexing arms 1662 radially outwardly. As the wiping member 1608 rotates, it wipes and cleans the polished end-face 122 of the optical fiber 120. Thus, the linear motion of the ferrule 112 is converted or translated into rotational motion of the wiping member 1608. When the wiping member 1608 stops rotating in the forward rotational direction, the indexing arms 1662 may each be adjacent to the backward facing edge 1626 of one of the indexing projections 1622 or between two of the indexing projections 1622.

Referring to FIG. 48C, when the ferrule 112 is fully inserted into the cap member 1610 and pressed against the wiping surface 1634, the cap member 1610 may be rotated circumferentially around the ferrule 112 to rub the wiping surface 1634 on the polished end-face 122 (see FIGS. 2, 9, 12, 14, 15, 17, 20A, 22, 24, 42, 44A, and 47) of the optical fiber 120 (see FIGS. 1, 2, 9, 12, 14, 20A, 22, 24, 42, 44A, and 47) to thereby wipe away any contaminants on the polished end-face 122. Further, the cap member 1610 may be deflected laterally to allow the wiping surface 1634 to slide laterally across the polished end-face 122 (see FIGS. 2, 9, 12, 14, 15, 17, 20A, 22, 24, 42, 44A, and 47) to remove contaminants therefrom. Additionally, the cap member 1610 may be compressed or otherwise deformed to slide the wiping surface 1634 laterally across the polished end-face 122 (see FIGS. 2, 9, 12, 14, 15, 17, 20A, 22, 24, 42, 44A, and 47) to remove contaminants therefrom. In other words, the wiping surface 1634 may be moved or displaced with respect to the ferrule 112 in a manner that wipes or cleans the polished end-face 122 (see FIGS. 2, 9, 12, 14, 15, 17, 20A, 22, 24, 42, 44A, and 47).

When the ferrule 112 is removed from the cap member 1610, the spring arms 1670 return to the disengaged configuration shown in FIG. 48A and press the wiping member 1608 outwardly and away from the inside surface 1672 (see FIG. 45). Referring to FIG. 47, if the indexing arms 1662 are not adjacent to the backward facing edge 1626 of at least some of the indexing projections 1622, the spring arms 1670 (see FIGS. 45, 48A, and 48B) may rotate the wiping element 932 in the backward rotational direction as they return to the disengaged configuration (see FIG. 48A). However, when at least some of the indexing arms 1662 abut the backward facing edge 1626 of some of the indexing projections 1622, engagement between the indexing arm(s) and the indexing projection(s) prevent rotational in the backward rotational direction.

As explained above, the dust caps 100, 200, 300, 400, 500, 600, 700, 800, 900, 1000, 1100, 1200, 1300, 1400, 1500, and 1600 avoid contaminating fiber optic connectors and/or clean fiber optic connectors. The dust caps 100, 200, 300, 400, 500, 600, 700, 800, 900, 1000, 1100, 1200, 1300, 1400, 1500, and 1600 each provide one or more moveable wiping surfaces for cleaning the polished end-face of one or more optical fibers. The dust caps 100, 200, 300, 400, 500, 600, 700, 800, 900, 1000, 1100, and 1400 are each configured to filter air that enters the dust cap (e.g., via piston-like action) when the dust cap is removed. The dust caps 100, 200, 300, 400, 500, 600, 700, 800, 900, 1000, 1100, 1200, 1300, 1400, 1500, and 1600 may be constructed from one or more materials with negligible-outgassing. To further reduce contamination, before use, the dust caps 100, 200, 300, 400, 500, 600, 700, 800, 900, 1000, 1100, 1200, 1300, 1400, 1500, and 1600 may be stored in a clean bag or container. Additionally, the open ends of these dust caps (into which the ferrule(s) may be inserted) may be stopped up to prevent contamination from entering the interior of the dust cap. In addition to preventing contamination and cleaning the end surface 118 of the ferrule 112, each of the dust caps 100, 200, 300, 400, 500, 600, 700, 800, 900, 1000, 1100, 1200, 1300, 1400, 1500, and 1600 may protect a fiber optic connector from physical damage.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A dust cap for use with a fiber optic connector having a ferrule comprising an optical fiber, the ferrule having an end portion including an end surface of the optical fiber through which optical signals are transmitted, the dust cap comprising:
   a removable cover positionable over the end portion of the ferrule, the cover comprising one or more through-holes configured to allow air to pass therethrough; and
   wiping material positioned at least partially inside the cover, the wiping material being adjacent the end surface of the optical fiber when the cover is positioned over the end portion of the ferrule, the wiping material being positioned to filter contaminants from the air that passes through the one or more through-holes when the dust cap is removed from the end portion of the ferrule.

2. The dust cap of claim 1, wherein the cover has a proximal portion defining an opening configured to allow the ferrule to pass therethrough, and
   the proximal portion forms a seal along the ferrule.

3. The dust cap of claim 2, wherein the cover is configured to be displaced laterally with respect to the ferrule,
   the cover wipes the wiping material across the end surface of the optical fiber when the cover is displaced laterally with respect to the ferrule, and
   the seal formed along the ferrule remains unbroken as the cover is displaced laterally with respect to the ferrule.

4. The dust cap of claim 1, wherein the wiping material is movable with respect to the cover and wipes across the end surface of the optical fiber as the wiping material moves.

5. The dust cap of claim 1, wherein the cover may be displaced laterally with respect to the ferrule and when displaced, wipes the wiping material across the end surface of the optical fiber.

6. The dust cap of claim 1, wherein the cover is constructed from at least one of synthetic rubber, fluoropolymer elastomer, silicone, low outgassing fluoropolymer, polyvinylidene fluoride, polytetrafluoroethylene, polyethylene, nalgene, vespel polyimide, kapton, elastomers, and nitrile rubber.

7. The dust cap of claim 1, wherein the cover rotates the wiping material when the cover is positioned over the end portion of the ferrule, the rotation wiping the wiping material across the end surface of the optical fiber.

8. The dust cap of claim 7, wherein the cover comprises a ratchet that rotates the wiping material.

9. The dust cap of claim 1, wherein the cover is an inner cover, the one or more through-holes comprise a first through-hole, and the dust cap further comprises:
   an outer cover comprising a second through-hole, the outer cover being couplable to the inner cover and allowing air to pass through the second through-hole and into the first through-hole; and
   an air filter positioned between the first and second through-holes.

10. The dust cap of claim 1, wherein the cover comprises:
a moveable arm coupled to the wiping material, the arm wiping the wiping material across the end surface of the optical fiber when the cover is positioned over the end portion of the ferrule.

11. The dust cap of claim 1, further comprising:
a wiping element comprising the wiping material, the wiping element being compressed in between the cover and the end surface of the optical fiber when the cover is positioned over the end portion of the ferrule, the compression of the wiping element wiping the wiping material across the end surface of the optical fiber.

12. The dust cap of claim 1, wherein the wiping material is a microfiber yarn or a microfiber braid.

13. The dust cap of claim 1, wherein the wiping material is a microfiber yarn or a microfiber braid, the cover is a section of tubing defining a through-channel, and the through-channel comprises only the wiping material therein.

14. A dust cap for use with a fiber optic connector having a ferrule comprising an optical fiber, the ferrule having an end portion including an end surface of the optical fiber through which optical signals are transmitted, the dust cap comprising:
a cover having a closed end opposite an open end, the open end being configured receive the end portion of the ferrule, the closed end comprising one or more through-holes; and
a wiping element positioned inside the cover alongside the closed end, the wiping element being adjacent to and contacting the end surface of the optical fiber when the ferrule is received inside the open end of the cover, the wiping element being adjacent to the one or more through-holes and functioning as an air filter that prevents contaminants from entering the cover through the one or more through-holes.

15. The dust cap of claim 14, wherein the open end of the cover forms a seal along the ferrule.

16. The dust cap of claim 14, wherein the cover is rotatable about the ferrule and as the cover is rotated, the wiping element wipes the end surface to thereby remove contaminants.

17. The dust cap of claim 14, wherein the cover is configured to deflect laterally to allow the wiping element to slide laterally across the end surface to remove contaminants therefrom.

18. The dust cap of claim 14, wherein the closed end is configured to be compressed or deformed to slide the wiping element laterally across the end surface to remove contaminants therefrom.

19. The dust cap of claim 14, wherein the wiping element comprises an electrostatic discharge non-triboelectric material or a microfiber material.

20. A dust cap for use with a fiber optic connector having a ferrule comprising an optical fiber, the ferrule having an end portion including an end surface of the optical fiber through which optical signals are transmitted, the dust cap comprising:
a removable cover positionable over the end portion of the ferrule, the cover comprising one or more through-holes configured to allow air to pass therethrough;
an air filter positioned adjacent the one or more through-holes, the air filter being configured to filter contaminants from air before the air enters the one or more through-holes; and
wiping material positioned at least partially inside the cover, the wiping material being adjacent the end surface of the optical fiber when the cover is positioned over the end portion of the ferrule.

21. The dust cap of claim 20, wherein the cover has a proximal portion defining an opening configured to allow the ferrule to pass therethrough, and
the proximal portion forms a seal along the ferrule.

22. The dust cap of claim 21, wherein the cover is configured to be displaced laterally with respect to the ferrule,
the cover wipes the wiping material across the end surface of the optical fiber when the cover is displaced laterally with respect to the ferrule, and
the seal formed along the ferrule remains unbroken as the cover is displaced laterally with respect to the ferrule.

23. The dust cap of claim 20, wherein the cover is constructed from at least one of synthetic rubber, fluoropolymer elastomer, silicone, low outgassing fluoropolymer, polyvinylidene fluoride, polytetrafluoroethylene, polyethylene, nalgene, vespel polyimide, kapton, elastomers, and nitrile rubber.

24. The dust cap of claim 20, wherein the cover rotates the wiping material when the cover is positioned over the end portion of the ferrule, the rotation wiping the wiping material across the end surface of the optical fiber.

25. The dust cap of claim 24, wherein the cover comprises a ratchet that rotates the wiping material.

26. The dust cap of claim 20, wherein the cover is an inner cover, the one or more through-holes comprise a first through-hole, and the dust cap further comprises:
an outer cover comprising a second through-hole, the outer cover being couplable to the inner cover and allowing air to pass through the second through-hole and into the first through-hole, the air filter being positioned between the first and second through-holes.

27. The dust cap of claim 20, wherein the cover comprises:
a moveable arm coupled to the wiping material, the arm wiping the wiping material across the end surface of the optical fiber when the cover is positioned over the end portion of the ferrule.

28. The dust cap of claim 20, further comprising:
a wiping element comprising the wiping material, the wiping element being compressed in between the cover and the end surface of the optical fiber when the cover is positioned over the end portion of the ferrule, the compression of the wiping element wiping the wiping material across the end surface of the optical fiber.

29. The dust cap of claim 20, wherein the wiping material is an electrostatic discharge non-triboelectric material or a microfiber material.

* * * * *